United States Patent [19]
Suzuki et al.

[11] Patent Number: 6,038,051
[45] Date of Patent: Mar. 14, 2000

[54] LIGHT SCANNING DEVICE, OPTICAL DEVICE, AND SCANNING METHOD OF OPTICAL DEVICE

[75] Inventors: Takayoshi Suzuki, Kanagawa; Tsuneo Toda; Yoshihito Sekikawa, both of Saitama-ken, all of Japan

[73] Assignee: Fuji Xerox Co., Ltd., Tokyo, Japan

[21] Appl. No.: 09/309,911

[22] Filed: May 11, 1999

Related U.S. Application Data

[62] Division of application No. 08/990,531, Dec. 15, 1997, Pat. No. 5,930,019.

[30] Foreign Application Priority Data

| Dec. 16, 1996 | [JP] | Japan | 8-336159 |
| Dec. 18, 1996 | [JP] | Japan | 8-3386636 |
| Jan. 30, 1997 | [JP] | Japan | 9-017233 |
| Dec. 12, 1997 | [JP] | Japan | 9-342585 |

[51] Int. Cl.[7] ................................ G02B 26/08
[52] U.S. Cl. ............... 359/204; 359/216; 347/233; 347/237
[58] Field of Search .............. 359/204, 216–219; 347/232, 233, 234, 235, 237, 241–243; 250/234–236

[56] References Cited

U.S. PATENT DOCUMENTS

| 5,270,849 | 12/1993 | Bock et al. | 359/216 |
| 5,774,251 | 6/1998 | Sekikawa | 359/216 |

FOREIGN PATENT DOCUMENTS

| 50-93719 | 7/1975 | Japan . |
| 58-127912 | 7/1983 | Japan . |
| 60-48012 | 3/1985 | Japan . |
| 63-47718 | 2/1988 | Japan . |
| 3-98066 | 4/1991 | Japan . |

*Primary Examiner*—James Phan
*Attorney, Agent, or Firm*—Finnegan, Henderson, Farabow, Gareett & Dunner, L.L.P.

[57] ABSTRACT

A light scanning device deflects a plurality of light beams by a deflecting means performs divided scanning on a single scanning line on a photoconductor with the plurality of deflected light beams. When the scanning line is scanned, a detecting means detects a light beam passing through a predetermined position in front of a position where the light beam first strikes an image forming range on the photoconductor. An oscillating means oscillates a specified number of clocks in a time interval from when the light beam is detected by the detecting means until it is detected thereby again. An adjusting means makes adjustments so as to irradiate a plurality of light beams based on clocks oscillated by the oscillating means. In a time interval after the light beam is detected by the detecting means until it is detected thereby again, a plurality of light beams are irradiated based on the specified number of clocks. Therefore, even if unevenness occurs in the deflecting speed of the deflecting means, dots can be formed at the same intervals in scanning a plurality of scanning lines. Thus, it is possible to prevent discontinuous joints occurring in each of the images formed with a plurality of light beams.

4 Claims, 42 Drawing Sheets

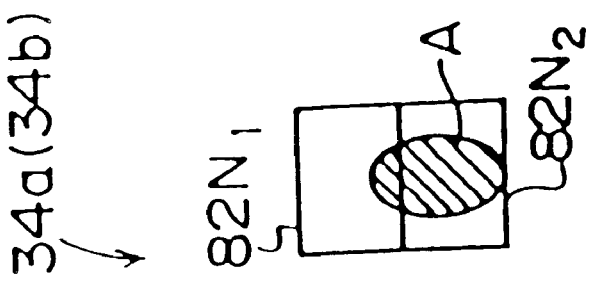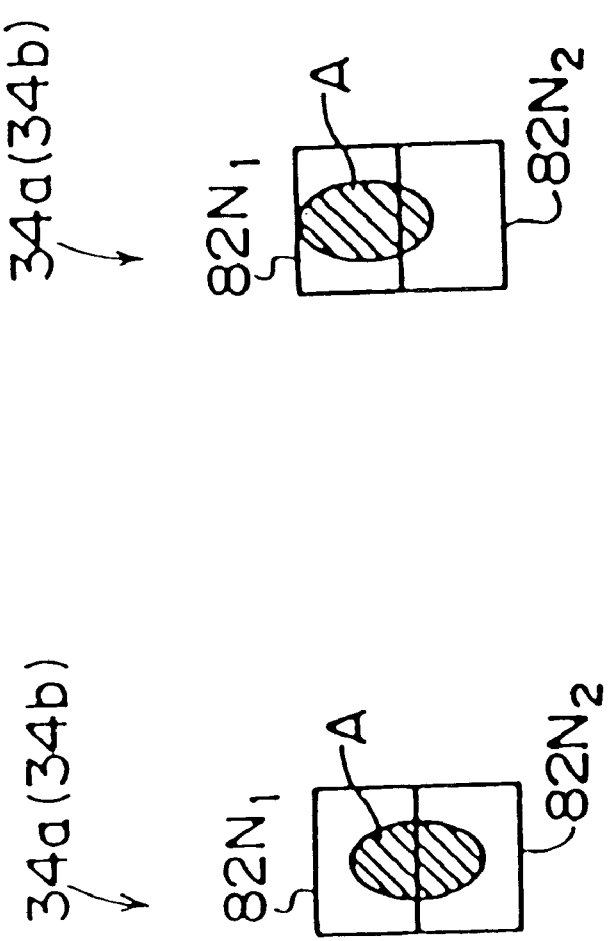
FIG. 7A  FIG. 7B  FIG. 7C

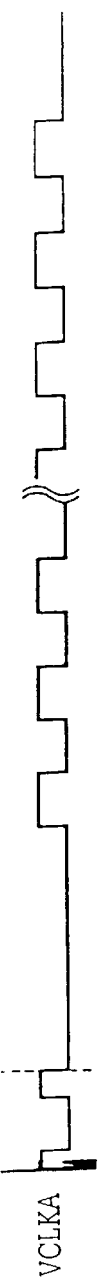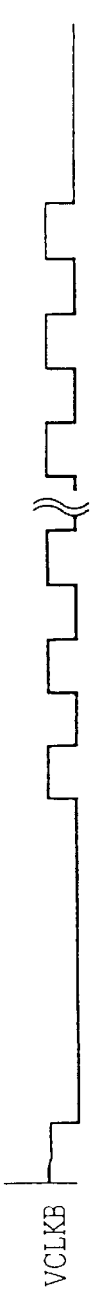

☐ IDEAL IMAGE POSITION

◯ SPOT POSITION A OF LASER BEAM

◌ SPOT POSITION B OF LASER BEAM

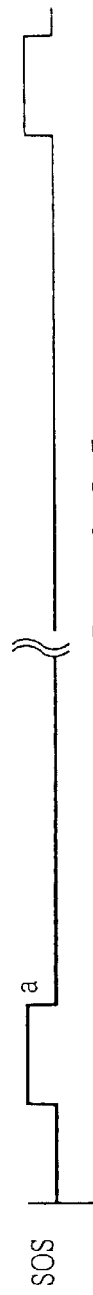
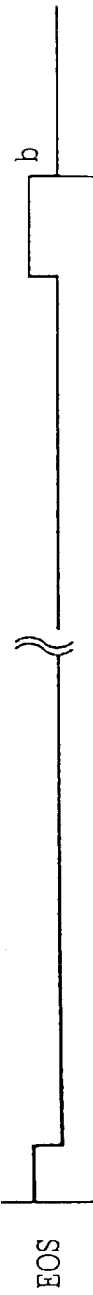
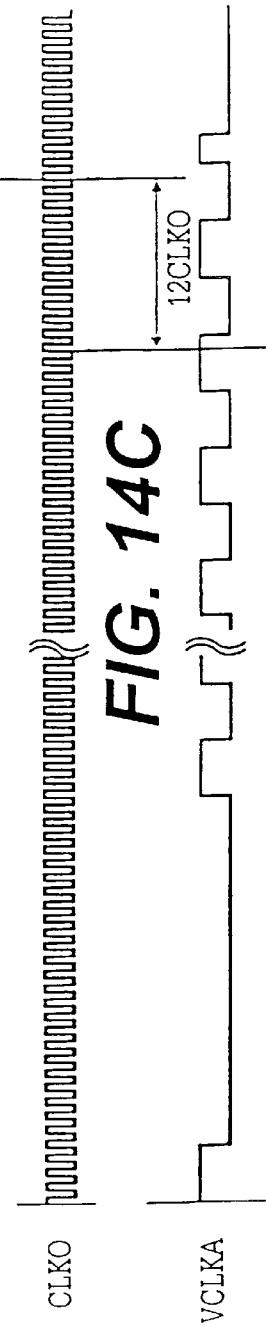
FIG. 14A
FIG. 14B
FIG. 14C
FIG. 14D
FIG. 14E
FIG. 14F
FIG. 14G $D_o = D_s = D_c = D_e$

LIGHT SCANNING DEVICE, OPTICAL DEVICE, AND SCANNING METHOD OF OPTICAL DEVICE

This is a division of application Ser. No. 08/990,531, filed Dec. 15, 1997, U.S. Pat. No. 5,930,019, which is incorporated herein by reference.

BACKGROUND OF THE INVENTION

1. Field of the Invention

This invention relates to a light scanning device and more particularly to a light scanning device wherein a plurality of light beams are irradiated, the plurality of irradiated light beams are deflected by a deflecting means and divided scanning is carried out on each scanning line by the deflected plural light beams, and a light scanning device for use in digital image forming apparatuses for electrophotography such as laser printers, laser copiers, and the like.

Further, this invention also relates to an optical device which is used in such image recording apparatus as laser printers, digital copiers and the like and in which light beam is swept according to image information so as to scan and expose a photoconductor, and a scanning method of the optical device, and more specifically to an optical device in which a single scanning line on the photoconductor is scanned in two divisions with two light beams at the same time and a scanning method of the optical device.

2. Description of the Related Art

In an ordinary optical scanning apparatus of the prior art, the face width of a polygon mirror is larger than the beam width in the main scanning direction of a light beam striking the polygon mirror. This face width is designed so as to cover the whole portion of the incident light beam regardless of any scanning angle (the so-called underfilled optical system).

In this underfilled optical system, as shown in FIG. 28, when an incident light beam having a beam width D0 in the main scanning direction is deflected by the polygon mirror, the beam width in the main scanning direction of a deflected light beam (deflection beam) is equal to the beam width of the incident light regardless of the scanning position. That is, assuming that the beam widths in the main scanning direction of the deflection beams leading to Start Of Scan (SOS), Center Of Scan (COS) and End Of Scan (EOS) are Ds, Dc, De respectively, D0=Ds=Dc=De is established. Consequently, the light volume and beam diameter (the effective diameter of a light spot converged on a photoconductor) at each scanning position are equalized thereby minimizing deterioration of image quality.

In recent years, the demand for higher recording speeds and resolutions has increased in such image recording apparatuses as laser beam printers, digital copiers, and the like using a light scanning device. To meet this demand for higher recording speeds and resolutions, a method may first be considered in which the time for a light beam to scan a single scanning line on the photoconductor is reduced by increasing the rotation speed of the polygon mirror.

However, there is a problem to be solved to achieve this idea. That is, usually the polygon mirror is rotated directly by a driving motor and currently, the upper limit of the rotation speed of the driving motor is 15,000 rpm (when ball bearings are used). However, this high speed motor is actually difficult to utilize because of the large increase in production costs. Even if pneumatic bearings are used, the limit is 40,000 rpm. Thus, there is an upper limit to the speeds and resolutions able to be obtained by increasing the rotation speed of the polygon mirror.

Increasing the number of deflecting faces of the polygon mirror can also be considered. However, if the number of deflecting faces increases, the diameter of the polygon mirror increases so that it is difficult to drive it with an ordinary driving motor. If, for example, under the underfilled optical system, it is intended to scan an A3 size sheet and ensure a beam diameter of about 60 $\mu$m on the photoconductor, if the number of the faces of the polygon mirror is more than 10, the diameter of the polygon mirror exceeds 100 mm. To solve this problem, Japanese Patent Application Laid-Open (JP-A) No. 50-93719 has disclosed an overfilled optical system as a technology for avoiding an enlargement of the polygon mirror diameter (see FIG. 25).

As shown in FIG. 25, the light scanning device disclosed in the aforementioned patent comprises a light beam generating means 81, a modulation means 82A, a flat/convex cylindrical lens 86A having a curvature in a scanning direction, a focusing lens 88A, a polygon mirror 90A, an incline correcting cylindrical lens 92, and a photoconductor drum 94. According to the aforementioned patent, it is desirable that the number of the deflecting faces of the polygon mirror 90A is 20–30 and the scanning angle ($\pm\alpha$) is $\pm 12$–$18°$.

According to the overfilled optical system, by expanding the beam width in the main scanning direction of light beam striking the polygon mirror beyond the face width of the polygon mirror as shown in FIG. 29, the diameter of the polygon mirror can be reduced, thereby making it possible to avoid an enlargement of the polygon mirror diameter even if the number of the deflecting faces thereof is increased.

However, if the number of the deflecting faces of the polygon mirror 90A is increased so as to increase the speed, the scanning angle at which the light beam is scanned by one deflecting face is inevitably decreased. Thus, the scanning width at a fixed distance from the polygon mirror 90A is decreased as the scanning angle is decreased. That is, to secure the same scanning width as in the prior art, the distance from the polygon mirror 90A to the photoconductor drum 94 needs to be increased, and the size of the light scanning device needs to be enlarged. For example, as is shown in FIG. 26, if it is intended to obtain a scanning width of 297 mm which is equivalent to A3 size paper, with the scanning angle ($\pm\alpha$) being $\pm 2$–$18°$, the focal length f of the optical system exceeds 500 mm.

Although in the prior art, the central value of the beam diameter on the photoconductor drum 94 is assumed to be approximately 150 $\mu$m, currently, as resolutions are intensified, this value has commonly come to approximately 60 $\mu$m. Even in the overfilled optical system, if the number of the deflecting faces of the polygon mirror is 20–30 as shown in FIG. 27, the internal circle diameter of the polygon mirror exceeds 60 mm, and therefore this polygon mirror is difficult to rotate with a cheap motor. In FIG. 27, it is assumed that the scanning width is 297 mm and the beam diameter is 5 $\mu$m.

As described above, even if the overfilled optical system is employed, there is a limit in the increase in speed, the increase in resolution, and the reduction in size able to be obtained.

Therefore, as an art in which a high speed and high resolution are realized while a small size is also attained, Japanese Patent Application Laid-Open (JP-A) No. 63-47718 has disclosed an optical device (light scanning device) in which divided scanning is performed on the surface of the photoconductor in the main scanning direction. This patent does not mention anything about overfilled optical systems.

In this optical device (light scanning device), the first half of an image area on the photoconductor is scanned with one laser beam and the second half thereof is scanned with another laser beam. Because divided scanning is performed on the same scanning line with two laser beams, the number of the deflecting faces of the polygon mirror can be increased thereby increasing the print speed.

That is, in this optical device (light scanning device), as shown in FIG. 30, two light beams are projected from two laser beam sources onto the same point on the polygon mirror 9 so that the laser beams are perpendicular to the same deflecting face thereof and have different incident angles. Consequently, the divided regions 10, 11 on the photoconductor are scanned at the same time with two deflection beams from the polygon mirror 9. In this optical device, the difference in incident angle between two laser beam sources to a deflecting face is assumed to be θ/2 while the entire scanning angle to a plane to be scanned of the photoconductor 3 is θ. Divided scanning is performed on the photoconductor at the scanning angle of θ/2.

With this optical device, divided scanning is performed on the entire scanning plane at the same time with two light beams. Therefore, a higher speed and smaller size can be obtained as compared to an optical device which scans with a single light beam.

The diameter of the polygon mirror of this optical device depends on the width Dn of a light beam emitted from the polygon mirror which is set in such a manner that the beam formed on the photoconductor has the desired diameter. This emission beam width Dn is determined by the incident angle of the incident beam and incident beam width D0 for the underfilled optical system, and by the incident angle and face width (facet width) of the polygon mirror for the overfilled optical system.

The width Dn of emission beam of beam A 24A indicated by the dotted line leading to the scanning center position COS as shown in FIG. 31 is expressed as follows, where the incident angle of incident beam B 22B is β, the incident angle of beam A 21 is β+2α, the scanning angle is 2α(±α), the width of the incident beam to the polygon mirror is D0 and the face width in the main scanning direction of the polygon mirror deflecting face is FA;
for the underfilled optical system, $$Dn = D0 \times COS((β+2α)/2) \quad (1)$$

for the overfilled optical system, $$Dn = FA \times COS((β+2α)/2) \quad (2)$$

Meanwhile, referring to FIG. 31, the scanning range (range) with the beam A is from the start of scan position (SOS) to the center of scan position (COS) and the scanning range with the beam B (t range) is from the center of scan position COS to the end of scan position EOS.

Because the aforementioned light scanning device performs divided scanning on the scanning line with two laser beams, a completed image is formed from a plurality of images created with respective laser beams.

Here, the respective laser beams are projected from a plurality of light sources located at different positions and arrive at the photoconductor through different paths. Thus, the mounting positions of the light sources, the positions of the parts composing the light sources, the positions of the optical systems mounted on the paths and the like are changed due to external factors such as temperature changes, vibration, impact and the like, so that the laser beam path may sometimes deviate from its predetermined path.

If the laser beam path deviates, discontinuities occur at the joints between the multiple images formed with respective laser beams, so that the image quality drops markedly.

Further, when an unevenness in the rotation speed of the polygon mirror occurs, the interval in the scanning line direction between dot positions of the multiple images created with the respective laser beams changes in each of the scanning lines. On the other hand, the first dot position is fixed since it is determined depending on a start timing signal from a predetermined sensor. Thus, the image quality at the joint between the multiple images drops markedly.

If 15° and 45° are substituted for α and β in the aforementioned formulas (1), (2), it becomes necessary to set D0 or FA at about 1.26 times larger relative to Dn, so that there is a limit to the possible reductions in the diameter of the polygon mirror.

As shown in FIG. 31, for the center of scan position COS, it is desirable from the view point of image quality to form the beam diameters of the beam B 25 and beam A 24A projected in that direction and converged on the photoconductor with the same diameter. To achieve this, it is necessary to equalize the widths Dn of the beams A and B emitted from the polygon mirror projected at the center of scan position COS. For the underfilled optical system, the beam width Dn of the beam B 25 is expressed as follows because the incident angle is β;

$$Dn = D0 \times COS(β/2) \quad (3)$$

As evident from the formulas (1) and (3), to equalize the beam diameters of the beams A and B projected at the center of scan position COS in the underfilled optical system, the incident beam width D0 for beam A must be different to that for beam B.

For the overfilled optical system, the beam width Dn of the beam B 25 is expressed as follows, because the incident angle is β;

$$Dn = FA \times COS(β/2) \quad (4)$$

As evident from the formulas (2), (4), to equalize the beam diameters of the beams A and B aimed at the center of scan position COS in the overfilled optical system, the face width of the polygon mirror must be different for beams A and B. However, this is physically impossible.

That is, according to the aforementioned conventional art, it is difficult or impossible to equalize the beam diameters of the beams A and B at the center of scan position COS which is the joint between the two beams. If the beam diameters differ at the center of scan position, an abrupt difference in line width occurs in images recorded at the center of scan position, thereby having a serious deleterious effect on the image quality.

Further, recently, higher speeds and resolutions have been demanded and even if the aforementioned disclosed art is used, the number of the deflecting faces of the polygon mirror needs to be more than 15. Thus, to avoid an enlargement of the polygon mirror diameter, there is no alternative but to employ the overfilled optical system.

If the overfilled optical system is applied in the aforementioned prior art, the following problems inherent in the overfilled optical system occur.

Because part of the light beam projected at the polygon mirror is cut off for use as a light beam in scanning, the FN0

(brightness in camera terminology) changes depending on the scanning angle (scanning position), so that the uniformity of beam diameter at the focusing position (in the vicinity of the photoconductor) worsens when linking therewith.

The FN0 mentioned here will be explained in detail. Assuming that the focal length of a focusing optical system for converging a laser beam deflected by the polygon mirror on the photoconductor is f, and the width (emission beam width) of a beam emitted from the polygon mirror is Dn, the FN0 is expressed as follows;

$$FN0=f/Dn \quad (5)$$

Further, the beam diameter $L_b$ on the photoconductor is substantially proportional to the product of the beam wavelength $\lambda$ and FN0. Therefore, by using k for the proportional coefficient, the formula (5) can be expressed as follows;

$$L_b=k\lambda \cdot FN0=k\lambda \cdot f/Dn \quad (6)$$

As evident in the formula (6), the beam diameter $L_b$ is proportional to focal length f and the beam diameter $L_b$ is inversely proportional to the width Dn of the beam. That is, as the focal length f is elongated, if it is intended to be kept at the same beam diameter, Dn needs to be increased, so that the size of the polygon mirror is also increased.

As shown in FIG. 28, in the underfilled optical system, Dn is constant regardless of the scanning angle. On the other hand, in the overfilled optical system, as shown in FIG. 29, the emission beam width Dn changes depending on the scanning angle. That is, when the width of the beam leading to the start of scan position SOS is Ds, the width of the beam leading to the center of scan position COS is Dc and the width of beam leading to the end of scan position is De, the following relation exists;

$$Ds<Dc<De<D0$$

According to the formulas (5), (6), the FN0 and beam diameter $L_b$ change depending on the scanning position on the photoconductor. This beam diameter $L_b$ changes at each scanning position by the factor 1/COS (***) which is the inverse number of COS (*) because a relation of Dn=FA×COS (*) exists as indicated by the formula (4). Therefore, a ratio of the factor 1/COS (***) or a ratio of FN0 is a parameter for indicating uniformity of the beam diameter $L_b$.

As for the example shown in FIG. 31, the factor 1/COS (*****) is:

At the scanning position (SOS) with beam 23, 1/COS $(\beta+4\alpha)/2$

At the scanning position (COS) with beam 24A, 1/COS $(\beta+2\alpha)/2$

At the scanning position (COS) with beam 25, 1/COS $(\beta/2)$

At the scanning position (EOS) with beam 26B, 1/COS $(\beta-2\alpha)/2$

If the number of the deflecting faces of the polygon mirror is n=20, the angle of each face of the polygon mirror is 360°/20 =18°. Thus, the rotation angle ±α/2 of the polygon mirror is less than ±9°(α is less than 18°). Where α is 15° and β is 45°;

at the scanning position (SOS) with beam 23, 1/COS $(\beta+4\alpha)/2=1.643$ at the scanning position (COS) with beam 24A, 1/COS $(\beta+2\alpha)/2=1.260$ at the scanning position (COS) with beam 25, 1/COS $(\beta/2)=1.082$ at the scanning position (EOS) with beam 26B, 1/COS $(\beta-2\alpha)/2=1.009$.

Thus, the FN0 ratio between SOS and EOS is 1.643/1.009= 1.628. Therefore, if the beam diameter at the EOS is 60 $\mu$m, the beam diameter at the SOS is about 100 $\mu$m, which is an unacceptable level in terms of image quality. Further, at the center of scan position COS where two beams join together, there occurs a difference in terms of FN0 of 1.082 and 1.260, which, in, terms of beam diameter, are 60 $\mu$m and 70 $\mu$m. The difference of 10 $\mu$m has a serious deleterious effect on the image quality resulting in an abrupt difference in line width at the center of scan position.

Further, because in the conventional overfilled optical system, the farther from the incident optical axis, the wider the removed part near the peak of Gausian distribution, the reduction of light volume at a side far from the incident optical axis becomes larger than the reduction of the beam diameter (see FIGS. 23, 24 described later). That is, together with the difference in beam diameter at the center of scan position, an abrupt difference in light volume occurs between the center of scan position and the sides far from the incident optical axis, having a serious deleterious effect on image quality.

Further, because the photoconductor is scanned with a plurality of laser beams when the aforementioned light scanning device is used, if light volumes at the joint between the adjacent scanning beams are not equal, stripes are formed at the joint between the adjacent scanning beams unlike scanning with a single laser beam, so that the formed image becomes fragmentary thereby deteriorating the image quality.

To solve this problem, in the light scanning device disclosed in Japanese Patent Application Laid-Open (JP-A) No. 58-127912, an area in which scanning beams optically overlap each other is provided for the joint area where the images are fragmented, and this area is assumed to be boundary area. In this boundary area, joints are set at random so as to make stripes which properly occur there apparently invisible.

Further, in the light scanning device disclosed in Japanese Patent Application Laid-Open (JP-A) No. 3-98066, an area in which scanning beams optically overlap each other is provided. Then, the exposure energy of one scanning beam is reduced and that of another scanning beam is increased, so that the total exposure amount in the overlapping area becomes an average value which is not largely different from other exposure ranges.

According to the above described inventions, as a method for correcting image distortions in the joint area between the exposure ranges, there have been proposed a method of changing the joint position and a method of averaging light volumes. When an image is formed on the photoconductor, if the image data which actually modulates the laser beam is taken into account, the method of changing the joint position givens rise to the problem that the relation between the exposure range to be scanned and the image data becomes complicated because the joints are randomly different. Meanwhile, if according to this method, changing of the joint position is carried out cyclically so as to make the relation between the exposure range to be scanned and image data less complicated, image distortion occurs in that same cycle.

In the method of averaging light volumes to correct image distortion in the joint area between the exposure ranges, averaging the light volumes is no problem, but the overlapping area is written twice depending on image data, so that the image blurs. This problem is particularly fatal in cases when a higher resolution is needed.

There is a common problem in both the method of changing the joint position and the method of averaging the light volumes. That is, when a semiconductor laser is used as the light source of the light scanning device, even if the optical outputs of multiple semiconductor lasers for use in scanning multiple exposure ranges have constantly equal light volumes, the following problem exists. Because the semiconductor laser has droop characteristics, the transient change in light volume which occurs at the joint between the divided exposure ranges cannot be corrected.

Namely, laser beams emitted from two semiconductor lasers scan separate exposure ranges across the joint there between. A laser beam for scanning the exposure range in front of the joint, of the two exposure ranges, often has constant light volume around the joint. However, a laser beam for sweeping the exposure range behind the joint has an excessive light volume which occurs at boot-up, resulting in the light volume of the laser beam automatically increasing because of the droop characteristics. Therefore, despite changing the joint positions at random and averaging the light volumes in the joint area, image distortion or stripe formation occurs.

SUMMARY OF THE INVENTION

Accordingly, it is an object of the present invention to provide a light scanning device wherein even if a light beam deviates from its pre-determined path or an unevenness in the deflecting speed of a deflecting means occurs, the quality of an image located at a joint between images formed with a plurality of light beams is not lowered.

Further, it is another object of the invention to provide an optical device wherein high speed and high resolution in recording an image are realized, and a device of small size and high image quality can be achieved at the same time, as well as a scanning method for the optical device.

It is a further object of the invention to provide a light scanning device which is capable of finely correcting the light volume from multiple exposure beams occurring in the joints between exposure ranges divided into multiple exposure ranges, preventing image distortion at the joints, and preventing the formation of stripes.

To achieve the aforementioned object, according to a first aspect of the present invention, a light scanning device is provided wherein a plurality of light beams are irradiated, the plurality of irradiated light beams are deflected by a deflecting means and divided scanning is performed on each scanning line of the photoconductor by the deflected plurality of light beams, the light scanning device comprising: a detection means for detecting a light beam passing through at least one of either a predetermined position in front of the position where the light beam first strikes an image forming range of the photoconductor or another predetermined position behind the position where the light beam last strikes an image forming range of the photoconductor, when the scanning light is scanned; an oscillating means for oscillating a specified number of clocks in an interval of time from when the light beam is detected by the detecting means until the light beam is detected again; and an adjusting means for adjusting the plurality of light beams so as to be irradiated according to the clock oscillated by the oscillating means.

According to a second aspect of the invention, there is provided a light scanning device wherein a plurality of light beams are irradiated, the plurality of irradiated light beams are deflected by a deflecting means and divided scanning is performed on each scanning line of a photoconductor by the deflected plurality of light beams, the light scanning device further comprising: an adjusting means for adjusting the irradiation timing of at least one of either a predetermined light beam or another light beam according to information on the shortest distance in the scanning direction between the frontmost dot in an image forming range and the rearmost dot in another image forming range, the image forming ranges being formed by scanning the scanning line once with a predetermined light beam from the plurality of light beams and another light beam adjacent to the predetermined light beam.

It is permissible to construct the light scanning device according to the second aspect of the invention so as to further comprise: a detection means for detecting a light beam passing through at least one of either a predetermined position in front of the position where the light beam first strikes an image forming range of the photoconductor or another predetermined position behind the position where the light beam last strikes an image forming range of the photoconductor when the scanning line is scanned; an oscillating means for, oscillating a specified number of clocks in an interval of time from when a light beam passing through at least one of either the first position or the second position is detected, until the light beam passing through at least one of either the first position or the second position is detected again, when the scanning line is scanned once; and a counting means for counting the clocks oscillated in the interval of time from when a light beam passing through the first position is detected, until the light beam passing through the second position is detected, when the scanning line is scanned once, wherein the adjusting means compares the counted clocks with a predetermined number thereof and according to the result of the comparison, adjusts the irradiation timing of at least one of either the predetermined light beam or the other light beam so that the shortest distance becomes a predetermined value.

According to a third aspect of the invention, there is provided a light scanning device wherein a plurality of light beams are irradiated, the plurality of irradiated light beams are deflected by a deflecting means and divided scanning is performed on each scanning line of a photoconductor by the deflected plurality of light beams, the light scanning device further comprising: a storage means for storing image data for a plurality of scanning lines, corresponding to each of the image forming ranges formed by scanning the scanning line with the plurality of light beams; and an adjusting means in which when the distance between a scanning line scanned by a predetermined light beam of the plurality of light beams and another scanning line scanned by another light beam adjacent to the predetermined light beam is larger than a predetermined value, when the scanning line is scanned once, the image data of the predetermined light beam and the image data of the other light beam are selectively read from the storage means so that the distance is within the predetermined value and further when the scanning line is scanned, adjustment is carried out so that the predetermined light beam and the other light beam are each irradiated based on their respective read image data.

According to a fourth aspect of the invention, a light scanning device is provided wherein a plurality of light beams are irradiated, the plurality of irradiated light beams are deflected by a deflecting means and divided scanning is performed on each scanning line by the deflected plurality of light beams, the light scanning device further comprising: an adjusting means in which when the distance between a scanning line scanned by a predetermined light beam of the plurality of light beams and another scanning line scanned by another light beam adjacent to the predetermined light beam is less than a predetermined value, as a result of scanning the scanning line once, an image forming range in which the scans by the predetermined light beam and the other light beam overlap is provided for scanning the scanning line, and further adjustment is carried out so that the total incident light volume for each dot of the predetermined light beam striking the image forming range which is scanned overlappingly, and the other light beam, is substantially equal to the incident light volume for each dot of the predetermined light beam striking the image forming range other than the image forming range which is scanned overlappingly, and the other light beam.

It is permissible to construct the light scanning device according to the third or fourth aspect of the invention so as to further comprise: a light receiving means for receiving a light beam passing through a predetermined position in front of a position where the light beam first strikes the image forming range and a predetermined position behind a position where the light beam last strikes the image forming range when the photoconductor is scanned with the plural light beams, wherein the adjusting means determines whether or not the interval is more than the predetermined value based on the light receiving condition of the light receiving means after the scanning line is scanned once.

It is permissible to construct the light scanning device according to each aspect of the invention so that the length of a beam diameter in the direction of the scanning of a light beam striking a deflecting face for deflecting a plurality of light beams of the deflecting means is larger than the length of the deflecting face in the direction of the scanning.

That is, the light scanning device according to the first aspect of the invention irradiates a plurality of light beams, deflects the plurality of irradiated beams and performs divided scanning on a single scanning line of a photoconductor with the plurality of the deflected light beams. The deflecting means may include a polygon mirror, galvanometer mirror and the like.

Because the plurality of light beams are deflected by a single deflecting means, no dispersion in the scanning angle of the respective light beams means occurs unlike cases in which a plurality of light beams are deflected by a plurality of deflecting means.

If the beam diameter in the scanning direction of a light beam striking the deflecting face for deflecting a plurality of light beams of the deflecting means is longer than the length of the deflecting face in the scanning direction, even if there occurs a location having a locally different deflecting angle from the other locations in the deflecting face, a light beam reflected by that location becomes just one part of the entire light beam so that the error is kept extremely slight. This is because a plurality of light beams are deflected by a wide deflecting face including that location.

When a scanning line is scanned, the detection means detects a light beam passing through at least one of either a predetermined position in front of a position where the light beam first strikes the image forming range of a photoconductor or another predetermined position behind a position where the light beam last strikes the image fromeing range of a photoconductor.

Namely, the three embodiments of the detection means include a first embodiment where a light beam passing through a predetermined position in front of a position where the light beam first strikes the image forming range of a photoconductor is detected, a second embodiment where a light beam passing through a predetermined position behind a position where the light beam last strikes the image forming range of a photoconductor is detected and a third embodiment where a light beam passing through a predetermined position in front of a position where the light beam first strikes the image forming range of a photoconductor and another predetermined position behind a position where the light beam last strikes the image forming range of a photoconductor is detected.

The oscillating means oscillates a specified number of clocks in an interval of time from when the light beam is detected by the detecting means until the light beam is detected again. Namely, in the first embodiment, the oscillating means oscillates a specified number of clocks in an interval of time from when a light in front of a position where beam passing through a predetermined position in front of a position where the light beam first strikes the image forming range of a photoconductor is detected until the light beam is detected again. In the second embodiment, the oscillating means oscillates the specified number of clocks in an interval of time from when a light beam passing through a preliminarily determined position behind a position where the light beam last strikes the image forming range of a photoconductor is detected until the light beam is detected again.

The adjusting means adjusts the plurality of light beams so that they are irradiated according to the clock oscillated by the oscillating means.

When a scanning line is scanned, a specified number of clocks are oscillated in an interval of time from when a light beam passing through at least one of either a predetermined position in front of a position where the light beam first strikes the image forming range of a photoconductor or another predetermined position behind a position where the light beam last strikes the image forming range of a photoconductor is detected, until the light beam is detected again. Consequently, a specified number of clocks are oscillated in each of the plurality of scanning lines when each line is scanned.

Then, because the plurality of light beams are irradiated based on the oscillated clocks, even if unevenness occurs in the deflecting speed of the deflecting means, dots can be formed at specified intervals in each of the plural scanning lines when each line is scanned. Thus, it is possible to prevent an discontinuities occurring between images formed by the plurality of light beams.

The light scanning device according to the second aspect of the invention is so constructed that the plurality of light beams are irradiated, the plurality of irradiated light beams are deflected by a deflecting means and divided scanning is performed for each scanning line of a photoconductor by the deflected plurality of light beams.

The adjusting means adjusts the irradiation timing of at least one of either a predetermined light beam or another light beam according to information on the shortest distance in the scanning direction between the foremost dot of an image forming range and the rearmost dot of another image forming range, the image forming ranges being formed by scanning the scanning line with the predetermined light beam of the plurality of light beams and the other light beam adjacent to the predetermined light beam.

The information about the aforementioned shortest distance can be obtained as follows.

First, the scanning line is scanned with a plurality of light beams. A specified pattern image is formed in the scanning direction and in a direction perpendicular to that direction. The formed image is read by an image reading means (CCD sensor) and the aforementioned information is obtained based on the read information.

Second, the detection means, when the scanning line is scanned, detects a light beam passing through a predetermined first position in front of a position where the light beam first strikes the image forming range of a photoconductor and another predetermined second position behind a position where the light beam last strikes the image forming range of a photoconductor. When the scanning line is scanned once, the oscillating means oscillates a specified number of clocks in an interval of time from when a light beam passing through at least one of either the first position or second positions is detected until the light beam passing through at least one of either the first or second positions is detected again. The counting means, when the scanning line is scanned once, counts clocks oscillated in a time interval after a light beam passing through the first position is detected, until the light beam passing through the second position is detected. Then, the counted clocks are compared with a predetermined number thereof. The result of that comparison corresponds to the information about the aforementioned foremost dot and shortest distance. That is, if the beam paths of the plurality of light beams are proper, the aforementioned clock number coincides with the predetermined number. However, if the beam paths of the plural light beams deviate from the proper paths, the clock number does not coincide with the predetermined number, and this difference corresponds to the information about the shortest distance.

Here, the information about the shortest distance corresponds to the deviation amount of the joint between images formed with a plurality of light beams. Thus, because the shortest distance is used as the predetermined value, it is possible to prevent discontinuities occurring between the formed with a plurality of light beams.

The light scanning device according to the third aspect of the invention is so constructed that a plurality of light beams are irradiated, the plurality of irradiated light beams are deflected by a deflecting means and divided scanning is performed for each scanning line of a photoreceptor by the deflected plurality of light beams, in the same way as the light scanning device according to the first aspect thereof.

The storage means stores image data for a plurality of scanning lines, corresponding to each of the image forming ranges formed by scanning the scanning line with the plurality of light beams.

It is permissible to construct the storage means with a first storage means in which image data corresponding to each of the image forming ranges formed by scanning the scanning line with the plurality of light beams are stored in bulk, and a second storage means in which image data read from the first storage means corresponding to each of the image forming ranges formed by scanning the scanning line with a plurality of light beams are stored so as to correspond to each of the plurality of light beams.

The adjusting means is constructed so that when the distance between a scanning line scanned by a predetermined light beam of the plurality of light beams and another scanning line scanned by another light beam adjacent to the predetermined light beam when the scanning line is scanned once, is larger than a predetermined value, the image data of the predetermined light beam and the image data of the other light beam are selectively read from the storage means so that the distance is within the predetermined value, and further, when the scanning line is scanned, adjustment is carried out so that the predetermined light beam and the other light beam are each irradiated based on their respective read image data. The predetermined value mentioned here refers to the distance between adjacent scanning lines of the plurality of scanning lines swept by a predetermined light beam and another light beam, the predetermined value being determined by a plurality of scannings.

The distance between a scanning line scanned by a predetermined light beam and another scanning line scanned by another light beam adjacent to the predetermined light beam when the scanning line is scanned once, corresponds to the deviation amount of each joint between images formed by the plurality of light beams. Because the distance is adjusted to be less than the predetermined value if the distance is over the predetermined value, it is possible to prevent discontinuous joints occurring between the images formed by the pluality of light beams.

If the aforementioned scanning line is for example, the main scanning line, the second aspect of the invention is capable of making adjustments so as to eliminate deviations in the main scanning direction of the discontinuous joints between images formed by a plurality of light beams. The third aspect of the invention is capable of making adjustments so as to eliminate deviations in the auxiliary scanning lines of the discontinuous joints.

The light scanning device according to the fourth aspect of the invention is so constructed that a plurality of light beams are irradiated, the plurality of irradiated light beams are deflected by a deflecting means and divided scanning is performed on each scanning line of a photoreceptor by the deflected plural light beams, in the same way as the first aspect of the invention.

The adjusting means is so constructed that when the interval between a scanning line scanned by a predetermined light beam of the plurality of light beams and another scanning line scanned by another light beam adjacent to the predetermined light beam as a result of scanning the scanning line once, is less than a predetermined value, an image forming range where the scans by the predetermined light beam overlap and the other light beam is provided for scanning the scanning line, and further adjustment is carried out so that the total incident light volume for each dot of the predetermined light beam striking the image forming range which is scanned overlappingly, and the other light beam, is substantially equal to the incident light volume for each dot of the predetermined light beam striking the image forming range other than the image forming range which is scanned overlappingly, and the other light beam.

It is permissible to construct the adjusting means so as to adjust the light intensity of a predetermined light beam and another light beam, or the light emission interval therebetween in order to carry out the above adjustment.

The predetermined value mentioned here refers to a distance between adjacent scanning lines of the plurality of scanning lines swept by a predetermined light beam and another light beam, the predetermined value being determined by a plurality of scannings, as in the aforementioned case.

If the aforementioned interval is less than the predetermined value, an image forming range which is scanned overlappingly is provided. Thus, the image forming range formed by a predetermined light beam is continuous with the image forming range formed by another light beam. Further, an adjustment is carried out so that the total incident light volume for each dot of the predetermined light beam striking the image forming range which is scanned overlappingly, and the other light beam is substantially equal to the incident light volume for each dot of the predetermined light beam striking the image forming range other than the image forming range which is scanned overlappingly, and the another light beam. Therefore it is possible to make the joint between the image forming range which is scanned overlappingly and the image forming range other than the image forming range which is scanned overlappingly unrecognizable.

Here, the aforementioned interval can be found as follows.

First, the scanning line is scanned with a plurality of light beams. A specified pattern image is formed in the scanning direction and in a direction perpendicular to that direction. The formed image is read by an image reading means (CCD sensor) and the aforementioned interval is obtained according to the read image.

Second, when a photoconductor is scanned once with a plurality of light beams, a light beam passing a predetermined position in front of the position where a light beam first strikes the image forming range of a photoconductor, and a predetermined position behind the position where the beam strikes the image forming range of a photoconductor last is received by the light receiving means and the interval is found based on the condition of the light receiving received by the light receiving means when the scanning line is scanned once.

As described above, according to the present invention, it is possible to prevent discontinuous joints occurring between images formed with a plurality of light beams. Thus, the quality of an entire image formed from separate images can be improved.

To achieve the second object of the invention, according to a fifth aspect of the invention, an optical device is provided comprising: a polygon mirror having a plurality of deflecting faces for deflecting light beams converged on the deflecting face to the main scanning direction; light sources for projecting two light beams at the polygon mirror at angles of $+\alpha$ and $-\alpha$ relative to a center line passing through the center of scan position on a plane to be scanned; and a scanning object having a plane to be scanned so that when the polygon mirror is rotated at the angle of $\alpha$, a light beam projected at the angle of $+\alpha$ is deflected at an angle of $-2\alpha$ to 0 in the main scanning direction, and a light beam projected at the angle of $-\alpha$ is deflected at an angle of 0 to $+2\alpha$ in the main scanning direction.

According to the fifth aspect of the invention, because two light beams are projected at the polygon mirror at $\pm\alpha$ which is ½ the angle $\pm 2\alpha$(scanning angle) relative to the center line passing the center of scan position, the two light beams which are deflected by the polygon mirror and lead to the center of scan position have the same beam width. Thus, the two light beams have the same beam diameters at the center of scan position. Consequently, deterioration of image quality due to differences in the line width of recorded images can be prevented. According to the present invention, the striking beam and the deflected beam both have symmetrical properties relative to the center line. Thus, the beam diameters can be made uniform so as to achieve a high image quality. Further, the size of the polygon mirror can be minimized. High speed and high resolution can be achieved as well for the reason that simultaneous divided scanning is employed by this optical device.

It is preferred that the optical device according to the fifth aspect is constructed so that when the number of deflecting faces of the polygon mirror is n, the aforementioned $\alpha$ is set so as to satisfy $$360°/n < \alpha < 360°/n.$$

That is, because the maximum rotation angle of the polygon mirror is not greater than $360°/n$, $\alpha < 360°/n$ is automatically established. If in spite of it being possible in this invention to shorten the focal length of the optical system (optical path length) whereby light beams are converged on deflecting faces, the number n of the faces is increased too much, then $\alpha$ is decreased and the focal length is increased. On the other hand, if $\alpha$ is reduced without increasing the number of the faces, not only is the focal length increased but also ineffective scanning time is also increased. Thus, the energy of a light beam which can be irradiated on the photoconductor per unit of time is also decreased. For these reasons, $\alpha$ is preferred to be set at such a value that the conditions of $360°/n \times 0.6 < \alpha$ are established.

It is permissible to construct the optical device according to the fifth aspect so that beam width in the main scanning direction of each of two light beams converged on the deflecting face of the polygon mirror is larger than the face width in the main scanning direction of the deflecting face (overfilled optical system). Thus, the polygon mirror size can be reduced so that high speed and high resolution can be achieved. Further because the fifth aspect of the invention avoids the disadvantage that the beam diameters on the scanning line become unequal, which is peculiar to the overfilled optical system, the aforementioned effects and high image quality can be achieved at the same time.

When the strength distribution in the main scanning direction of two light beams is not uniform in the overfilled optical system, the way of cutting off the strength distribution of the incident beam to the deflecting face differs depending on the incident angle to the revolving polygon mirror. Thus, the difference in light volume at each position of the scanning line increases.

Thus, when the strength distribution in the main scanning direction of the two light beams is not uniform, the incident positions to the deflecting face of the two light beams converged on the deflecting face of the polygon mirror are changed to different positions so that the light volume distribution on the scanning line becomes substantially uniform. By changing the incident positions of the two light beams, the light volumes on the scanning line become substantially uniform, so that the image quality can be improved. Meanwhile, examples of non-uniform distribution types available include so-called Gausian distribution in which the strength reaches a peak at the incident optical axis.

Although the uniformity in beam diameter can be improved when the overfilled optical system is employed for the optical device according to the fifth aspect of the invention, the ratio of the beam diameter at each position of the scanning line deteriorates depending on the selection of $\alpha$, thereby sometimes badly affecting the image quality.

Thus, $\alpha$ is determined so as to satisfy $$COS(3\alpha \div 2) \div COS(\alpha \div 2) > 0.75$$

The left side of the above formula indicates the ratio between the beam width of a light beam arriving at the center of scan position on the scanning line and the beam width of a light beam at the start of scan position or end of scan position. By setting the ratio according to the above formula, the beam diameter on the scanning line can be contained within its allowable range.

According to a sixth aspect of the present invention, a scanning method for an optical device is provided which comprises light sources for emitting two light beams and a polygon mirror having a plurality of deflecting faces for deflecting the two light beams emitted from the light sources converged on the deflecting face in the main scanning direction, and in which the two light beams deflected by the polygon mirror are swept in the main scanning direction at the same time along each of the scanning lines divided into two at a the center of scan position on a plane to be scanned, the scanning method comprising the step of: projecting the two light beams at the polygon mirror so that the incident optical axes of the two light beams are $+\alpha$ and $-\alpha$ relative to a center line passing through the center of scan position in the main scanning direction, so that when the polygon mirror is rotated at the angle of $\alpha$, the light beam projected at the angle of $+\alpha$ is deflected at an angle of $-2\alpha$ to 0 in the main scanning direction so as to scan one divided line, and the light beam projected at the angle of $-\alpha$ is deflected at an angle of 0 to $+2\alpha$ in the main scanning direction so as to scan the other divided line.

The operations and effects of the sixth aspect of the invention are the same as those of the first aspect thereof.

To achieve the third object of the invention, according to a seventh aspect thereof, a light scanning device is provided comprising: a plurality of light sources for generating light beams; a plurality of light source driving means for driving the plurality of light sources; a scanning means for scanning each of the divided exposure ranges which are provided by dividing an exposure range into a plurality of sections in the main scanning direction with each of the light beams; at least one scanning position detection means for detecting a scanning position; a plurality of light volume detecting means for detecting light volume by receiving a light beam from the light source at a predetermined timing synchronous with the detection output of the scanning position detection means; and a light source control means for controlling the plurality of light source driving means so that the light volumes of the two light beams from the light sources for scanning the two exposure ranges adjacent to each other according to the results from the detection of a plurality of the light volume detecting means are equal in the vicinity of the joint region between the two exposure ranges.

It is permissible to construct the light scanning device according to the seventh aspect so that the light source control means controls the light volume for light beams from the light sources in the vicinity of the joint region between adjacent exposure ranges, according to data indicating areas in which the light source is ON/OFF at the time of modulation based on image data of the exposure range located in front of the joint region in the main scanning direction, of the adjacent two exposure ranges.

Further, it is permissible to construct the light scanning device according to the seventh aspect so that the light source control means does not control the light volume for the light beams from the light sources in the vicinity of the joint region between adjacent exposure ranges if there is no continuity in image data in the vicinity of the joint region between the two adjacent exposure ranges.

In the light scanning device having such a structure, a plurality of light sources for generating a plurality of light beams are driven by a plurality of the light source driving means. The exposure ranges divided in the main scanning direction are scanned with a plurality of light beams by the scanning means. A plurality of light volume detecting means detects light volume by receiving light beams from the light source at a predetermined timing synchronous with the scanning position detection means. The light source control means controls a plurality of the light source driving means so that light volumes of two light beams from the light sources for scanning two exposure ranges adjacent to each other according to the results from the detection of a plurality of the light volume detecting means are equal in the vicinity of the joint region between the two exposure ranges.

According to the seventh aspect thereof, it is possible to equalize the light volumes of two light beams for use in scanning the adjacent exposure ranges in the vicinity of the joint region between the adjacent exposure ranges. That is, according to the seventh aspect thereof, by controlling the light volume according to image information, the light volume at the joint region between the divided exposure ranges formed with a plurality of light beams can be minutely corrected. As a result, it is possible to prevent image distortion and an occurrence of stripe formation in the joint region.

BRIEF DESCRIPTION OF THE ACCOMPANYING DRAWINGS

FIGS. 7A–7C show a structure of SOS sensor.

FIGS. 9A–9F show timing charts for the joint region in the main scanning direction.

FIGS. 14A–14G are timing charts for correction of the joint in the main scanning direction.

DETAILED DESCRIPTION OF THE PREFERRED EMBODIMENTS

Figure 1:
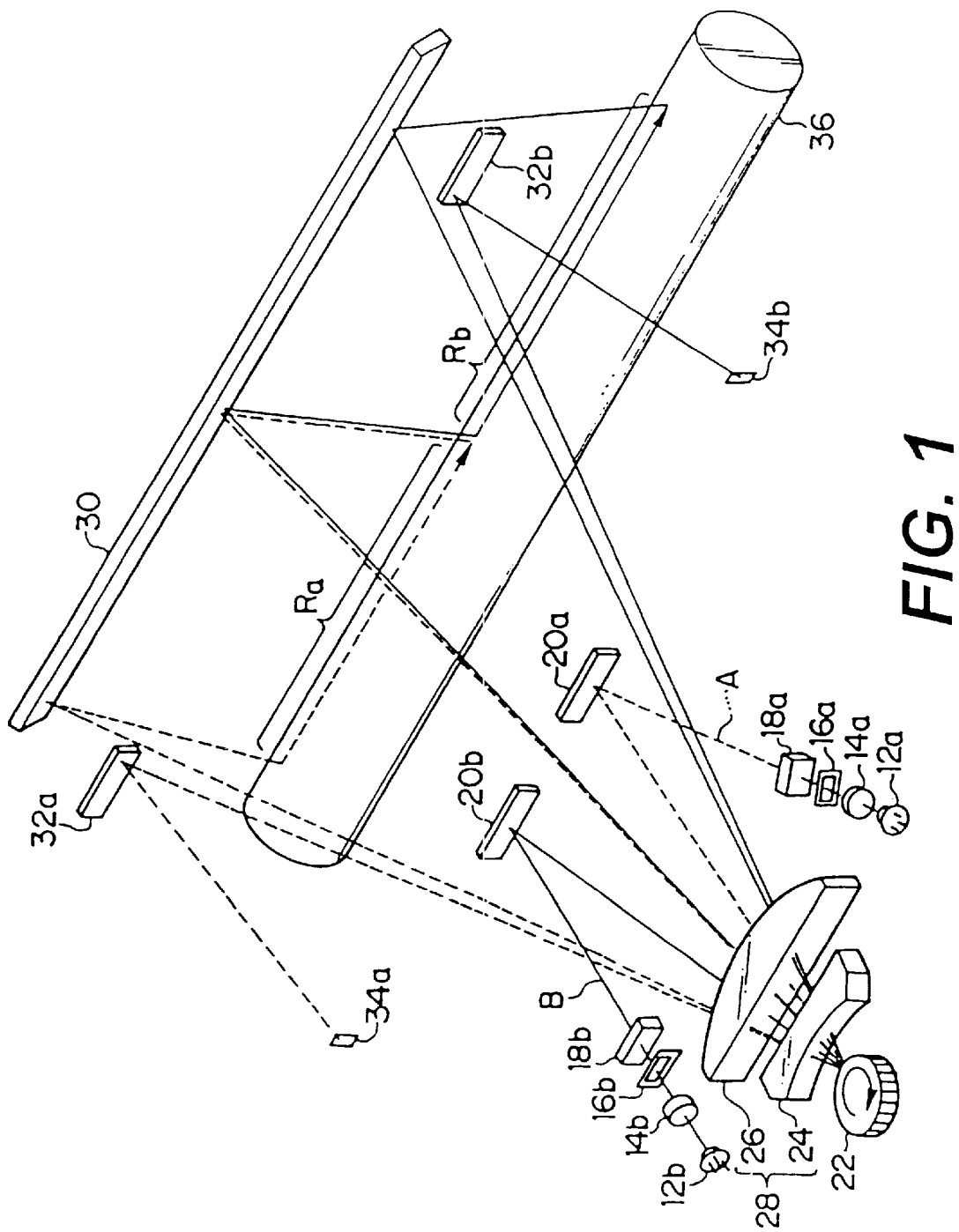
FIG. 1 is a schematic diagram showing a structure of a light scanning device according to the first embodiment.

Hereinafter, a first embodiment of the present invention will be described in detail with reference to the accompanying drawings.

An optical scanning apparatus according to the present embodiment comprises laser diodes 12a, 12b. A laser beam irradiated from the laser diode 12a is referred to as laser beam A and a laser beam irradiated from the laser diode 12b is referred to as laser beam B.

On an optical axis of the laser diode 12a are disposed a collimator lens 14a, a slit 16a, a cylinder lens 18a and a reflection mirror 20a in this order from the vicinity of the laser diode 12a. Likewise, on an optical axis of the laser diode 12b are disposed a collimator lens 14b, a slit 16b, a cylinder lens 18b and a reflection mirror 20b in this order from the vicinity of the laser diode 12b.

On the respective optical axes of the laser diodes 12a, 12b are disposed an fθ lens 28 (first lens 26, second lens 24) and a polygon mirror 22 in this order from the vicinity of the reflection mirrors 20a, 20b. The laser beams A, B reflected (deflected) by the polygon mirror 22 pass through the fθ lens 28 (second lens 24, first lens 26). The length of each deflecting face of the polygon mirror 22 in the scanning direction is shorter than the length of the beam diameter of the laser beams A, B striking that deflecting face (so-called overfilled system). Meanwhile, the scanning line direction is referred to as the main scanning direction and a direction perpendicular to the scanning line direction is referred to as the auxiliary scanning direction.

Further on the optical axes of the laser diodes 12a, 12b are disposed a cylinder mirror 30 and a photoconductor 36 in this order from the vicinity of the fθ lens 28.

A mirror 32a is disposed at a predetermined position in front of the first incident position in the image area of a photoconductor 36 when the photoconductor 36 is scanned by laser beam A. A start-of-scan (hereinafter referred to as SOS) sensor 34a is disposed as a detecting means on an optical axis of the laser beam A reflected by the mirror 32a.

A mirror 32b is disposed at a predetermined position behind the last incident position in the image area of the photoconductor 36 when the photoconductor 36 is scanned by laser beam B. An end-of-scan (hereinafter referred to as EOS) sensor 34b is disposed as a detecting means on an optical axis of the laser beam B reflected by the mirror 32b.

Next, a control system of the light scanning device of the present embodiment will be described.

Figure 2:
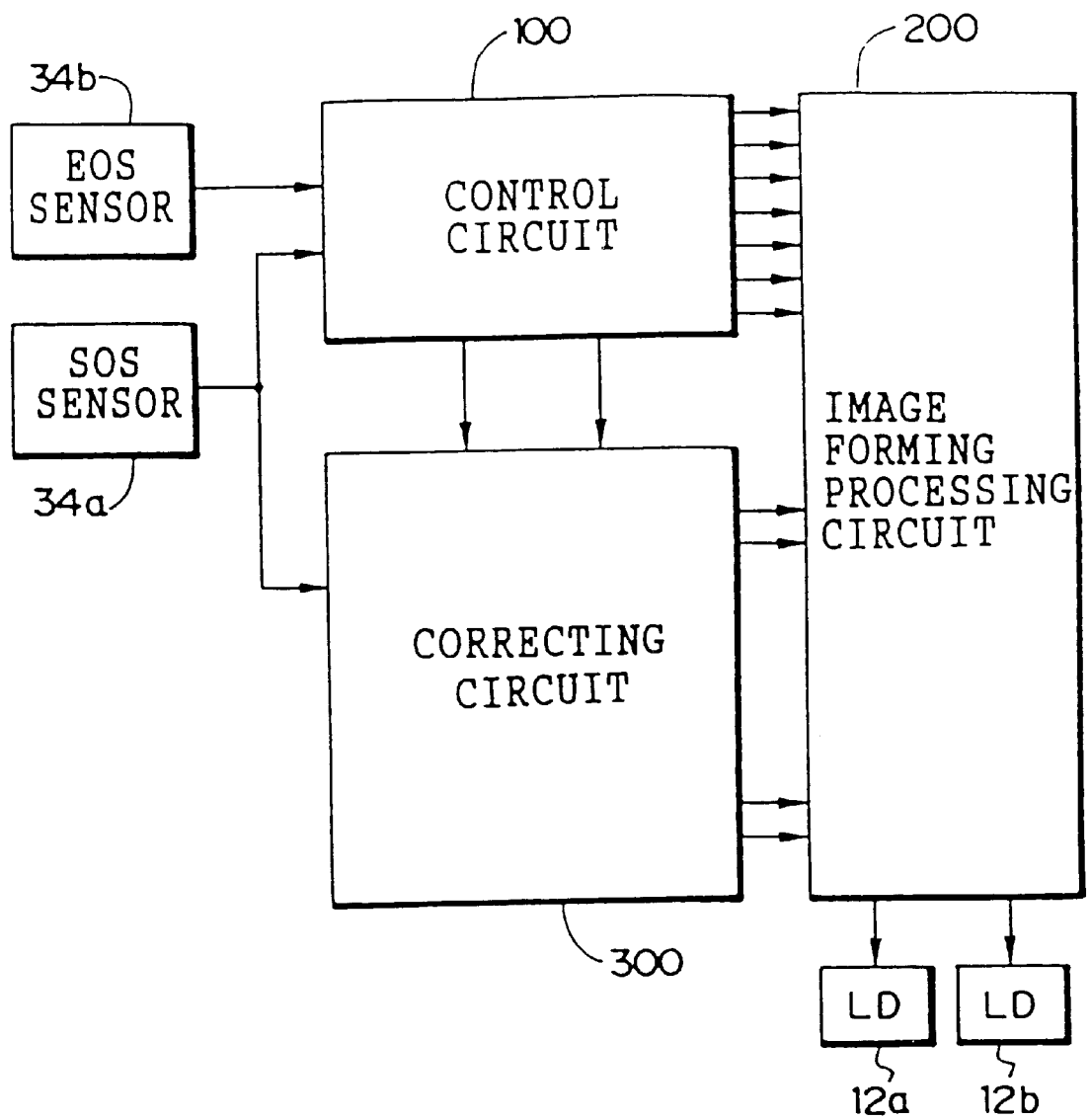
FIG. 2 is a block diagram showing a control system according to the present embodiment.

As shown in FIG. 2, this control system comprises a plurality of CPUs (not shown) and includes a control circuit 100 which is an adjusting means for controlling the operations of the light scanning device.

An SOS sensor 34a, an EOS sensor 34b, an image forming circuit 200 and a correcting circuit 300 are connected to the control circuit 100. Laser diodes 12a, 12b are connected to the image forming circuit 200. An SOS sensor 34a is connected to the correcting circuit 300.

Next, the image forming circuit 200 will be described.

Figure 3:
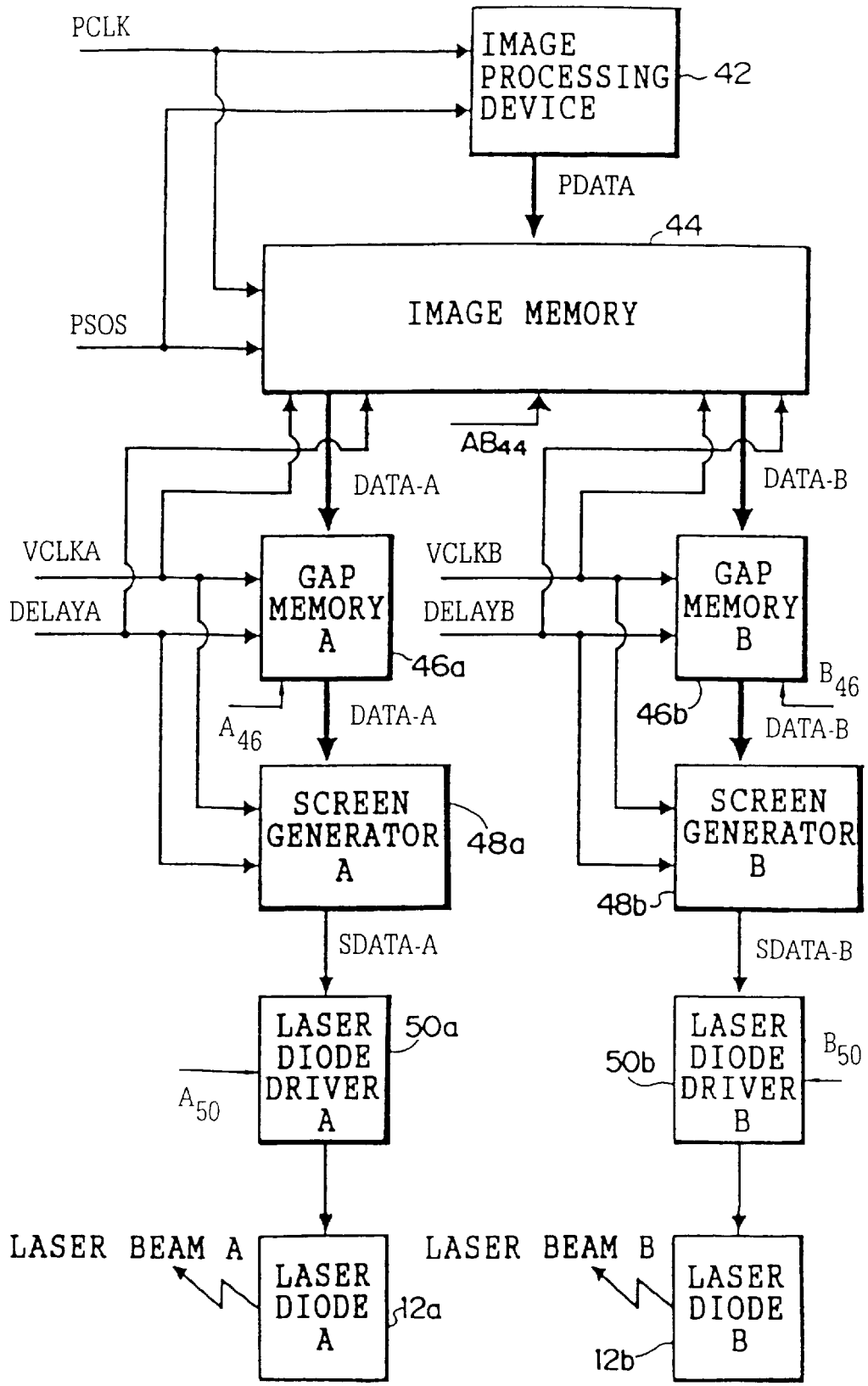
FIG. 3 is a diagram showing an image forming circuit.

As shown in FIG. 3, the image forming circuit 200 contains an image processing device 42 for processing raster image data sent from a printer interface unit (or image input device) (not shown).

An oscillator (not shown) which is included in the control circuit 100 and oscillates an image processing clock (PCLK) and an image processing start of scan signal (PSOS) is connected to the image processing device 42. Further, an image memory 44 is connected thereto as a memory means (first memory means). Meantime, it is permissible to construct the image memory 44 by using a memory having a capacity of several lines (e.g., memory composed of a semiconductor) or a disc device having a capacity of several hundreds pages (e.g., magnetic disc or optical disc).

The aforementioned oscillator, control circuit 100, correcting circuit 300 and gap memories 46a, 46b as memory means (second memory means) are connected to the image memory 44.

The control circuit 100, correcting circuit 300 and a screen generator 48a are connected to the gap memory 46a. A laser diode driver 50a is connected to the screen generator 48a. The control circuit 100 and a laser diode 12a are connected to the laser diode driver 50a.

The control circuit 100, correcting circuit 300 and a screen generator 48b are connected to the gap memory 46b. A laser diode driver 50b is connected to the screen generator 48b. The control circuit 100 and a laser diode 12b are connected to the laser diode driver 50b.

Figure 4:
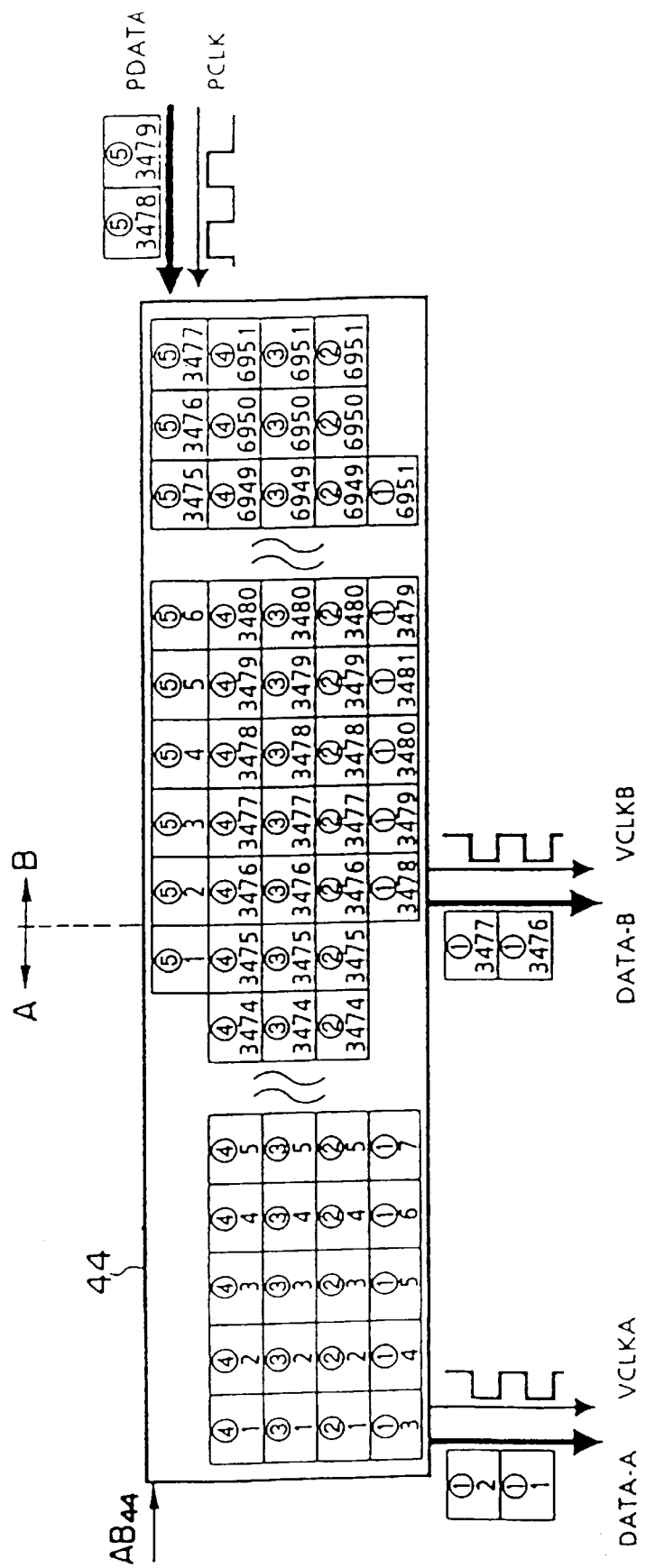
FIG. 4 is a diagram showing image memory.

Here, the image memory 44 will be described. Into the image memory 44 is written image data (PDATA) in units of a scanning line by the image processing clock (PCLK) and the image processing scanning start signal (PSOS), as shown in FIG. 4. The address at which image data is first read by a control signal $AB_{44}$ by the control circuit 100 (two addresses in this embodiment) and the amount of data to be read are specified in the image memory 44. The address and data amount are stored in a register (not shown) within the control circuit 100. Then, by a plurality of reading image clocks (VCLKA, VCLKB) and write timing control signals (DELAYA, DELAYB), the above specified address is assumed to be the first address, and the specified data amounts of image data (DATA-A, DATA-B) are read separately.

According to the present embodiment, the image data of a single scanning line within the image forming area is 6951. According to the control signal $AB_{44}$, the image data DATA-A is composed of 3475 dots of image data stored at positions specified by address 1-3475. The image data DATA-B is composed of 3476 dots of image data stored at positions specified by address 3476-6951.

Figure 5A:
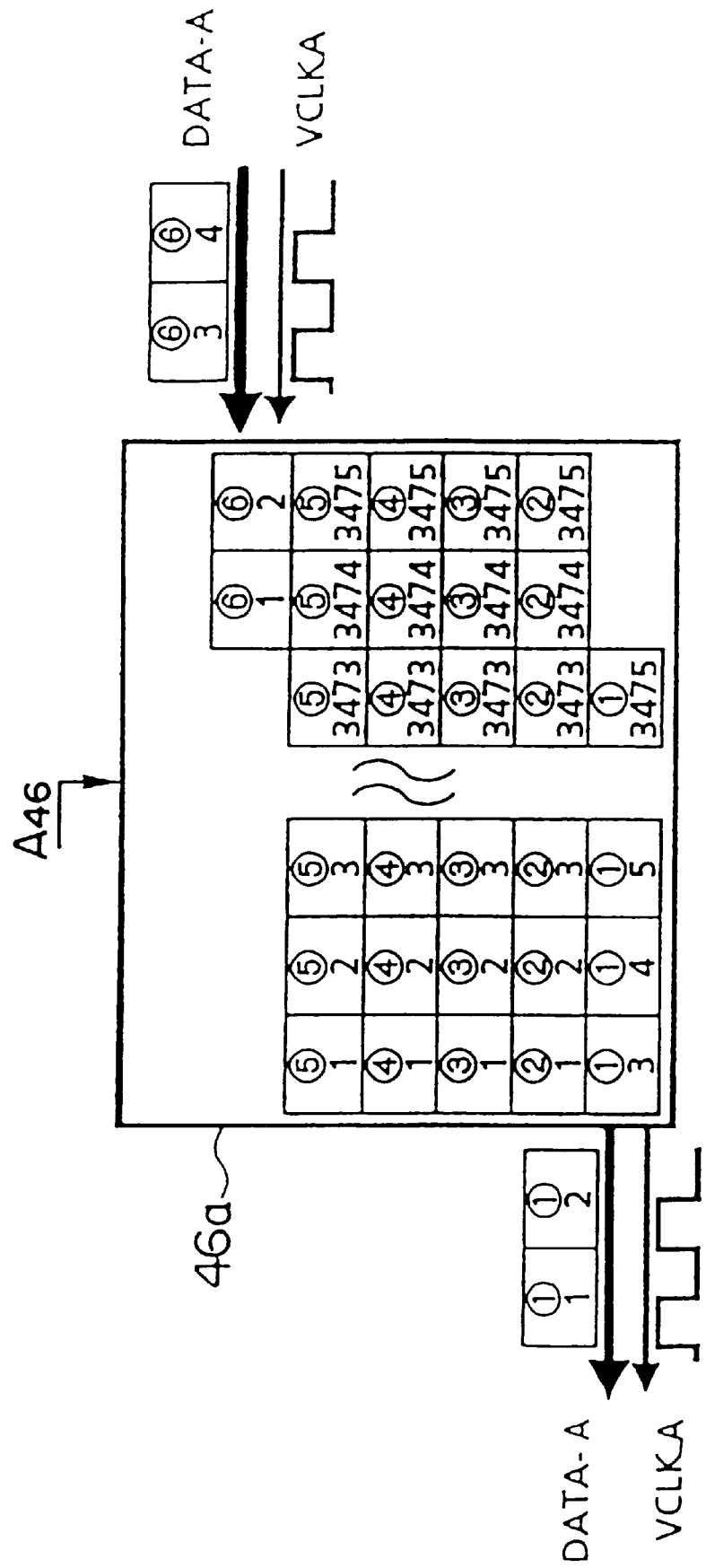
FIG. 5A is a diagram showing one gap memory.
Figure 5B:
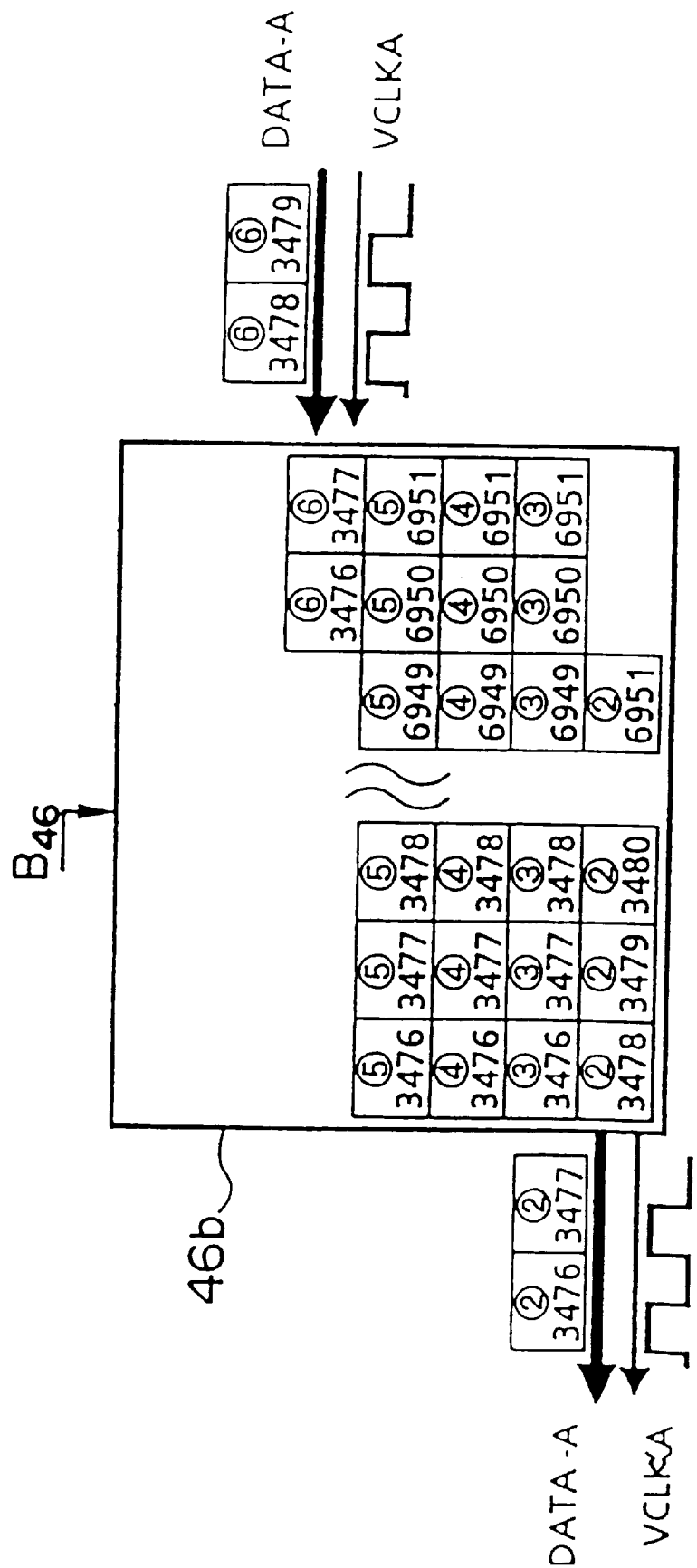
FIG. 5B is a diagram showing another gap memory.

Next, the gap memories 46a, 46b will be described. As shown in FIG. 5A, the gap memory 46a stores the image data DATA-A of a plurality (6 in this embodiment) of scanning lines (see (1)–(6)), and as shown in FIG. 5B, the gap memory 46b stores the image data DATA-B of a plurality (5 in this embodiment) of scanning lines (see (2)–(6)).

The image data which is read, either DATA-A and DATA-B, where the image data from the plurality of scanning lines is recorded, is selected from the gap memories 45a or 46b, according to the control signal A46 or B46 from te respective control circuits 100.

Figure 6:
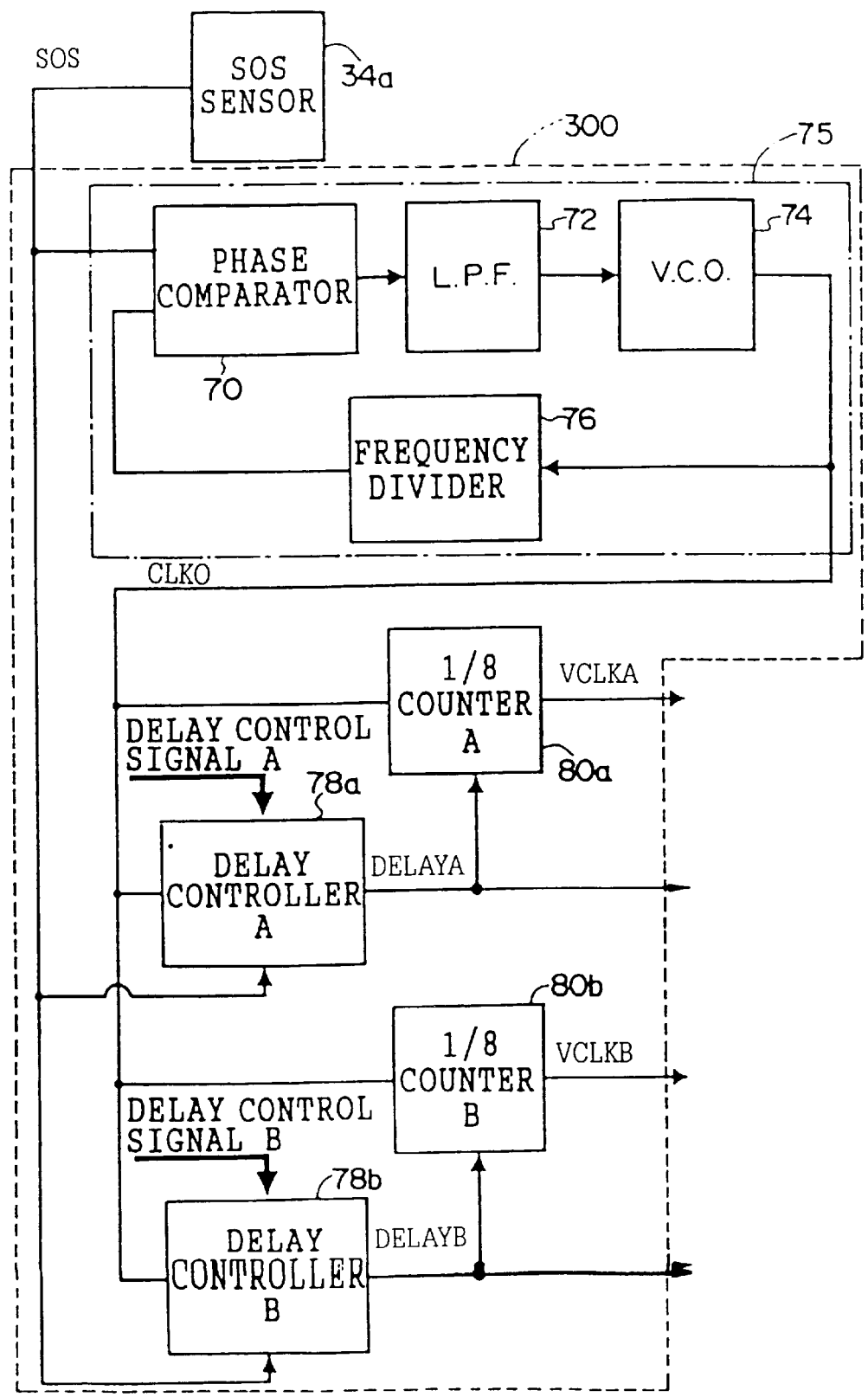
FIG. 6 is a diagram showing a correction circuit.

Next, the correcting circuit 300 will be described. As shown in FIG. 6, the correcting circuit 300 includes a phase-locked-loop (PLL) synthesizer 75 as an oscillating means. The PLL synthesizer 75 contains a phase comparator 70 connected to the SOS sensor 34a. A low pass filter (LPF) 72 is connected to the phase comparator 70 and a voltage control oscillating circuit (VCO) 74 is connected to the low pass filter 72. A frequency divider 76 is connected to the voltage control oscillating circuit 74. The phase comparator 70 is connected to the frequency divider 76.

Delay controllers 78a, 78b and 1/8 counters 80a, 80b are connected between the voltage control oscillating circuit 74 and the frequency divider 76 of the PLL synthesizer 75.

The SOS sensor 34a, the 1/8 counter 80a, the image forming circuit 200 and the control circuit 100 are connected to the delay controller 78a. The SOS sensor 34a, the 1/8 counter 80b, the image forming circuit 200 and the control circuit 100 are connected to the delay controller 78b.

The SOS sensor 34a and EOS sensor 34b will be described next, however, because they are of the same configuration only the EOS sensor will be explained below.

As shown in FIGS. 7A–7C, a plurality of SOS sensors 34a (2 in the present embodiment) are disposed in an auxiliary scanning direction perpendicular to the scanning line of laser beam A. The SOS sensor comprises two light receiving elements (photodiodes) $82N_1$, $82N_2$ as a light receiving means for receiving laser beam A striking the SOS sensor 34a. The light receiving elements $82N_1$, $82N_2$ output a signal having a strength proportional to the amount of received light when they receive the laser beam.

Figure 8:
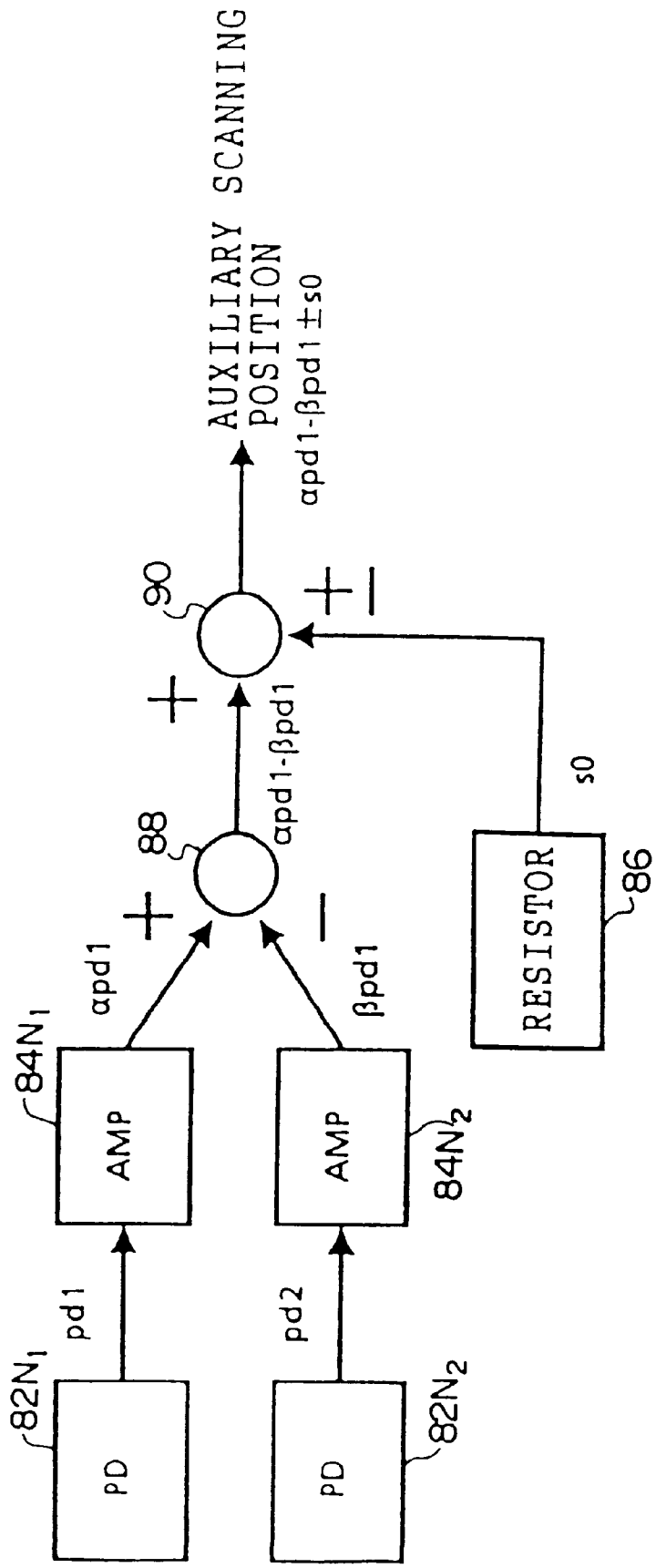
FIG. 8 is a block diagram for obtaining an auxiliary scanning position of a scanning line.

Next, the control circuit 100 will be described. As described previously, the control circuit 100 contains a plurality of CPUs for controlling the operations of the light scanning device, registers, oscillators and the like. As shown in FIG. 8, the control circuit 100 contains amplifiers $84N_1$, $84N_2$ connected to light receiving elements $82N_1$, $82N_2$ composing the SOS sensor 34a for amplifying a signal outputted from the light receiving elements $82N_1$, $82N_2$. A subtractor 88 is connected to the amplifiers $84N_1$, $84N_2$. A subtractor 90 connected to a register 86 is connected to the subtractor 88. Further, the control circuit 100 contains the same elements as the light receiving elements $82N_1$, $82N_2$, composing the SOS sensor 34a, as the light receiving elements composing the EOS sensor 34b (not shown in Fig.).

Operations of the light scanning device of the present invention will be described next.

Laser beam A emitted from the laser diode 12a blinks according to the image data DATA-A and passes through the collimator lens 14a, the slit 16a, the cylinder lens 18a. The laser beam A is then reflected by the reflection mirror 20a and passes through the fθ lens 28 (in order of first lens 26 then second lens 24) and finally strikes the polygon mirror 22. The polygon mirror 22 deflects the laser beam A by rotating, so that the laser beam A passes through the fθ lens 28 (in order of second lens 24 then first lens 26) again. The laser beam A is reflected by the cylinder mirror 30 so that it scans the front half $R_a$ of the image area of the photoconductor 36. The laser beam A before scanning the image area is reflected by the mirror 32a and strikes the SOS sensor 34a. The SOS sensor 34a then generates an SOS signal which determines the start timing of the writing operation in the main scanning direction.

Laser beam B emitted from the laser diode 12b blinks according to the image data DATA-B and passes through the collimator lens 14b, the slit 16b, the cylinder lens 18b. The laser beam B is then reflected by the reflection mirror 20b and passes through the fθ lens 28 (in order of first lens 26 and second lens 24) and finally strikes the polygon mirror 22. The polygon mirror 22 deflects the laser beam B by rotating, so that the laser beam B passes through the fθ lens 28 (in order of second lens 24 and first lens 26) again. The laser beam B is reflected by the cylinder mirror 30 so that it scans the rear half $R_b$ of the image area of the photoconductor 36. The laser beam B before scanning the image area is reflected by the mirror 32b and strikes the EOS sensor 34b. The EOS sensor 34b then generates an EOS signal which determines the end timing of the writing operation in the main scanning direction.

Next, operations of the image forming circuit 200 when the laser beams A, B are blinked according to image data will be described.

Raster image data sent from the aforementioned printer interface unit (or an image input unit) is processed in the image processing device 42. The image processing device 42 transmits image data in units of a scanning line according to the image processing start of scan signal (PSOS), from the oscillator, and for each dot according to the image processing clock (PCLK). The image memory 44 stores the image data in units of a scanning line according to the image processing start of scan signal (PSOS) and for each dot according to the image processing clock (PCLK).

According to the control signal $AB_{44}$ from the control circuit 100, the address and data amount for reading image data DATA-A, DATA-B are specified in the image memory 44. According to a plurality of reading image clocks (VCLKA, VCLKB) and write timing control signals (DELAYA, DELAYB), image data (DATA-A, DATA-B) are read independently from the specified address of the image memory 44. Further, according to the plurality of reading image clocks (VCLKS, VCLKB) and write timing control signals (DELAYA, DELAYB), the aforementioned read image data DATA-A is written into the gap memory 46a and the aforementioned read image data DATA-B is written into the gap memory 46b.

Together with the writing of the image data DATA-A, the already written image data DATA-A from the gap memory 46a is outputted to the screen generator 48a, and likewise together with the writing of the image data DATA-B, the already written image data DATA-B from the gap memory 46b is outputted to the screen generator 48b.

The screen generators 48a, 48b convert inputted image data (DATA-A, DATA-B) to binary data and the binary image data (DATA-A, DATA-B) is converted to current switching by the laser diode drivers 50a and 50b, so that the laser diodes 12a, 12b blink corresponding thereto.

As described above, operations of the correcting circuit 300 when the laser beams A, B blink according to the image data will be described.

When the laser beam A before scanning the image area is reflected by the mirror 32a so that it strikes the SOS sensor 34a, an SOS signal is outputted from the SOS sensor 34a and inputted to the PLL synthesizer 75 and delay controller 78a, 78b.

As shown in FIGS. 9A, 9B, the PLL synthesizer 75 oscillates the oscillating clock CLK0 whose phase synchronizes with the inputted SOS signal.

The oscillating clock CLK0 is inputted to the delay controllers 78a, 78b and the 1/8 counters 80a, 80b.

As shown in FIGS. 9A, 9B, 9E, the delay controllers 78a, 78b reset (boot) write timing control signals (DELAYA, DELAYB) in synchronism with the SOS signal.

The delay controllers 78a, 78b begin counting the number of inputs of the oscillating clock CLK0 from the time the write timing control signals (DELAYA, DELAYB) are reset. Then, when the oscillating clocks CLK0 are counted to a number corresponding to the time taken from when the SOS signal is inputted until the laser beam A strikes the first dot in the image area of the photoconductor 36, plus a time specified by delay amount control signals A and B, which will be described later, reset of the write timing control signals (DELAYA, DELAYB) is terminated (broken).

The 1/8 counters 80a, 80b generate image clocks (VCLKA, VCLKB) divided 1/8 after reset of the write timing control signals (DELAYA, DELAYB) is terminated. That is, as shown in FIGS. 9B, 9D, 9F, the 1/8 counters 80a, 80b repeat start-up and shut-down of the image clocks (VCLKA, VCLKB) alternately each time the input of the oscillating clock CLK0 is counted eight times.

Because the write timing control signal (DELAYA, DELAYB) is reset by the delay controllers 78a and 78b each time when the SOS signal is inputted, change-over of the scanning line is indicated to the image memory 44 and gap memories 46a, 46b, and at the same time, writing and reading of each dot of the image data DATA-A, DATA-B are carried out according to the image clocks (VCLKA, VCLKB) from the 1/8 counters 80a and 80b, after the reset of the write timing control signals (DELAYA, DELAYB) is terminated. Consequently, the image data DATA-A, DATA-B is outputted to the screen generators 48a, 48b for each dot, so that the laser diodes 12a, 12b blink for each dot by the laser drivers 50a, 50b.

Meanwhile, according to the present embodiment, when the photoconductor 36 is scanned, the optical beam irradiation timing is adjusted as follows.

That is, as described above, the light scanning device scans by dividing a single scanning line in the main scanning direction by the laser beams A, B. Thus, a final image is formed from a first image formed by laser beam A and a second image formed by laser beam B. In the initial state (normal state) just after the light scanning device is assembled, the first and second image dots are continuous in the main scanning direction and in multiple scanning directions.

However, there may be sometimes caused a discontinuity in the joint between the first and second images because of the reasons described below.

The first reason arises in cases where a plurality of polygon mirrors is provided, and originates in the differences in image write positions caused by errors in the division angles between the several motors (polygon motors) required to rotate the plurality of polygon mirrors. That is, when a plurality of laser beams are made to strike the deflection faces of a plurality of different polygon mirrors, if the angles of the respective deflecting faces relative to each rotating shaft deviate between polygon mirror and polygon mirror, a relative change in the angle between plural laser beams reflected by each polygon mirror occurs, so that a change in dot position occurs at the aforementioned joint.

According to the present embodiment, by projecting the laser beams A, B on the same deflecting face of the polygon mirror 22, a change in dot position at the aforementioned joint is prevented.

The second reason is a change in the image write position within a deflecting face of the polygon mirror 22, due to a change in the scanning speed of the laser beam on the photoconductor 36. That is, if a beam diameter in the scanning direction of the laser beam is smaller than the length of a single deflecting face in the scanning direction of the polygon mirror 22, i.e. what is called an underfilled system, it is so constructed that the laser beam is projected at a part of a deflecting face of the polygon mirror. Thus, with a change in scanning angle, the position of the polygon mirror which the laser beam strikes is moved. At this time, due to warp or the like of the deflecting face, a local change in scanning speed occurs. Because there is a difference between the deflecting faces of the polygon mirror 22, a change in dot position occurs at the image joint.

Because the present embodiment applies to overfilled type light scanning device, the entire surface of the polygon mirror is usually used upon scanning with the laser beam, thereby preventing a change in scanning speed due to warp or the like of a deflecting face of the polygon mirror. Therefore, no change in dot position occurs at the image joint.

Figure 10A:
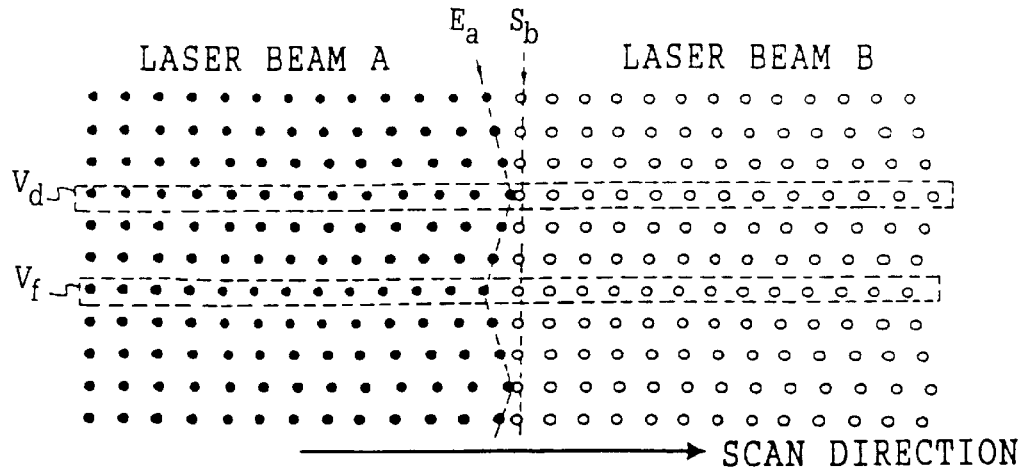
FIGS. 10A–10C show schematic diagrams of changes in the joint region.
Figure 10B:
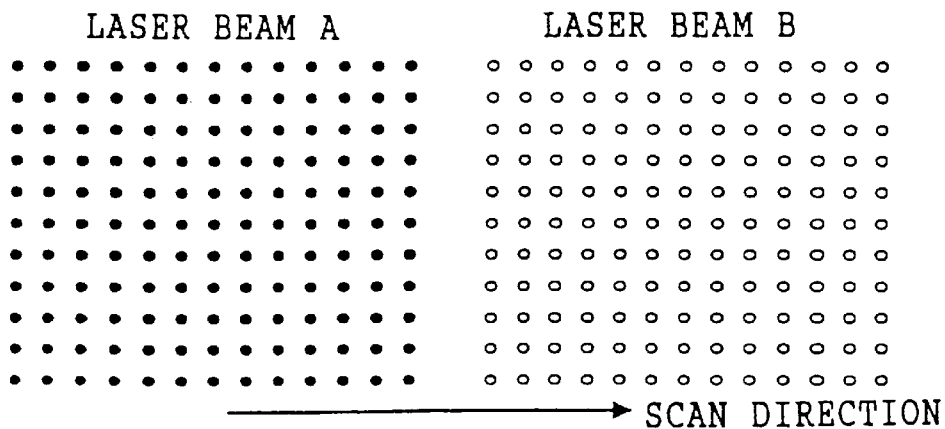
Figure 10C:
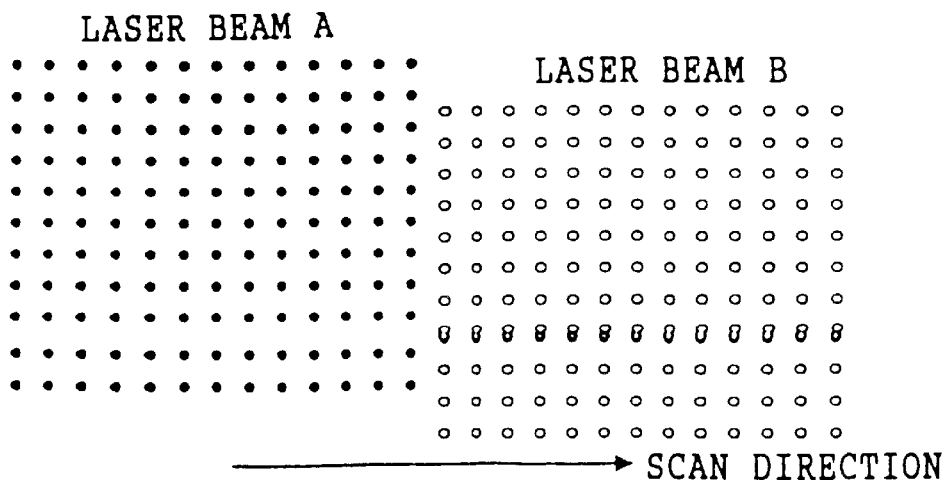

The third reason is unevenness in the rotation speed of the polygon mirror 22. That is, assuming that in the overfilled system, the laser beams A, B are projected at the same deflecting face of the polygon mirror 22, and the laser beams are blinked at a specified frequency, in this case if an unevenness in rotation speed occurs in the polygon mirror 22, as shown in FIG. 10A, for example, the dot interval in the main scanning direction in cases when the rotation speed of the polygon mirror 22 is fast (see the scanning line indicated by symbol $V_f$), is shorter than the dot interval in the main scanning direction in cases when the rotation speed of the polygon mirror 22 is slow (see the scanning line indicated by symbol $V_d$).

On the other hand, the timing for projecting the laser beams A, B at the first dots in the image area of the photoconductor 36 is determined by the input of the SOS signal as described above.

Therefore, the rear dot positions (indicated by arrow Ea) of the first image swing toward the front dot positions of the second image (indicated by arrow Sb) in the auxiliary scanning direction so that the image quality drops markedly.

According to the present embodiment, the following adjustment is executed. Because the number of dots (image elements) on each main scanning line of the photoconductor 36 is specified, the number of dots from the generation of the SOS signal to the generation of the next SOS is also specified. By using this fact, a specified number of oscillating clocks CLK0 is oscillated by means of the PLL synthesizer 75 in synchrony with the phase of the SOS signal in the interval from when the SOS signal is inputted to when the next SOS signal is inputted. Based on the oscillated oscillating clock CLK0, the laser beams A, B are irradiated.

That is, assuming that a specified number of the oscillating clocks CKL0 with the same interval are oscillated in each time interval between the inputs of the SOS signals, even if the time taken for scanning the photoconductor 36 with the laser beams A and B is changed because even in cases where unevenness in the rotation speed of the polygon mirror 22 occurs, the incident positions of the laser beams on the photoconductor 36, corresponding to each of the oscillating clocks CLK0 in each of the auxiliary scanning lines, are the same. Thus, the aforementioned swing does not occur in the auxiliary scanning direction thereby maintaining the image quality.

According to the present embodiment, the oscillating clocks are oscillated as follows. Assuming that the number of dots from one occurrence of the SOS signal to the next occurrence thereof is 8220 and an oscillating clock (CLKO) eight times the frequency of the SOS signal is obtained, then the oscillating frequency from the voltage control oscillating circuit (VCO) 74 is converted to 1/65760=1/(8/8220) by means of the frequency divider 76, and the phase of the SOS signal is compared with that of the oscillating clock (CLKO) by means of the phase comparator 70 and then adjusted.

Figure 11A:
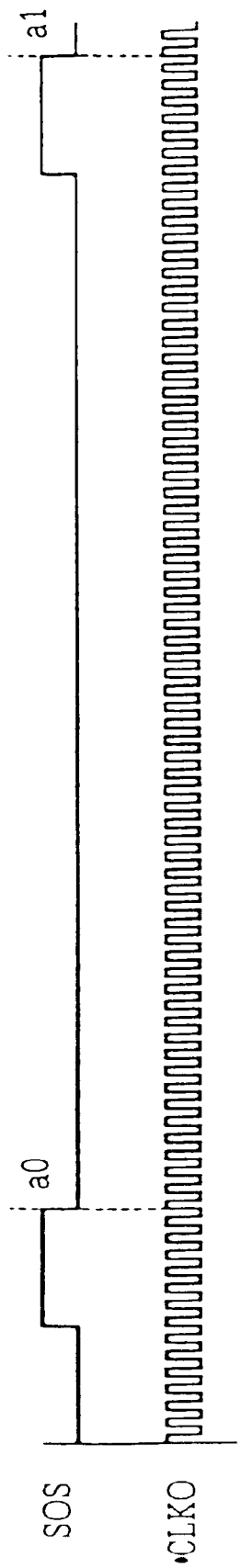
FIGS. 11A, 11B show timing charts of oscillation clocks oscillated by adjustment each time an SOS signal is input from a PLL synthesizer.
Figure 11B:
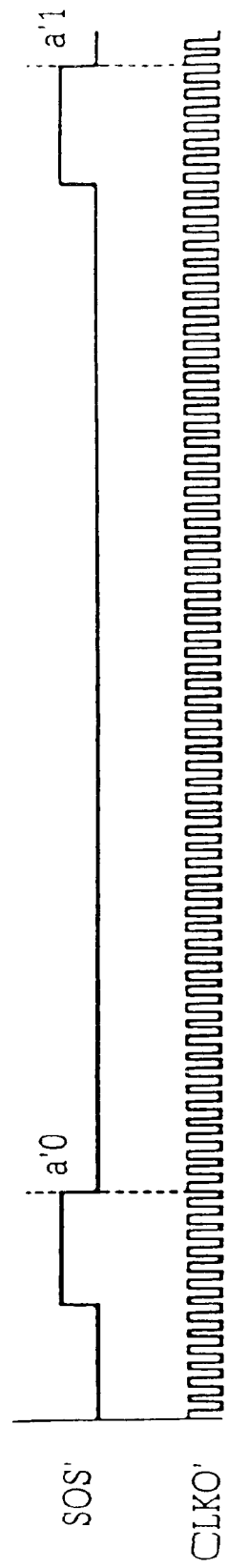

For example, if the rotation speed of the polygon mirror 22 increases, as shown in FIGS. 11A, 11B, the time from an occurrence of the SOS signal to that of the next SOS signal is shortened and the time from boot-up of the SOS signal to breaking thereof is also shortened. Thus, if the phase of the oscillating clock (CLKO) is delayed by the SOS signal, a signal (voltage) proportional to the delay amount is input from the phase comparator 70 through the low pass filter 72 to the voltage control oscillating circuit (VCO) 74. Then, the voltage control oscillating circuit (VCO) 74 oscillates a clock having a frequency proportional to the applied voltage, so that the phase of the SOS signal matches that of the oscillating clock (CLKO). Further, because the frequency divider 76 converts by 1/65760=1/(8×8220), a specified number of oscillating clocks CLKO can be oscillated in the interval from one input of the SOS signal to that of the next SOS signal.

Instead of the SOS signal, it is permissible to oscillate the oscillating clock CLK0 in the above described manner according to the EOS signal. Namely, it is permissible to oscillate a specified number of the oscillating clocks CLK0 in the interval from when the EOS signal is input to when the next SOS signal is input. Further, it is also permissible to oscillate the oscillating clocks in the above described manner according to the SOS signal and the EOS signal. That is, it is permissible to oscillate a specified number of oscillating clocks CLK0 in the interval from when the SOS signal is input to when the EOS signal is input instead of the next SOS signal.

The fourth reason is the laser beam position deviating due to temperature change or shock.

For example, there may sometimes occur cases in which the dot interval in the main scanning direction or auxiliary scanning direction expands or shrinks at the joint between images due to deviations in the position of optical parts or the like, so that image quality drops conceivably.

That is, the minimum distance in the main scanning direction between the foremost dot of one image formation area formed by a single time scanning on the scanning line with the laser beam A and laser beam B, and the rearmost dot of the other image formation area sometimes becomes more than 1.0 dot, or the interval between the scanning lines scanned once by the laser beams A and B sometimes deviates.

Figure 12A:
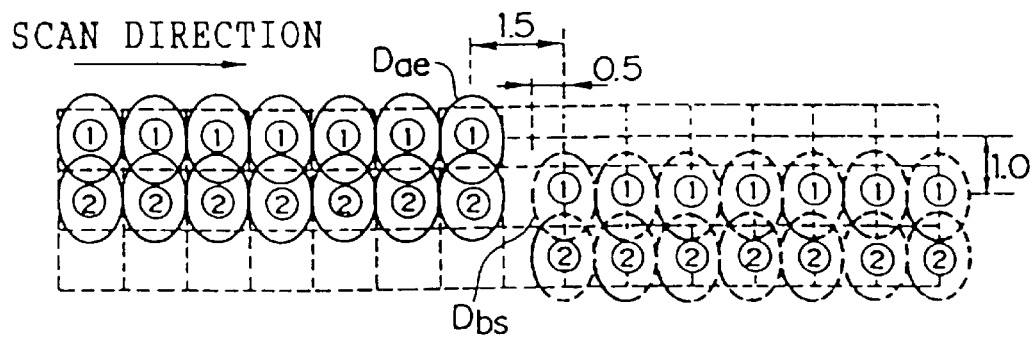
FIGS. 12A–12C are diagrams for explaining corrections of deviation in the main scanning direction and auxiliary scanning direction.

Explaining in further detail, as shown in FIG. 12A, the dot (rearmost dot) Dae which the laser beam A strikes last on a main scanning last, and the dot (foremost dot) Dbs which the laser beam B strikes first on a main scanning line deviate by 1.5 dots in the main scanning direction and by 1.0 dot in the auxiliary scanning direction. That is, the Dbs position deviates by 0.5 dots in the main scanning direction and by 1.0 dot in the auxiliary scanning direction relative to the dot (Dbs) position in the initial state. Meanwhile, the dot Dbs position sometimes deviates in the main scanning direction or in the auxiliary scanning direction relative to the dot (Dbs) position in the initial state.

Figure 13:
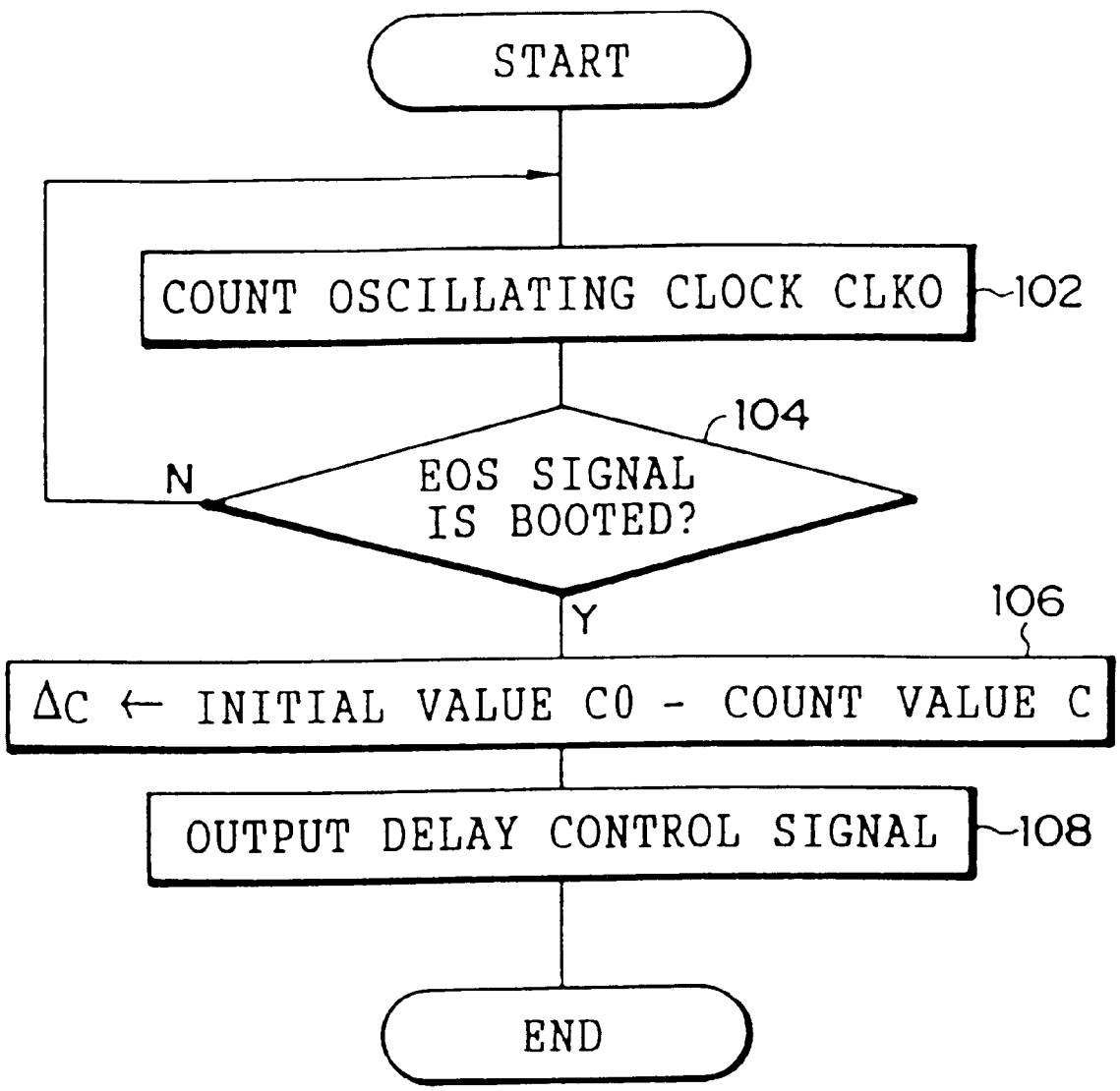
FIG. 13 is a flow chart showing a control routine for correcting a deviation in the main scanning direction.

Firstly, method for correcting the position deviation in the main scanning direction will be described with reference to the control routine shown in FIG. 13.

This routine is started when an SOS signal in the shutdown state is booted, so that the oscillating clock CLK0 is counted until a booted EOS signal is shutdown (step 102, step 104). Steps 102, 104 correspond to a counting means of the present invention.

In next step 106, a count value C is subtracted from the initial value C0 so as to obtain a subtraction value ΔC.

As shown in FIGS. 14A, 14B, the initial value C0 refers to the count value of the oscillating clock CLKO from shutdown (a) of the SOS signal in the initial state up to shutdown (b) of the EOS signal.

If the dot Dbs position deviates from the dot (Dbs) position in the initial state by a distance corresponding to n dots (e.g., 12CLK0 dots) in the main scanning direction, the time from shutdown of the SOS signal until the shutdown of the EOS signal is shortened by n dots. That is, the shutdown time of the EOS signal is shortened by 12CLK0 as shown in FIG. 14F (see b'). At this time, the count value of the oscillating clock CLK0 corresponding to the time from shutdown of the SOS signal until shutdown of the EOS signal is the count value C counted in step 102. Thus, if the count value C is subtracted from the initial value C0, the subtraction value ΔC is the oscillating clock count corresponding to the aforementioned deviation amount in the main scanning direction.

Figure 12B:
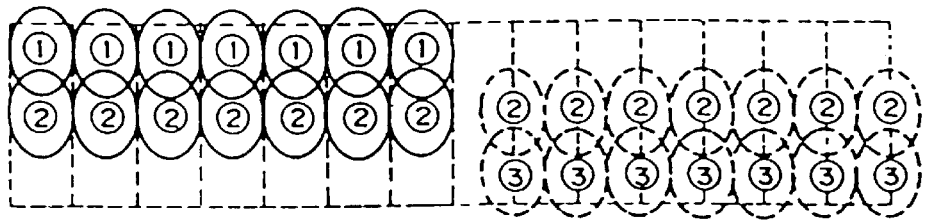
Figure 12C:
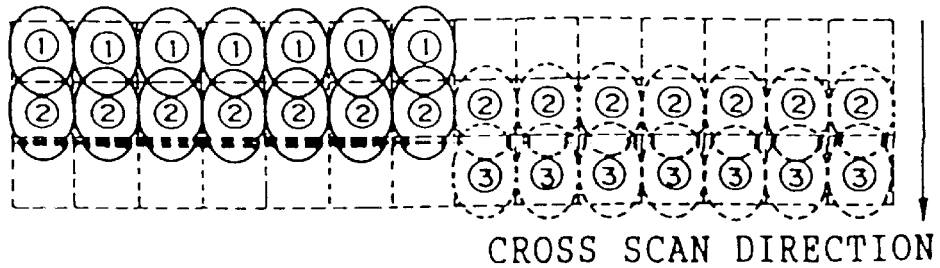

In next step 108, a delay amount control signal is determined depending on the subtraction value ΔC and output to at least one of either the delay controller 78a or the delay controller 78b. That is, according to the present embodiment, the aforementioned deviation amount is fed back to the delay control signal B and output to the delay controller 78b. Consequently, as shown in FIG. 14G, the 1/8 counter 80b can quicken the VCLKB boot timing by 12 clocks of the oscillating clock CLKO. By quickening the VCLKB boot timing by an amount corresponding to the oscillating clocks CLK0 corresponding to a deviation amount in the main scanning direction, the dot Dbs position (see FIG. 12A) which deviates by 0.5 from the dot (Dbs) position can be corrected so as to coincide with the dot (Dbs) position in the main scanning direction, as shown in FIG. 12C, or the dot position deviation in the main scanning direction can be corrected with a high precision.

It is permissible to delay the VCLKA boot timing by 12 clocks in the oscillating clock CLK0, or it is permissible to quicken the VCLKB boot timing by m (e.g., 5) clocks, while the VCLKA boot timing may be delayed by 12−m (=7) clocks.

Figure 15:
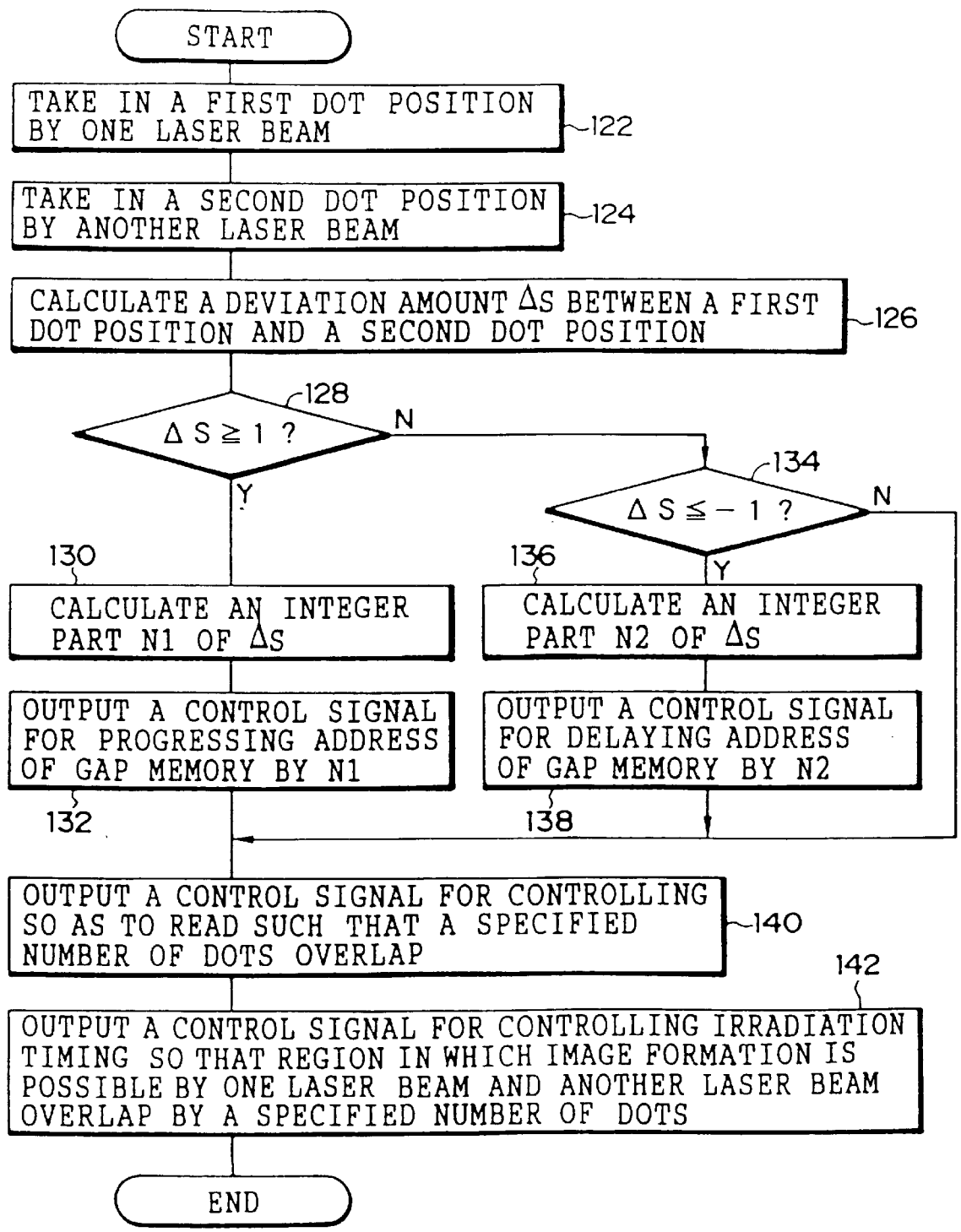
FIG. 15 is a flow chart showing a control routine for correcting a beam position deviation in the auxiliary scanning direction.

Next, a method for correcting the position deviation of the laser beam in the auxiliary scanning direction will be described with reference to the control routine shown in FIG. 15. This correcting method can be classified into cases in which the deviation amount of the dot Dbs position from the dot position (Dbs) of the initial state in the auxiliary scanning direction is more than 1 dot, and cases in which it is less than 1.

In step 122, an auxiliary scanning position by one laser beam (A) is taken and in step 124, an auxiliary scanning position by the other laser beam (B) is taken. The auxiliary scanning position is taken as follows.

As described previously, the SOS sensor 34a is disposed in an auxiliary scanning direction perpendicular to the scanning line by the laser beam A, and comprises two light receiving elements (photodiodes) $82N_1$, $82N_2$ for receiving the laser beam A striking the SOS sensor 34a. The EOS sensor 34b also comprises two light receiving elements (photodiodes).

If the scanning line by the laser beams A, B is moved in the auxiliary scanning direction or in a direction opposite to the auxiliary scanning direction, the amount of light received by one of the light receiving elements $82N_1$ or $82N_2$ is increased, and the amount of light received by the other is decreased. That is, if the scanning line is moved in a direction opposite to the auxiliary scanning direction from its initial state (see FIG. 7A), the amount of light received by the light receiving element $82N_1$ is increased as shown in FIG. 7B and that by the light receiving element $82N_2$ is decreased. On the other hand, if the scanning line is moved in the auxiliary scanning direction from its initial state, as shown in FIG. 7C, the amount of light received by the light receiving element $82N_1$ is decreased and that by the light receiving element $82N_2$ is increased.

Because the light receiving elements $82N_1$, $82N_2$ output a signal having a magnitude corresponding to the amounts of light received, the moving direction and amount moved of the scanning line of the laser beam A can be recognized according to the signals output from the light receiving elements $82N_1$, $82N_2$. Similarly, the moving direction and amount moved of the scanning line of the laser beam B can be recognized in the same manner.

That is, as shown in FIG. 8, the outputs (pd1, pd2) of the light receiving elements $82N_1$, $82N_2$ are amplified by the amplifiers $84N_1$, $84N_2$ and the amplified outputs (αpd1, βpd2) are subjected to subtraction by the subtractor 88. The subtraction values (αpd1−βpd2) are compared to a difference s0 between the outputs of the light receiving elements $82N_1$, $82N_2$ in the initial state preregistered in the register 86 by means of the subtractor 90, so that signals (αpd1−βpd2±s0) indicating the auxiliary scanning position are output. Additionally, signals indicating the auxiliary scanning position of the scanning line of the laser beam B are also output.

In the next step 126, the deviation amount ΔS between a scanning line by the laser beam A, and another scanning line by the laser beam B, taken in this manner, will be calculated.

In step 128, whether or not the deviation amount ΔS is more than 1 is determined. That is, whether or not the scanning line by the laser beam A is located more than 1 dot off in an opposite direction to the auxiliary scanning direction relative to the scanning line by the laser beam B is determined. If the deviation amount ΔS is more than 1 dot as shown in FIG. 12B, an integer part n1 of the deviationΔ amount is calculated, and in step 132, the control signals $A_{46}$, $B_{46}$ for advancing an address of the scanning line of image data to be read from the gap memory 46b by n1, relative to an address of the scanning line of image data to be read from the gap memory 46a, are output to the gap memories 46a and 46b, and then the processing is advanced to step 140. Consequently, the deviation amount ΔS is corrected to be less than 1 dot.

That is, if the scanning line by the laser beam A is determined to be located at a position 1 dot opposite the auxiliary scanning direction relative to the scanning line by the laser beam B, the control signals $A_{46}$, $B_{46}$ are output so as to ensure that the image data whose scanning line address is (2) is read from the gap memory 46b, as shown in FIG. 5B, when the image data whose scanning line address is (1) is read from the gap memory 46a, as shown in FIG. 5A.

On the other hand, if it is determined that the deviation amount ΔS is not more than 1 dot, whether or not the deviation amount ΔS is less than −1 dot is determined in step 134. That is, whether or not the scanning line by the laser beam A is located at a position more than 1 dot off in the auxiliary scanning direction relative to the scanning line by the laser beam B is determined. If the deviation amount ΔS is less than −1 dot, in step 136, the integer part n2 of the deviation amount ΔS is calculated. In step 138, the control signals $A_{46}$, $B_{46}$ are output to the gap memories 46a, 46b so as to delay an address of the scanning line of image data to be read from the gap memory 46b by n2, with respect to an address of the scanning line of image data to be read from the gap memory 46a. The processing then advances to step 140. Consequently, the deviation amount ΔS (absolute value) is corrected to be less than 1 dot.

Further, if the deviation amount ΔS is not more than 1 dot and not less than −1 dot (1>deviation amount ΔS>−1), that is, if the deviation amount ΔS is minute, the processing advances to step 140.

As described above, cases where the processing advances to step 140 are classified as cases in which the deviation amount ΔS is corrected to less than 1 dot by the processings of steps 128–132 or steps 134–138, and cases in which the deviation amount ΔS is not more than 1 dot and not less than −1 dot (1>deviation amount ΔS>−1). Instep 140, the control signal $AB_{44}$ for ensuring that a specified number of dots are read one above the other by adjusting the address to be read first and the data amount to be read is output to the image memory 44. In step 142, as shown in FIGS. 16A to 16E, the delay amount control signals A and B for controlling the irradiation timing of the laser beams A and B so that image areas of the laser beams A and B overlap each other by a specified number of the dots are output to the delay controllers 78a and 78b.

There are cases in which the deviation amount ΔS equals 0 by the processings of steps 128–132 or steps 134–138, and cases in which the deviation amount ΔS is originally 0. In these cases, this routine is permitted to be terminated without executing the processings of steps 140, 142.

The control signals $A_50$ and $B_50$ for making the total of the amount of light of the laser beams A and B of a single dot striking the overlapping portion substantially equal to the light amount of the laser beams A and B of a single dot striking portions other than the overlapping portion are output to the laser diode drivers 50a and 50b.

When the deviation amount ΔS is minute, the irradiation timings of the laser beams A and B are controlled so that the image areas of the laser beams A and B overlap each other by a specified number of dots. Further, the total amount of light striking each of the dots formed by the laser beams A and B in the overlapping portion is controlled so as to be substantially the same as the amount of light striking each of the dots formed by the laser beams A and B in portions other than the overlapping portion, as follows.

Figures 16A, 16B, 16C, 16D, 16E:
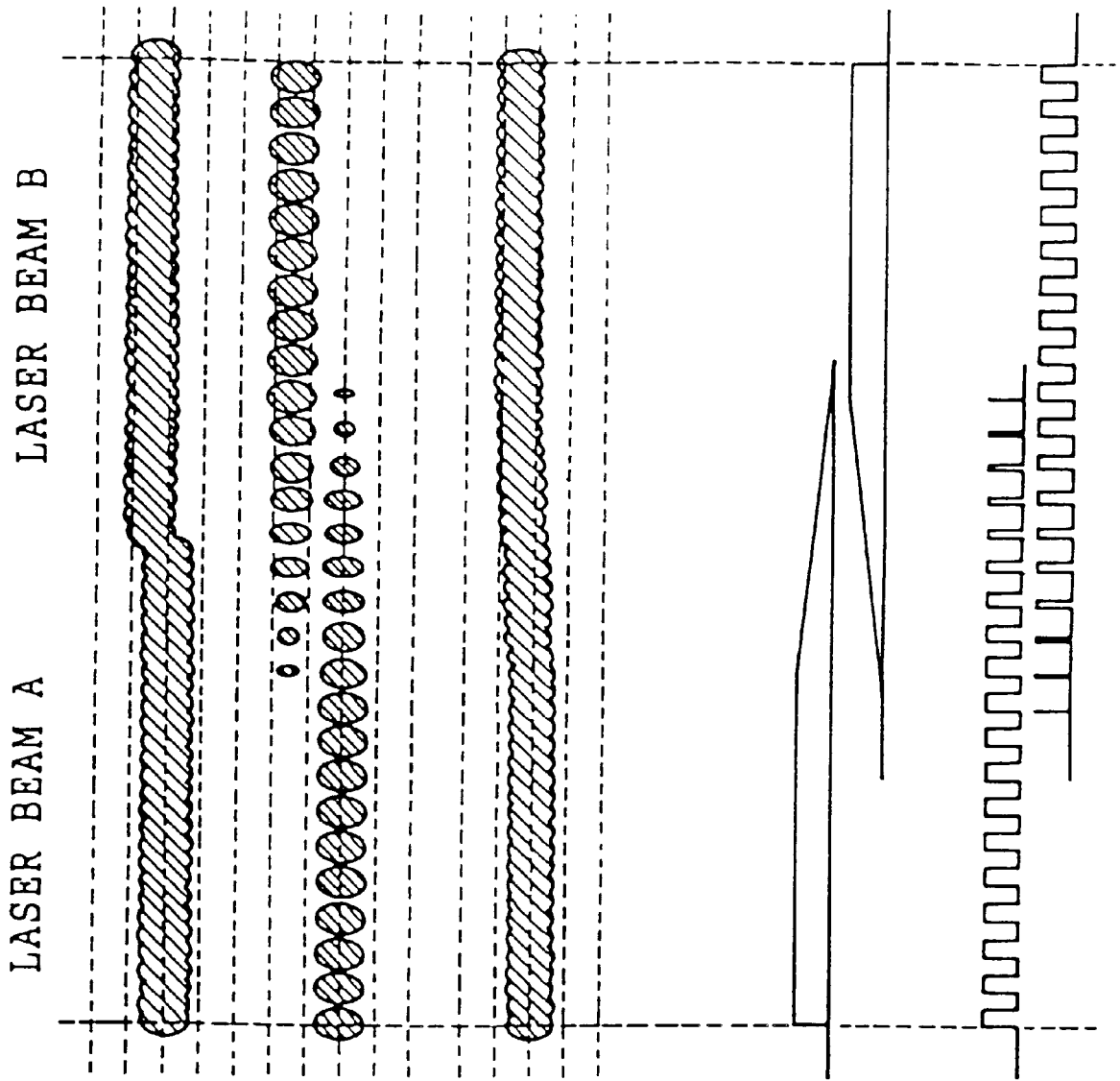
FIGS. 16A–16E are diagrams for correction in cases when an exposure range is provided with overlapping.

That is, as shown in FIG. 16A, if no overlapping is provided, even if the deviation amount ΔS is minute (½ dot), a slight discontinuity can be recognized.

On the other hand, in FIG. 16B, although overlapping is provided, because the deviation amount ΔS is 1.5 dots, the image formed by the laser beam A and the image formed by the laser beam B are discontinuous with each other.

On the other hand, when the deviation amount ΔS is minute, the irradiation timing of the laser beams A and B are controlled so that the image areas of the laser beams A and B overlap each other by a specified number of dots and the total amount of light striking each of the dots, formed by the laser beams A and B in the overlapping portion is controlled so as to be substantially the same as the amount of light striking each of the dots formed by the laser beam A or B in portions other than the overlapping portion. An image formed in this case is recognized as a continuous line as shown in FIG. 16C.

To make the total amount of light striking each of the dots formed by the laser beams A and B in the overlapping portion substantially the same as the total amount of light striking each of the dots formed by the laser beam A or B in portions other than the overlapping portion, it is permissible to gradually decrease the luminous intensity of the laser beam A while gradually increasing the laser beam B in the aforementioned overlapping portion as shown in FIG. 16D, or it is permissible to gradually decrease the pulse width of the laser beam A while gradually increasing the pulse width of the laser beam B in the overlapping portion as shown in FIG. 16E.

According to the embodiments described above, the deviation amount in the main scanning direction of a dot position at a joint between images formed by scanning with a plurality of laser beams is detected by counting oscillating clocks oscillated from a shutdown of the SOS signal until a shutdown of the EOS signal. Alternatively, the deviation amount in the auxiliary scanning direction of a dot position at a joint between images formed by scanning with a plurality of laser beams is detected according to an output from the aforementioned plurality of light receiving elements. However, the present invention is not restricted to this embodiment, and it is permissible to read a resist detection mark formed by the aforementioned light scanning device on the photoconductor or a transfer belt by means of a resist detection sensor (e.g., CCD camera), or it is permissible to detect a printed image directly with the naked eye.

Figure 17:
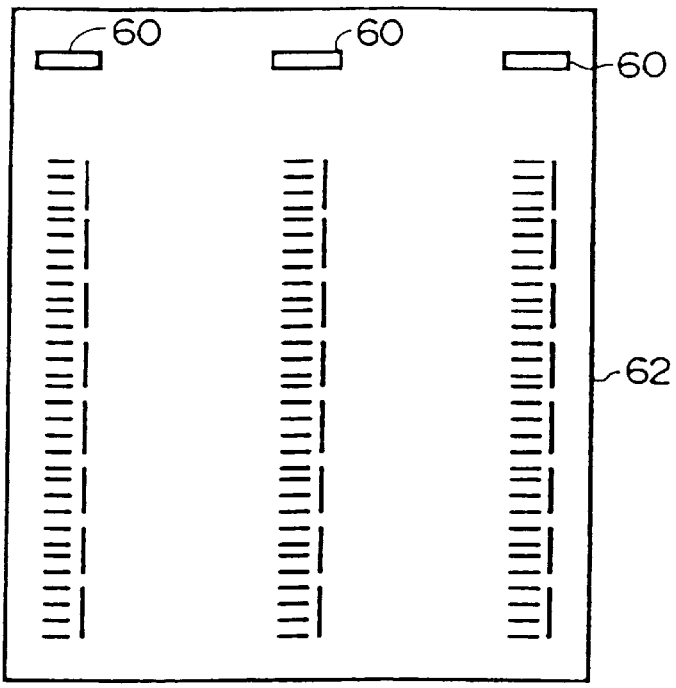
FIG. 17 is a diagram of a transfer belt in which resist detection marks are formed.

As shown in FIG. 17, by scanning the central portion of an image formed on the transfer belt 62 with the laser beams A and B alternately, a plurality of linear images in the main scanning direction and auxiliary scanning direction are formed so as to form the resist detection marks. The resist detection marks are read by the resist detection sensor so that the deviation amount in the main scanning direction is detected by the linear images of the main scanning direction and the deviation amount in the auxiliary scanning direction is detected by the linear images of the auxiliary scanning direction.

Figure 18:
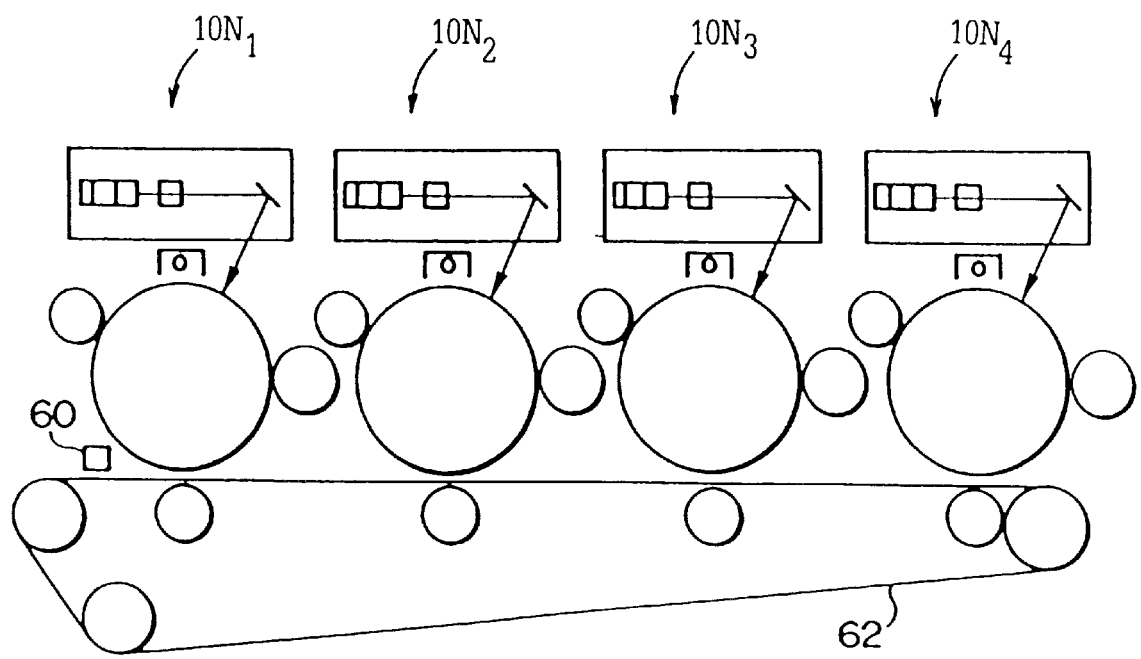
FIG. 18 is a diagram showing a plurality of light scanning devices mounted according to a modification of the present embodiment.

Meanwhile, an example of the light scanning device utilizing the resist detection sensor 60 is shown in for example FIG. 18. This example is of a tandem type in which images formed using a light scanning device for the four colors K, Y, M, C, a photoconductor, and a developer are transferred to the transfer belt 62 one above the other. The resist detection sensor for detecting a deviation in image position of each color detects a relative shift between respective colors and feeds back the result to the light scanning device to correct the color shift.

Although the polygon mirror is used in the aforementioned embodiment, the present invention is not restricted to this example and it is permissible to use a galvanometer or the like.

Further, although laser diodes are used in the aforementioned embodiment, the present invention is not restricted to this example and it is permissible to use LEL or the like.

Next, a second embodiment of the present invention will be described.

Figure 19:
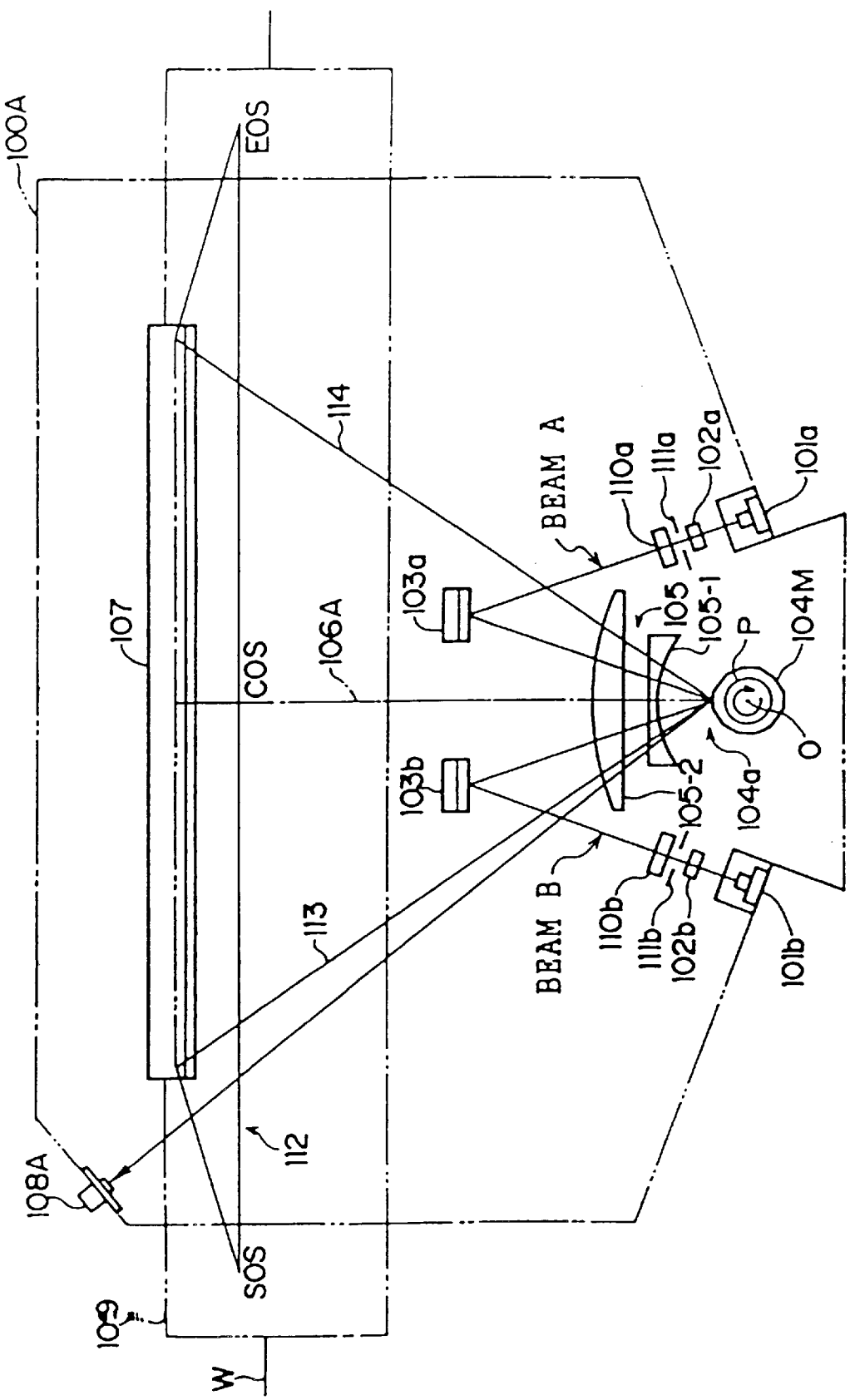
FIG. 19 is a structure diagram of an optical device according to the second embodiment.

FIG. 19 is a top view showing a structure of an optical device according to the second embodiment. As shown in FIG. 19, the optical device of the present embodiment is covered with a case 100A. Within the case 100A, two light sources for emitting light beams for scanning are disposed in symmetrical positions on the right and left sides of a center line 106A indicating the center of the scanning range. These two light sources include semiconductor lasers 101a, 101b for emitting light beams having substantially Gaussian distribution. Hereinafter, a light beam emitted from the semiconductor laser 101a is referred to as beam A, and a light beam emitted from the semiconductor 101b is referred to as beam B.

On the light beam emitting sides of the semiconductor lasers 101a, 101b are disposed collimator lens 102a, 102b having the function of making light beams having different diffusion angles in every direction emitted from each focal point to be substantially parallel beams, slits 111a, 111b for shaping the beams by allowing only the central portion of the beam to pass, and cylindrical lenses 110a, 110b for converging the incident beam along the auxiliary scanning direction in the vicinity of the deflecting face 104a of the polygon mirror 104M which will be described later.

The semiconductor lasers 101a and 101b are connected to a control section (not shown). The control section modulates the light beam output of the semiconductor lasers 101a and 101b according to image information. The collimator lens 102a and 102b are disposed so that the distance relative to the semiconductor lasers 101a and 101b is smaller by substantially 1 mm than the focal length of the collimator lens 102a and 102b, so that by this disposition, light beams passing through the collimator lens 102a and 102b do not become substantially parallel beams but mildly divergent light.

Further, reflection mirrors 103a and 103b for reflecting light beams are disposed in symmetrical positions on the right and left sides of the center line 106A, on each extension of the light beamemissions from the cylindrical lens 110a and 110b. Further, on an end of the case 100A in which a light beam is reflected by the reflection mirrors 103a and 103b and advanced, a polygon mirror 104M having a plurality of deflecting faces (mirror faces) of the same width FA is disposed so that it is rotatable by a driving means (not shown) around a center line O in the direction P at a substantially equal speed. The polygon mirror 104M is disposed so that the center line 106A passes through its center O.

Further, between the reflection mirrors 103a and 103b and the polygon mirror 104M is interposed a FΘ lens 105 comprising two lenses 105-1 and 105-2 having power only in the main scanning direction, the FΘ lens 105 being disposed so that its optical axis coincides with the center line 106A. In the overfilled optical system, the FΘ lens 105 converges the mildly divergent light beams A and B, eflected by the reflection mirrors 103a and 103b, along the main scanning direction, in the form of a linear image (width D0) having a width larger than the face width FA of the polygon mirror 104M. At this time, beams A and B are projected so that their center lines arrive at the same position or different positions on the deflecting face 104a of the polygon mirror 104M. As a result, the light beams converge across a plurality of deflecting faces including the deflecting face 104a.

On the other hand, in the underfilled optical system, the FΘ lens 105 converges the beams A and B reflected by the reflection mirrors 103a and 103b on the deflecting face 104a of the polygon mirror 104M along the main scanning direction, in the form of a linear image having a width smaller than the face width FA of the deflecting face 104a. Further, light beams striking the polygon mirror 104M by the action of the cylindrical lenses 110a and 110b are converged along the auxiliary scanning direction.

Further, the FΘ lens 105 is disposed so that a light beam deflected by the polygon mirror 104M passes through the FΘ lens 105 again (so-called double pass). Consequently, the light beams passing again are converged on a photoconductor drum 109 which will be described later as a light spot and that light spot is moved at a substantially equal speed in the main scanning direction on the photoconductor drum 109.

On the rear end of the case 100A opposite to the side in which the light sources and the polygon mirror 104 exist is disposed a cylindrical mirror 107 for correcting position deviations of the auxiliary scanning direction caused by a deviation of incline of the deflecting faces of the polygon mirror 104M in the auxiliary scanning direction. The image recording light beam deflected by the polygon mirror 104M is reflected by the cylindrical mirror 107 and then arrives at the photoconductor drum 109 disposed below the cylindrical mirror 107.

The photoconductor drum 109 has a narrow, substantially cylindrical shape the surface of which is coated with material sensitive to light beams. The main scanning direction is coincident with the length direction of the photoconductor drum 109. That is, the light spot on the photoconductor is moved along the scanning line 112 in the main scanning direction with the rotation of the polygon mirror 104M, so that recording of an image on the scanning line 112 is enabled.

This photoconductor drum 109 is rotated with respect to a rotation axis W by a driving means (not shown) at a constant speed, so that the scanning line is gradually moved along the auxiliary scanning direction on the photoconductor. Recording of an image on a single scanning line by the polygon mirror 104M corresponds to a deflection of a deflecting face.

Further, at a rear end of the case 100A is disposed a start-of-scan (SOS) sensor 108A for detecting beam A before recording of the image therewith is started, the sensor being located on a path of beam A which is deflected to pass through the FΘ lens 105. The SOS sensor 108A is connected to a control unit (not shown) and, the control unit starts controlling the semiconductor lasers 101a and 101b at the same time according to image information after a predetermined time has passed since detection of an output signal of the SOS sensor 108A, so as to carry out simultaneous divisional scanning with the beams A and B.

Figure 20:
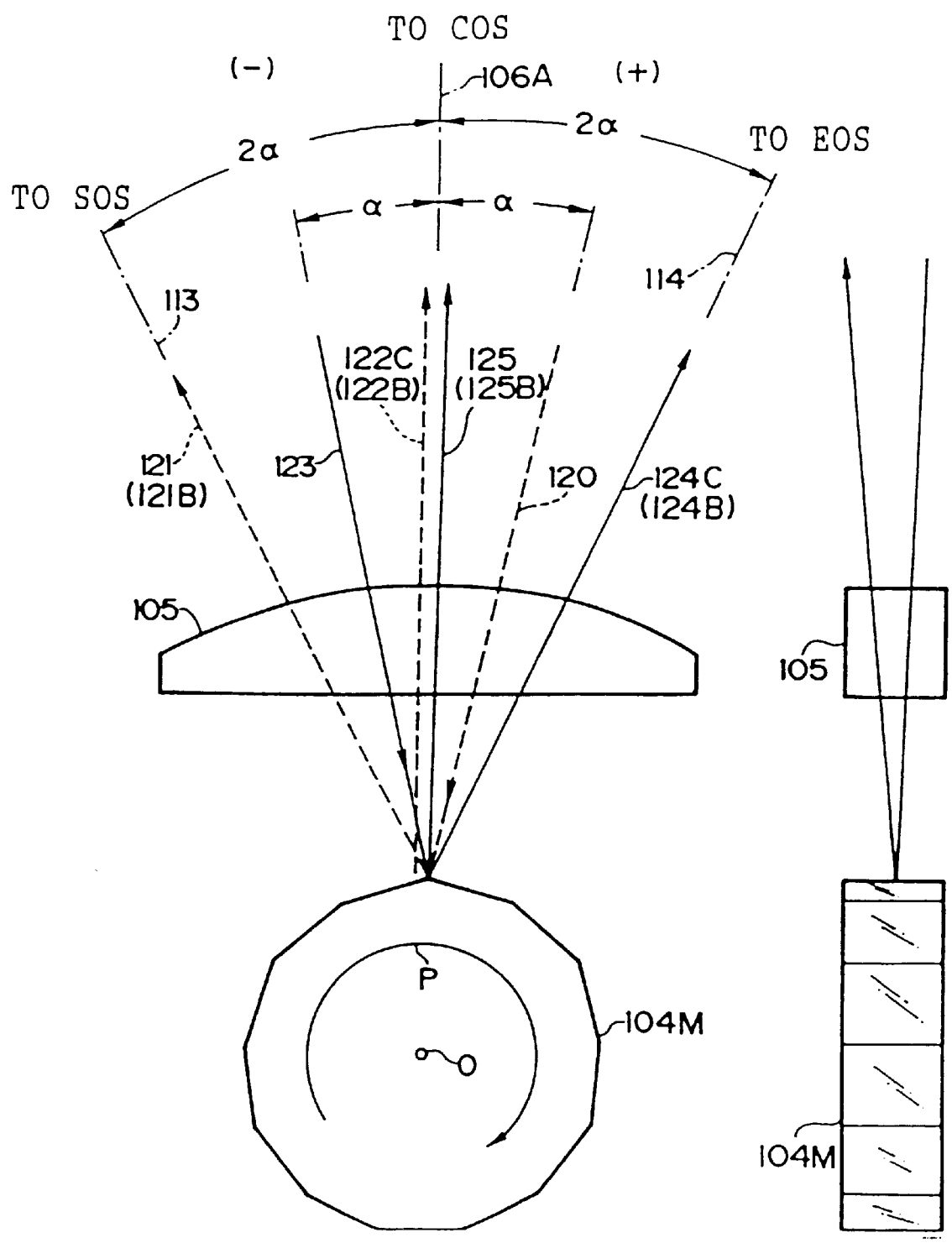
FIG. 20 is a diagram showing the scanning angle, incident angle and deflection angle of beams A, B striking a polygon mirror.

Next, the relation between the polygon mirror 104M and the beams A and B striking the polygon mirror 104M will be described with reference to FIG. 20. In FIG. 20, beam A is indicated by a dotted line and beam B is indicated by a solid line, and the FΘ lens 105 is shown as a single lens.

As shown in left half of diagram of FIG. 20, the scanning angle of the optical device according to the present embodiment is ±2α relative to the center line 106A leading to the center of scan position COS. That is, the angle formed by a line 113 leading to the start of scan position SOS relative to the center line 106A is −2α and the angle formed by a line 114 leading to the end of scan position EOS relative to the center line 106A is +2α. Meanwhile, in this Figure, the right side of the center line 106A (beam A's incident direction) is assumed to be the plus direction.

Then, when the scanning angle is ±α, the incident angle of the incident light axis 120 of beam A striking the deflecting face 104a of the polygon mirror 104M is assumed to be +α with respect to the center line 106A, while the incident angle of the incident light axis 123 of beam B striking the same deflecting face 104a is assumed to be −α with respect to the center line 106A.

Further, the rotation angle of the polygon mirror 104M (angle of the rotation of the polygon mirror 104M during scanning over a range of ±2α with a deflecting beam by a single deflecting face) is α (±α/2) which is the same as the incident angle of the two beams. That is, when the polygon mirror 104M is rotated at an angle of α, the projected beam A (incident light axis 120) is deflected from the deflection optical axis 121 leading to the SOS position, to the deflection optical axis 122C leading to the COS position, and at the same time, the projected beam B (incident light axis 123) is also deflected from the deflection optical axis 125 leading to the COS position to the deflection optical axis 124C leading to the EOS position. Consequently, divided scanning is carried out simultaneously on one scanning line on the photoconductor.

According to the present embodiment, as shown in the right half of FIG. 20, the components are disposed so that the deflection beam deflected by the polygon mirror 104M passes below the incident beam.

Next, operations of the present embodiment will be described.

Light beams emitted from each of two light sources according to image information are reflected by the reflection mirrors 103a and 103b and pass through the FΘ lens 105. By the action of this FΘ lens 105, the light beam is converged on the deflecting face 104a of the polygon mirror 104M along the main scanning direction, and at the same time, by the action of the cylindrical lenses 110a and 110b, converged along the auxiliary scanning direction. At this time, in underfilled optical systems, the incident light is converged so that it is included within the deflecting face 104a. In overfilled optical systems, the incident light is converged as a linear image prolonged in the main scanning direction across a plurality of the deflecting faces including the deflecting face 104a.

With the rotation of the polygon mirror 104M at a substantially constant speed, beams A and B converged on the deflecting face 104a are deflected at a substantial constant speed with a scanning angle of ±2α in a direction corresponding to the main scanning direction and pass through the FΘ lens 105 again. The deflection beam arrives at the SOS sensor 108A before image recording is started. After a predetermined time has passed after a detection signal is output, image recording is started. After image recording has started, the deflection beam is reflected by the cylindrical mirror 107 and after face inclination is corrected, arrives at the photoconductor drum 109. For example, the light beam deflected toward the center line 106A arrives at the center of scan position COS of the scanning line 112 on the photoconductor drum 109, the light beam deflected toward the line 113 arrives at the start of scan position SOS of the scanning line, and the light beam deflected toward the line 114 arrives at the end of scan position EOS of the scanning line 112.

The deflection beam arriving at the photoconductor drum 109 is converged as a light spot on the photoconductor drum 109 by the action of the FΘ lens 105 and at the same time, is moved at a substantially constant speed in the main scanning direction. At this time, together with the rotation of the polygon mirror 104M, the light spot from beam A is swept from SOS to COS of the scanning line 112 and at the same time, the light spot from beam B is swept from COS to EOS of the scanning line 112.

According to the present embodiment, as shown in FIG. 20, the beams A and B are projected at the incident angles ±α which are ½ of the scanning angle ±2α relative to the center line 106A leading to the center of scan position COS. Therefore, simultaneous scanning at the scanning angle ±2α by two beams is enabled and the emission light widths Dn of the deflection beams on the deflection optical axes 122C and 125 leading to the center of scan position COS are equal. Consequently, the beam diameters of the two beams at the center of scan position are equal, thereby preventing deterioration of image quality due to differences in the line width of the recording image. Further, the emission light width Dn (n=1 for SOS; n=2 for COS; n=3 for EOS) of the deflection beam is as follows where the incident beam width is D0 and the face width of the deflecting face is FA.

In the underfilled optical system, $$D1 = D0 \times COS(3\alpha/2) \tag{7}$$

$$D2 = D0 \times COS(\alpha/2) \tag{8}$$

$$D3 = D0 \times COS(3\alpha/2) \tag{9}$$

In the overfilled optical system, $$D1 = FA \times COS(3\alpha/2) \tag{10}$$

$$D2 = FA \times COS(\alpha/2) \tag{11}$$

$$D3 = FA \times COS(3\alpha/2) \tag{12}$$

Here, if 15° is substituted for a in the formulas (7)–(12) as an actual value, the incident beam width D0 or face width FA must only be set to less than 1.01 times the size of Dn. Thus, the diameter of the polygon mirror can be reduced.

In the structure shown in FIGS. 19, 20, although the scanning angle for a single beam is 2α, ±2α is covered with two beams. Therefore, compared to an optical system which scans with a single beam, the focal length (optical path length) can be reduced to ½ even if the number of faces of the polygon mirror is the same, so that high resolution and reduction of the polygon mirror diameter can be achieved.

In the optical device according to the present embodiment, in which two-division scanning of a single scanning line 112 with two beams is carried out by a single polygon mirror 104M, the polygon mirror diameter can be minimized.

In cases when on overfilled optical system is utilized for the optical device of the present embodiment, the FN0 ratio at each scanning position, that is the beam diameter, is determined proportional to a factor 1/COS (****) according to the formulas (6), (7)–(12). This factor is as follows:

1/COS (3α/2) at a scanning position of the deflection beam 121B

1/COS (α/2) at a scanning position of the deflection beam 122B

1/COS (α/2) at a scanning position of the deflection beam 125B

1/COS (3α/2) at a scanning position of the deflection beam 124B

Here, if the number of faces of the polygon mirror n is 20, the angle of each mirror face is 360°/20=18° and therefore the polygon mirror rotation angle ±α/2 is ±9° or less (α is 18° or less). Because 36°/20×0.6=10.8°, if α=15°, the factor 1/COS (****) is as follows:

1/COS (3α/2)=1.082 at a scanning position of the deflection beam 121B

1/COS (α/2)=1.009 at a scanning position of the deflection beam 122B

1/COS (α/2)=1/009 at a scanning position of the deflection beam 125B

1/COS (3α/2)=1.082 at a scanning position of the deflection beam 124B

Thus, the FN0 ratio at each of the scanning positions of SOS/EOS and COS can be less than 1.082/1.009=1.072, so that uniformity of the beam diameter can be improved. Consequently, high speed operation and reduction in size of the polygon mirror, due to the utilization of the overfilled optical system, can be realized and such disadvantages of the overfilled optical system as the beam diameter not being uniform depending on the scanning position can be eliminated, thereby enabling high quality images to be obtained. Further, as described previously, no difference in FN0 is caused at the scanning positions of the deflection beams 122B and 125B, thereby also improving image quality.

As described above, utilization of the overfilled optical system for the optical device according to the present embodiment can improve the uniformity of the beam diameter. However, depending on the selection of α, the ratio between SOS/EOS and COS deteriorates thereby sometimes having a deleterious effect on image quality. Thus, it is desirable to select a value for a which satisfies the following formula.

$$COS(3\alpha/2)/COS(\alpha/2) > 0.75 \qquad (13)$$

The left side of the formula (13) corresponds to D1(or D3)+D2 according to the formulas (7)–(12) and further because the focal length f of the FΘ lens 105 is constant, is also equal to FN0 at COS+FN0 at SOS(EOS).

If the (FN0 at COS+FN0 at SOS(EOS)) of the left side of the formula (13) is equal to 0.75 which is the boundary value of the right side of the formula (13), the FN0 ratio in each scanning position changes within a range of 0.25. Therefore, because the beam diameter is proportional to the FN0, if the average beam diameter (beam diameter at a scanning position in the middle of SOS-COS or COS-EOS) is assumed to be 75 μm, the beam diameter on the photoconductor can be included within 60–90 μm including errors, according to the aforementioned FN0 ratio, so that this is within a tolerable range in terms of image quality (see Japanese Patent Application No. 6-315091).

Further, in the optical device according to the present embodiment, regardless of whether it is an overfilled or underfilled optical system, if the number of deflecting faces of the polygon mirror 104M is n, it is desirable to dispose the components so that α satisfies the following inequality:

$$360° \times 0.6/n < \alpha < 36°/n \qquad (14)$$

That is, the maximum rotation angle of each deflecting face of the polygon mirror is less than 360° and therefore naturally α<360°/n is established. Further, in the present embodiment in which the focal length (optical path length) can also be reduced, if the number n of the faces of the polygon mirror is increased too much, α decreases so that the focal length is increased. On the contrary, if a is decreased without increasing the number n of the faces, not only is the focal length increased, but also the invalid scanning time is prolonged, so that light beam energy which can be irradiated upon a sensitive body in a unit of time is also decreased. For the reasons described above, it is desirable to set a to a value which satisfies the condition of 360°/n×0.6<α.

Next, a third embodiment of the present invention will be described. Although the second embodiment is applied to both overfilled and underfilled optical systems, the third embodiment is applicable only to overfilled optical systems. Moreover, because the composition of the third embodiment is the same as that of the second embodiment, the same reference numerals are attached and a detailed description thereof is omitted.

Figure 23:
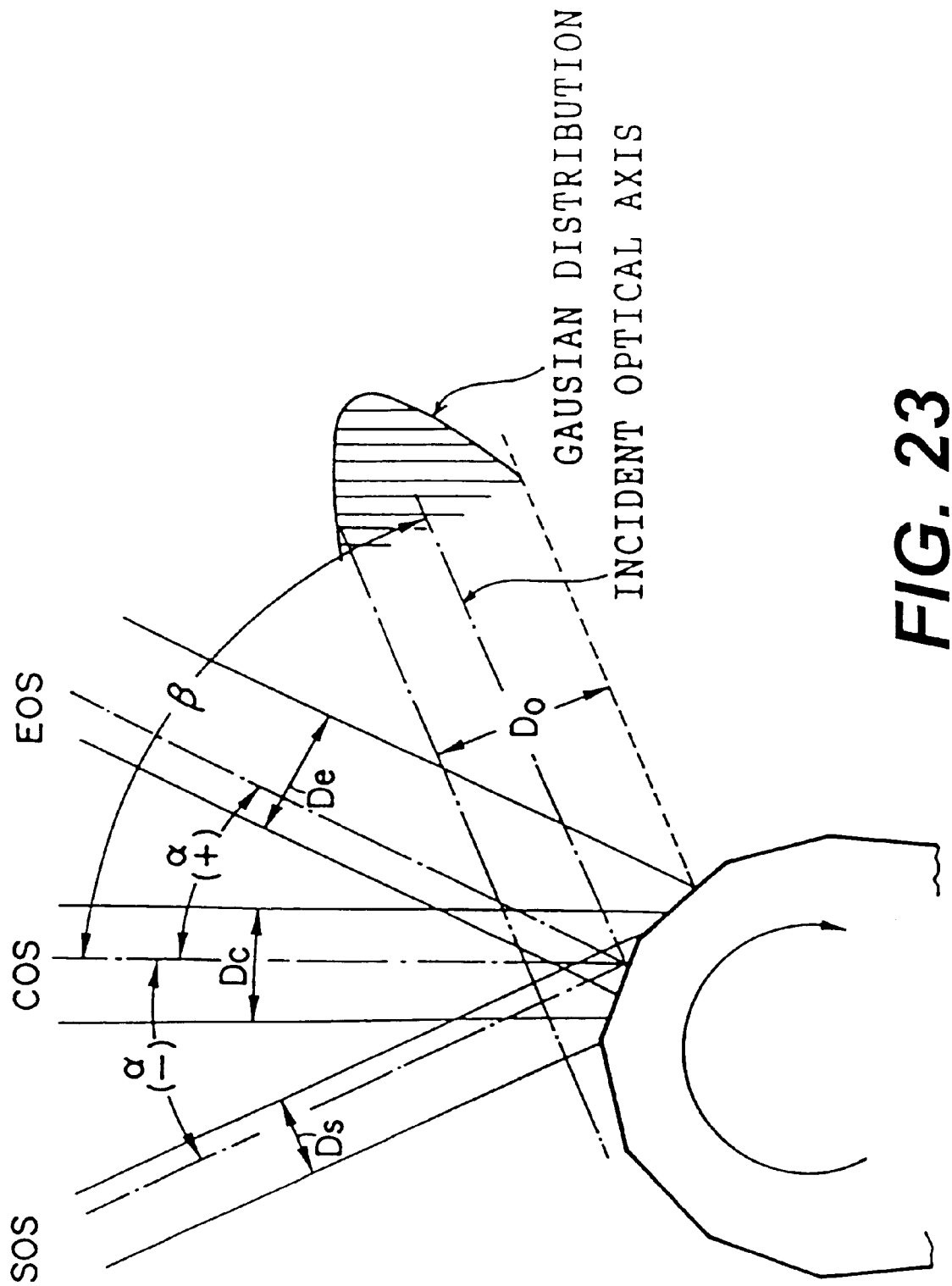
FIG. 23 is a diagram for explaining that the way of cutting off the emission beam when the incident beam in a Gausian distribution is reflected by a polygon mirror is different depending on the scanning angle in an overfilled optical system.

In the overfilled optical device according to the third embodiment, as shown in FIG. 23, not all beams reflected by the polygon mirror are used as deflection beams for use in scanning the photoconductor, but a part of the Gausian distribution incident beams is used, particularly by cutting off the end portions of the incident beam. Meanwhile, although FIG. 23 is a diagram of a conventional overfilled optical device, the same can be said of the embodiments of the present invention.

As evident from FIG. 23, the larger the incident angle of the beam to the deflecting face, the more the incident beam is cut off. Therefore, the farther the deflection beam is from the incident optical axis, the smaller the light volume becomes. One of the reasons why the farther the deflection beam is from the incident optical axis, the smaller the light volume becomes, is the fact that the emission beam Dn decreases the farther it is from the incident optical axis. As described above, FN0 which is inversely proportional to Dn (FN0 is brighter as it gets smaller) is used as an indicator for indicating the decrease in brightness due to the decrease in the emission beam Dn.

However, in cases when the incident beam is distributed in such a manner that the beam strength is not uniform such as Gausian distribution, the actual light volume depending on the scanning angle does not simply depend upon only Dn or FN0, because cutting off of the incident beam distribution differs depending on the scanning angle. For example as shown in FIG. 23, the emission beam leading to the start of scan position SOS is a beam extending from one end of the Gausian distribution to the vicinity of peak. The emission beam leading to the center of scan position COS is a beam including the peak and the neighboring portions while only the end portions having a low intensity in terms of Gausian distribution are thrown out. Therefore, the actual light volume of the emission beam leading to the start of scan position SOS decreases compared to the light volume of the actual emission beam leading to the center of scan position COS, by more than the difference in emission beam width Dn.

Figure 24:
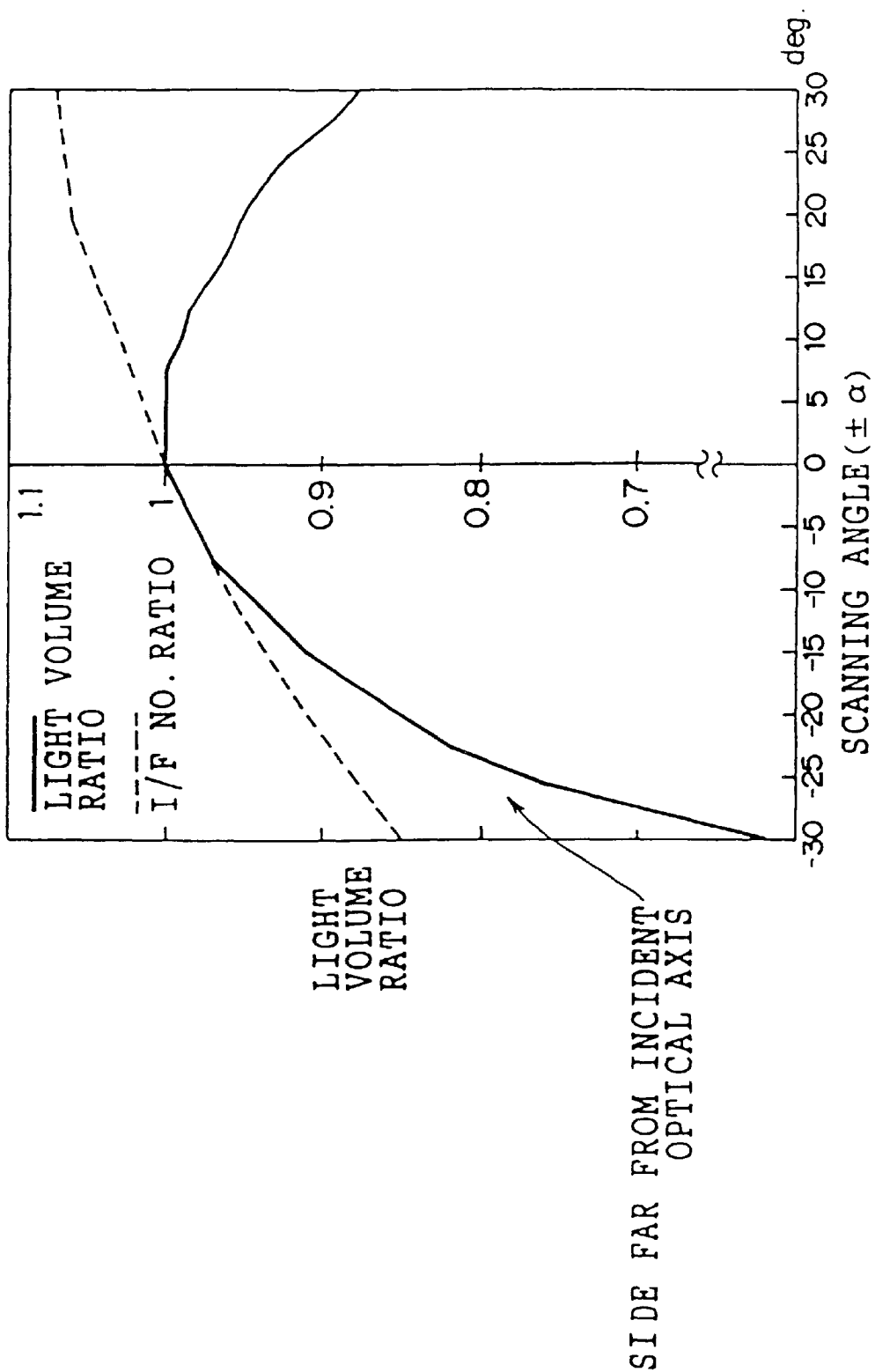
FIG. 24 is a graph indicating changes in light volume which occur because the way of cutting off the emission beam differs depending on the scanning angle in the overfilled optical system.
Figure 25:
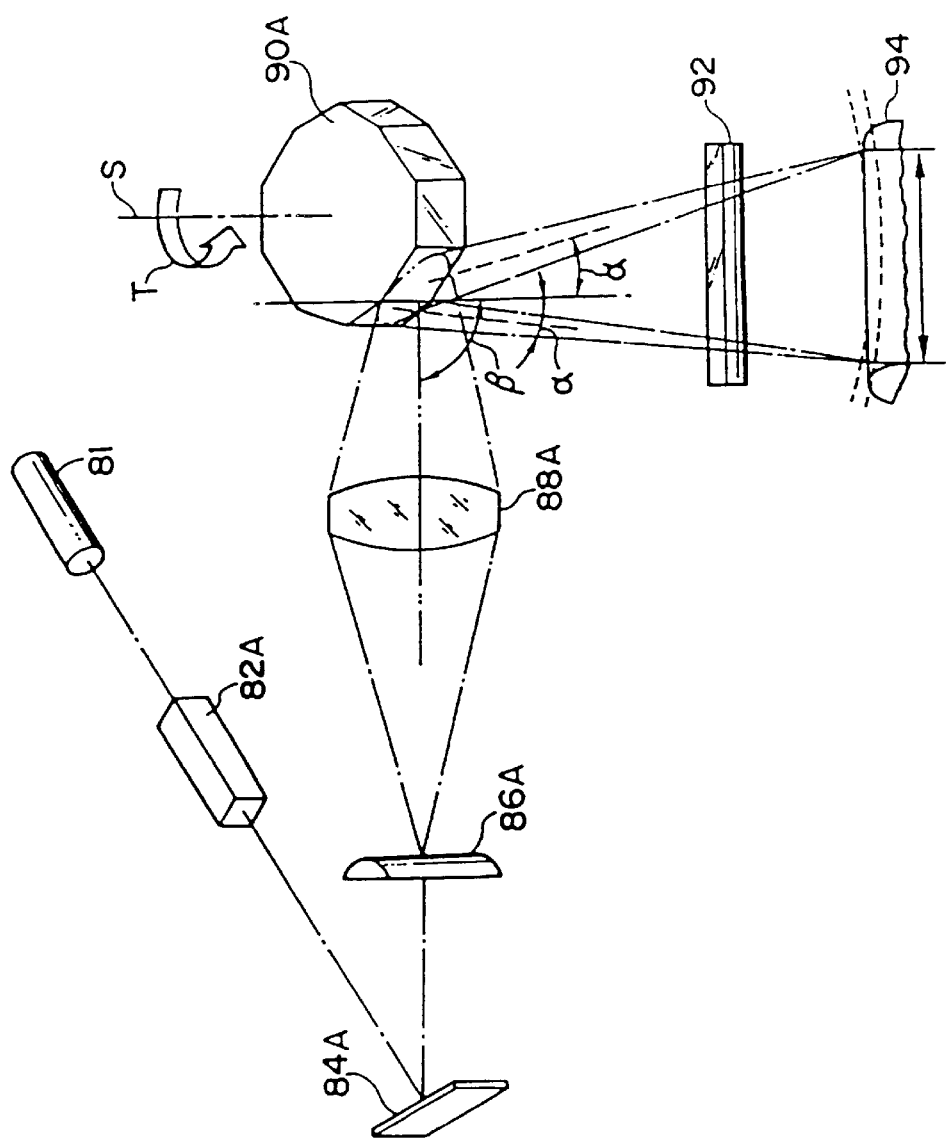
FIG. 25 is a diagram showing the structure of the conventional optical device of the overfilled optical system.
Figure 26:
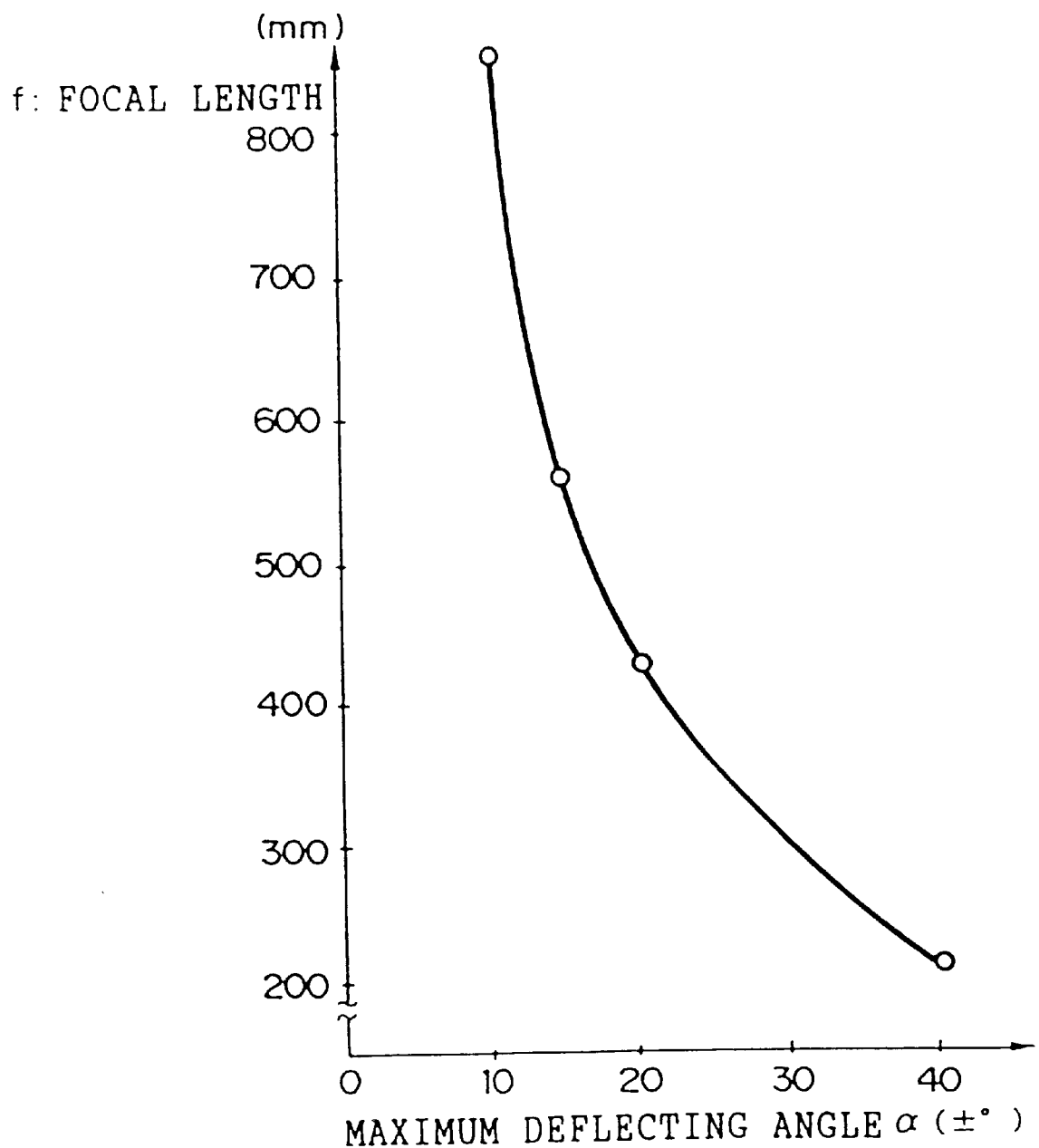
FIG. 26 is a graph indicating the relation between the maximum deflection angle a and the focal length of a focusing optical system of the conventional optical device of the overfilled optical system.
Figure 27:
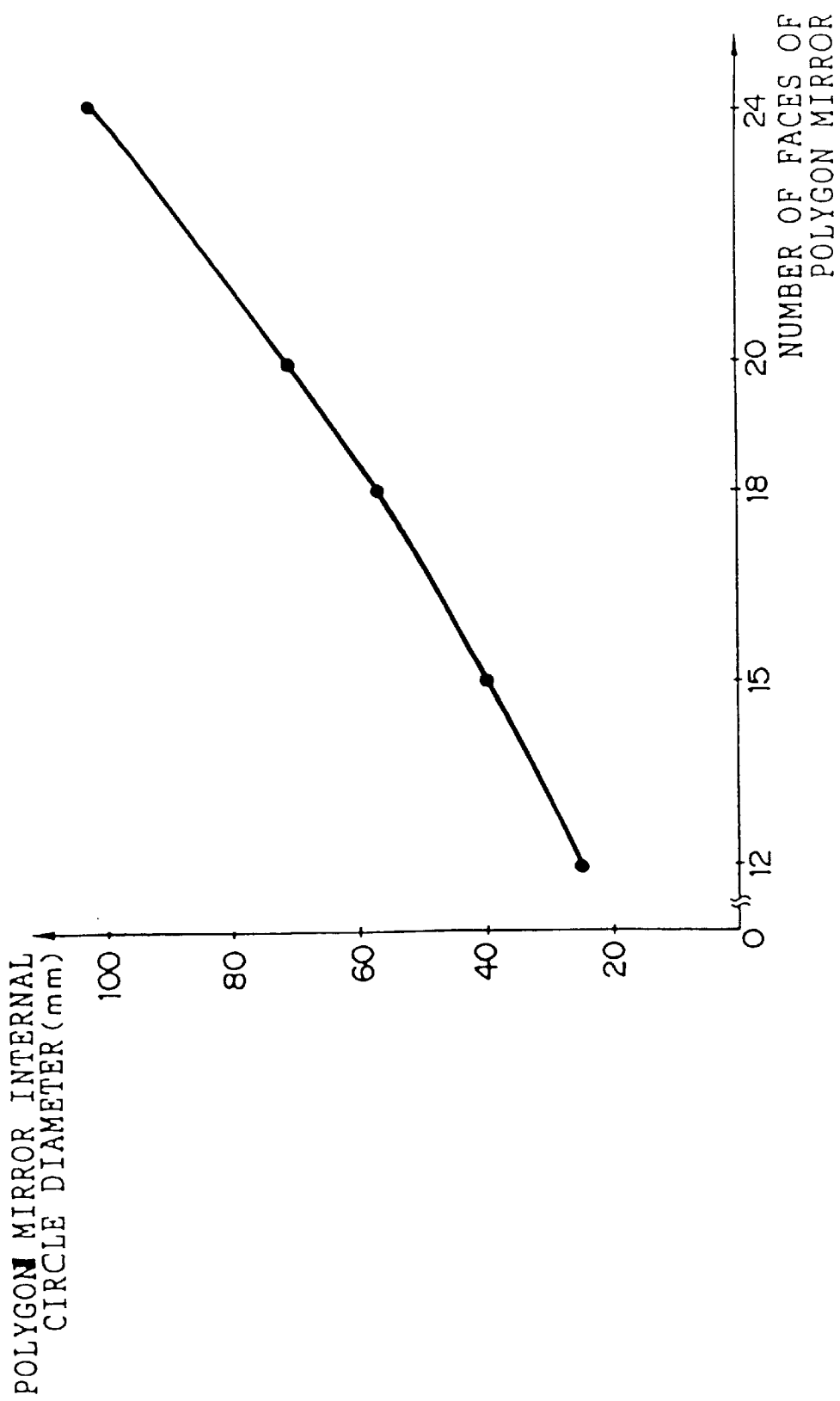
FIG. 27 is a graph showing the relation between the number of deflecting faces of a polygon mirror and the internal circle diameter of the polygon mirror in the conventional optical device of the overfilled optical system.
Figure 28:
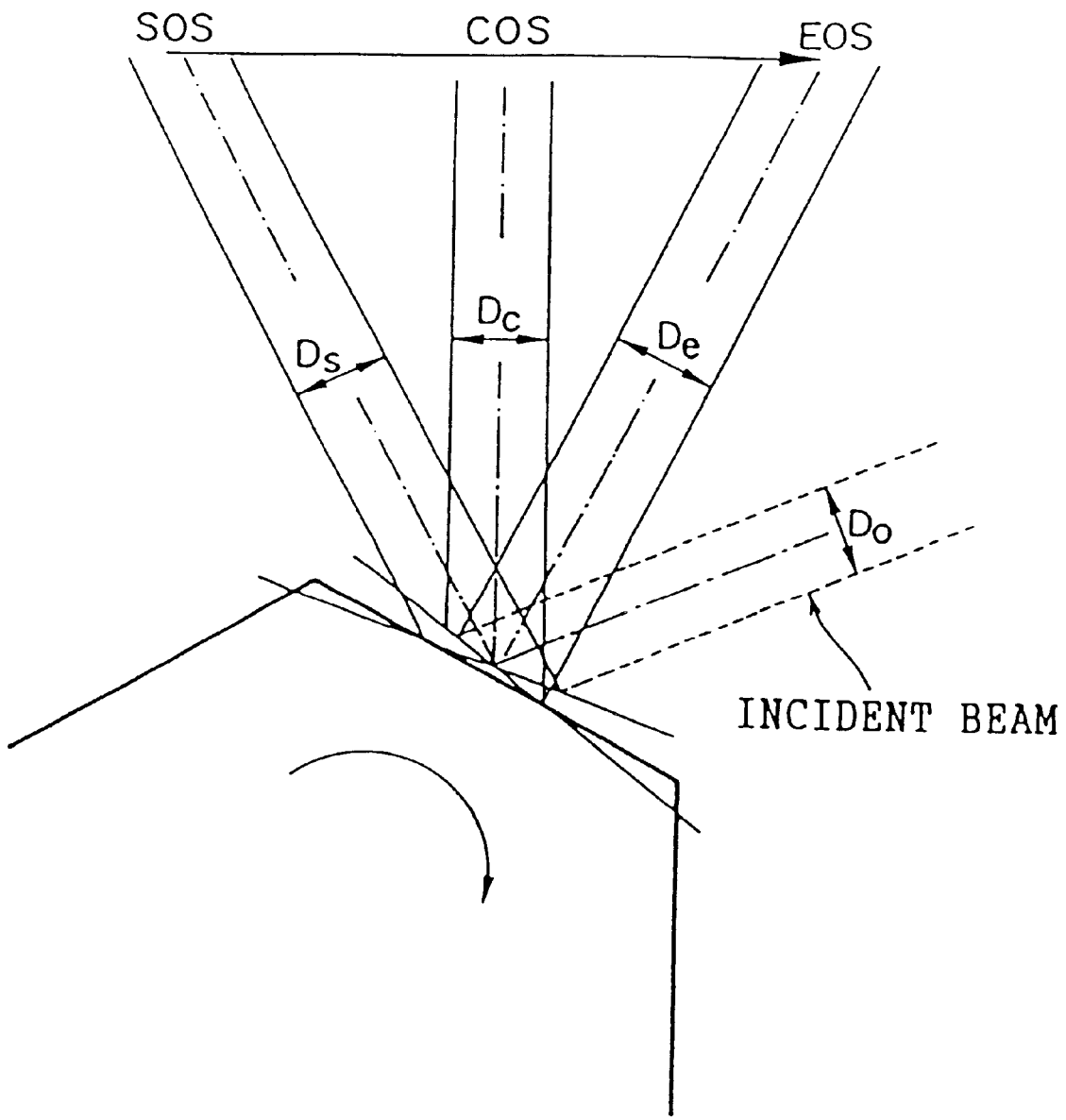
FIG. 28 is a diagram showing the relation between incident beam width and the width of the emission beam leading to each of the scanning positions in the underfilled optical system.
Figure 29:
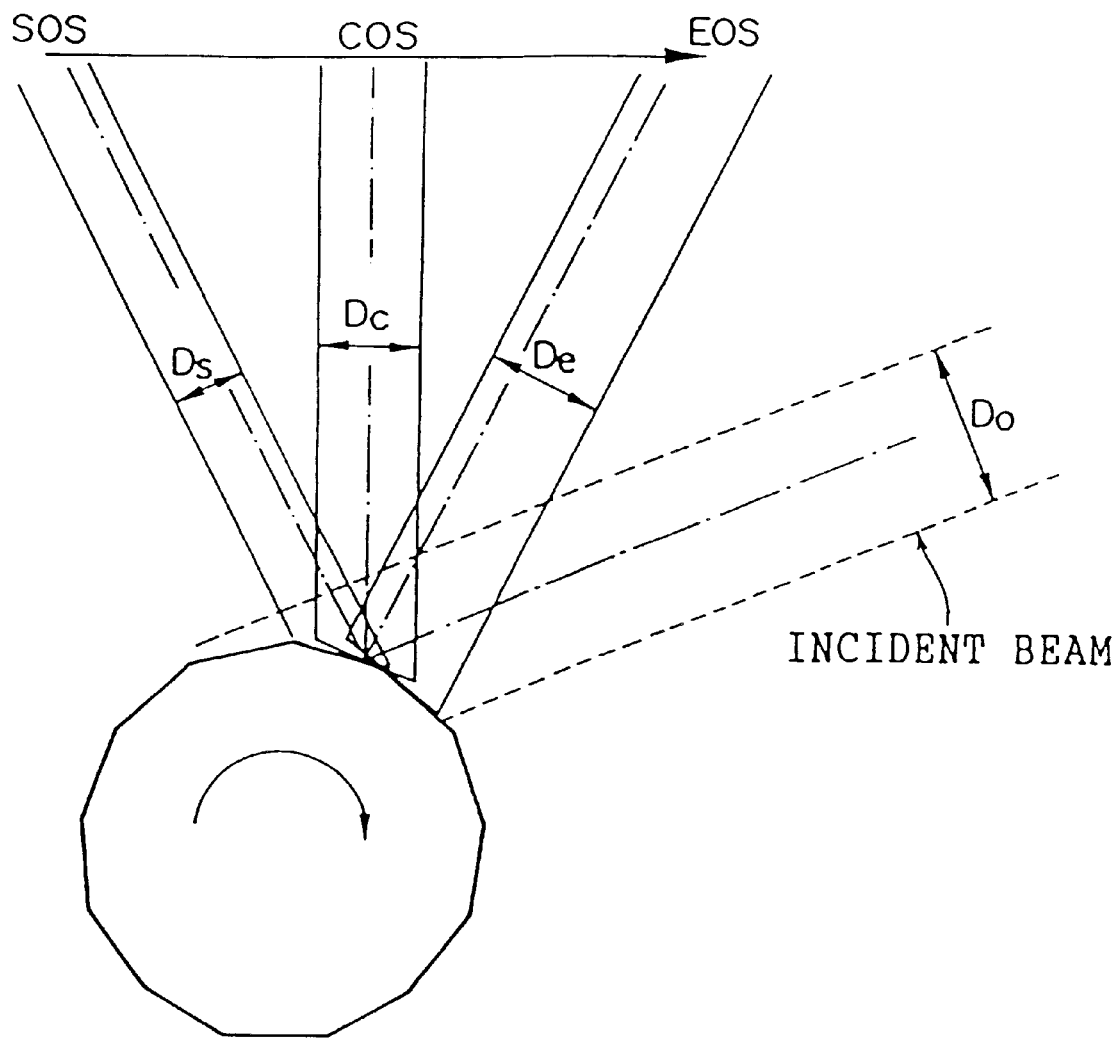
FIG. 29 is a diagram showing the relation between incident beam width and the width of the emission beam leading to each of the scanning positions in the overfilled optical system.
Figure 30:
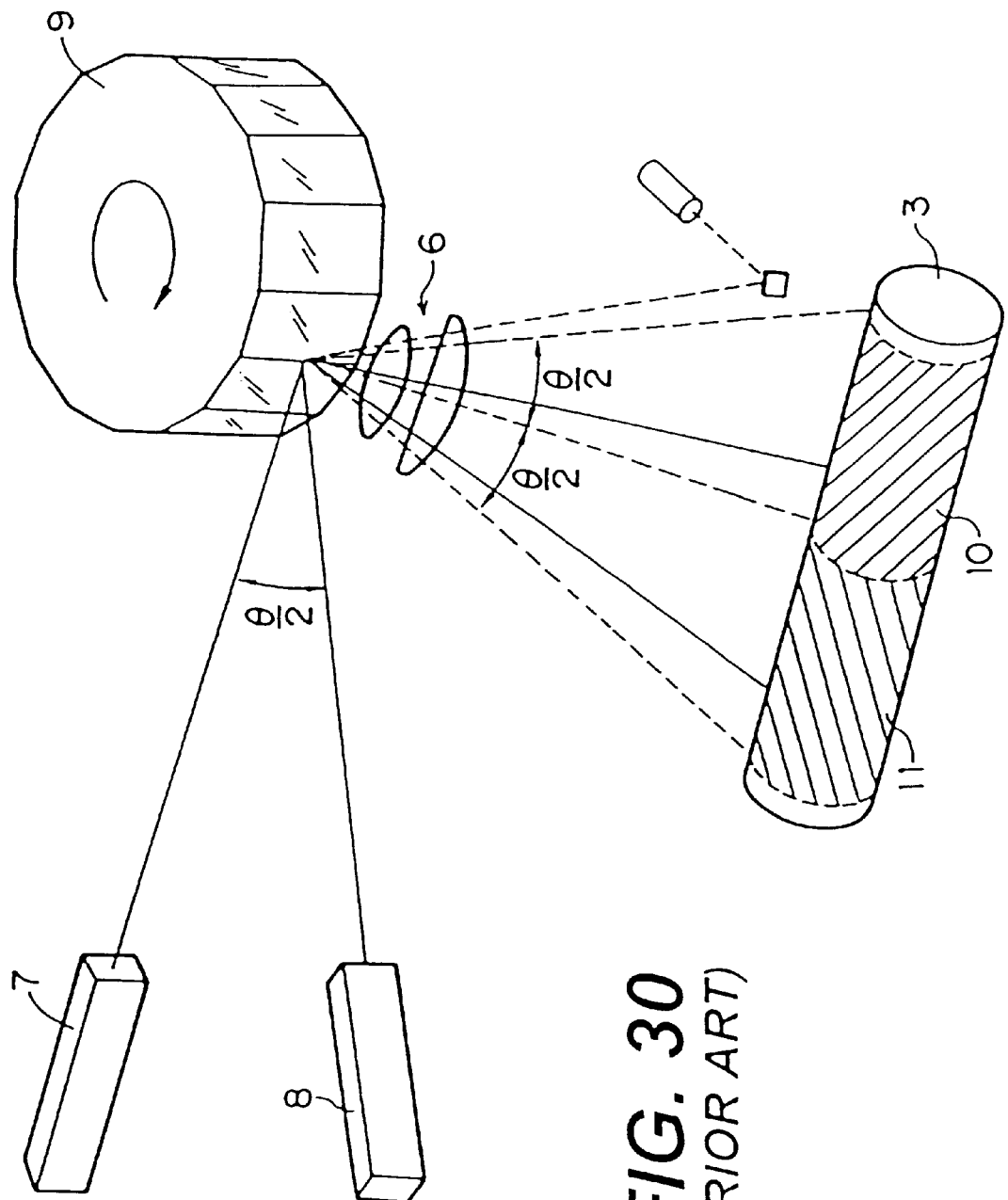
FIG. 30 is a diagram showing the structure of a conventional optical device in which divided scanning is carried out on a plane at the same time with two light beams.
Figure 31:
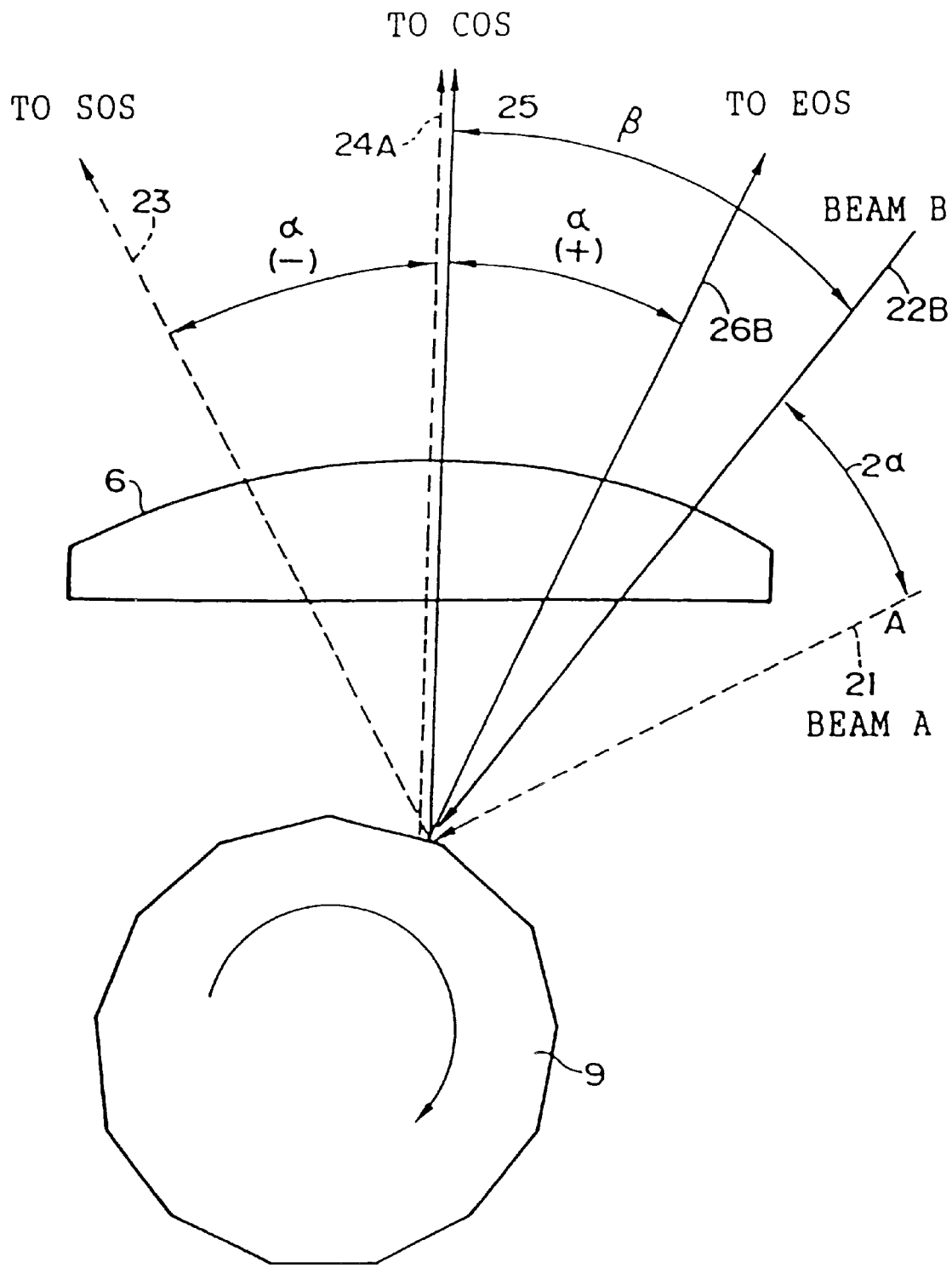
FIG. 31 is a diagram for explaining the scanning angles, incident angles and deflection angles of two light beams striking the polygon mirror in the conventional optical device which carries out simultaneous divided scanning.

Here, FIG. 24 shows a graph of the changes in actual light volume and 1/FN0 at each scanning position (scanning angle) in cases when the value at the center of scan position COS is assumed to be 1. FIG. 24 indicates that the actual light volume ratio (indicated by solid line) decreases rapidly as it leaves the incident optical axis (as the scanning angle decreases on minus side) as compared to 1/FN0 calculated on the basis of the emission beam width Dn (indicated by dotted line). Therefore, the first embodiment in which the difference in the emission beam width Dn depending on the scanning angle has been minimized has also the problem of not being able to stop changes in light volume depending on the way the irregularly distributed incident beam at each scanning angle is cut off.

Figure 21:
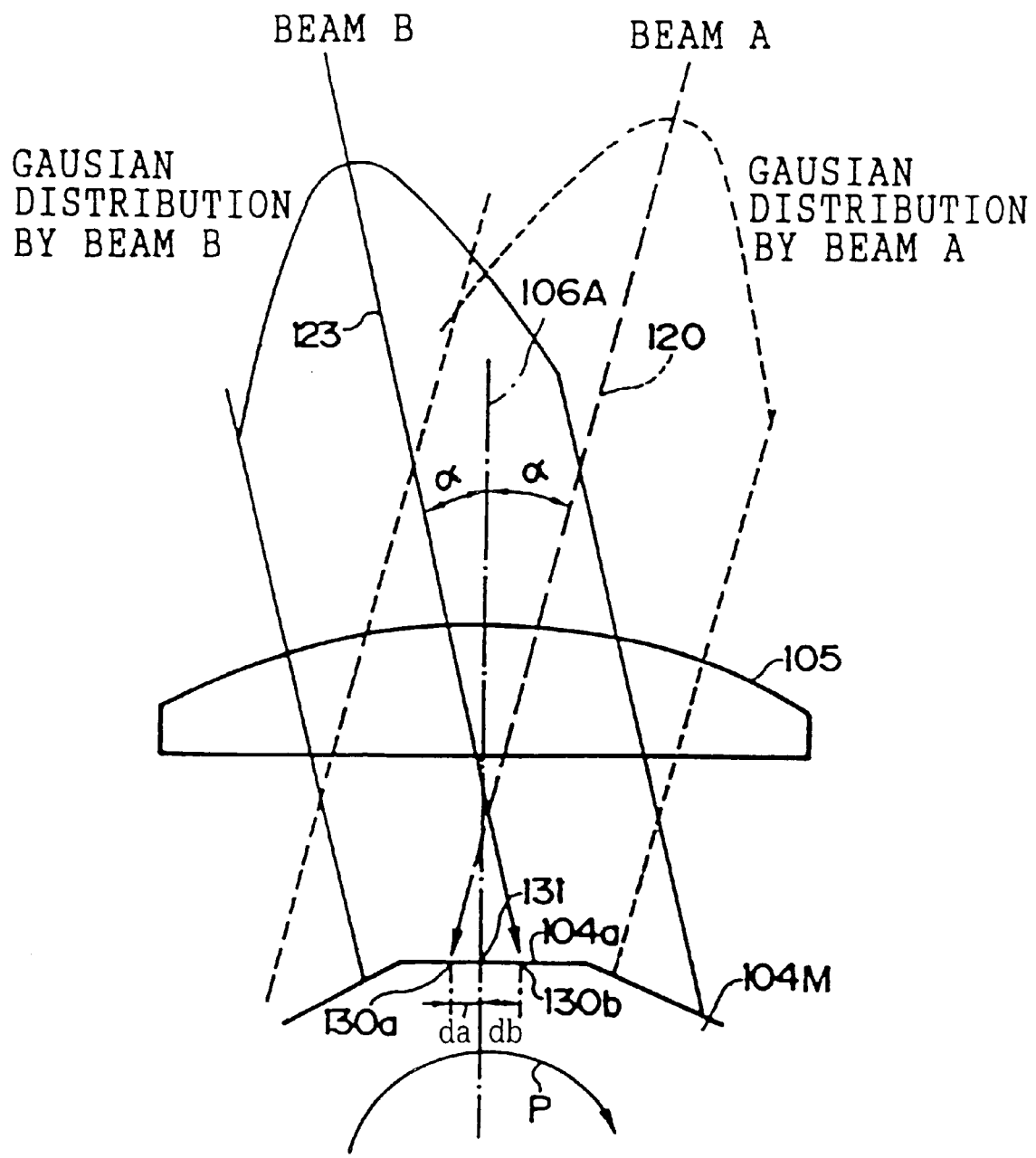
FIG. 21 is a diagram showing the incident positions of the beams A, B striking the polygon mirror in an optical device according to the third embodiment.

Thus, according to the third embodiment, to solve the aforementioned problem, the incident position of a beam striking the deflecting face 104a of the polygon mirror 104M is set as shown in FIG. 21.

FIG. 21 shows a rotation position in which a deflecting face 104a of the polygon mirror 104M is set perpendicular to the center line 106A. This rotation position corresponds to a rotation position in which the deflected beam A is swept over a middle scanning position between SOS and COS and the deflected beam B is swept over a middle position between COS and EOS. In FIG. 21, it is assumed that beam distribution in a direction corresponding to the main scanning direction of the beams A and B is of Gausian distribution and the intensity of the incident optical axes 120 and 123 is at peak.

As shown in FIG. 21, the components are allocated so that the incident optical axis 120 of incoming beam A arrives at a point 130a on the deflecting face 104a, separated by the distance $d_a$ to the left side (towards SOS) along the main scanning direction from an intersection point 131 of the deflecting face 104a and center line 106A, and the incident optical axis 123 of incoming beam B arrives at a point 130b (different point from the point 130a) on the deflecting face 104a, separated by the distance $d_b$ to the right side (towards EOS) along the main scanning direction from an intersection point 131.

Because the rotating position of the polygon mirror 104M shown in FIG. 21 is a position in which the respective beams are scanning the middle part of the scanning range as described above, at a position where beam A sweeps the start of scan position SOS (a position prior to the situation shown in the Figure), the incident optical axis 120 indicating a peak of Gausian distribution arrives at a point nearer the center point of the deflecting face 104a than the point 130a. That is, the beam A projected to scan the SOS is reflected by the deflecting face 104a in such a state that while only the end portions of the Gausian distribution are cut off, its peak and neighboring portions are included. Consequently, a reduction of light volume at the start of scan position SOS can be prevented.

At a position where beam B sweeps the end of scan position EOS (a position subsequent to the situation shown in the Figure), the incident optical axis 123 indicating a peak of Gausian distribution arrives at a point nearer the center point of the deflecting face 104a than the point 130b. That is, the beam B projected to scan the EOS is reflected by the deflecting face 104a in such a state that while only the end portions of the Gausian distribution are cut off, its peak and neighboring portions are included. Consequently, a reduction of light volume at the end of scan position EOS can be prevented.

Although the emission beam width Dn at the scanning positions SOS, EOS cannot be changed as described above, by moving the peak position of the incident beam of Gausian distribution by a specified amount, the peak portion of Gausian distribution and the neighboring portions thereof, but not the end portions, are used in as large a range as possible at the scanning positions COS and EOS, thereby making it possible to prevent a drop of light volume at scanning positions far from the incident optical axis. If the amount moved is too large, the light volume at the center of scan position COS drops and therefore the amount moved should be determined so as to minimize the difference in light volume between one scanning position and another scanning position. Meanwhile, the third embodiment is applicable to non-uniform distribution other than Gausian distribution. In this case, it is self-evident that the amount moved of the incident beam should be determined depending on distribution of the beam.

Further, it is desirable that the amounts moved for the beams A and B are the same so as to prevent a difference in FN0 and light volume at the center of scan position. That is, in the case of FIG. 21, it is assumed that $d_a = d_b$.

EXAMPLES

Examples in which the second and third embodiments have been actually designed will be described below. The same reference numerals as in the aforementioned embodiments are attached to the respective components.

For example, assuming that the number n of the deflecting faces of the polygon mirror 104M is 20 and the face width (facet width) FA of the polygon mirror 104M is 6.7 mm, the internal circle diameter of the polygon mirror 104M is $P\Phi = FA/TAN(180°\,C./N) = 6.7\,mm/TAN(180°/20) = 42\,mm$. This size is large enough to rotate a cheap bearing motor with high precision. Further, if the number of the faces is as large as 20, the shape becomes nearly circular, so that windage loss decreases and the load on the motor also decreases.

The scanning angle $\pm 2\alpha$ was determined to be $\pm 30°$. and $+\alpha$ and $-\alpha$ which were the incident angles of beams A and B to the polygon mirror 104M were set at $+15°$ and $-15°$ so as to satisfy the formulas (13) and (14). As the F$\Theta$ lens 105, a pair of lenses having a focal length of 332 mm were used. The wave length of the semiconductor lasers 101a and 101b was designed to be $\lambda = 780$ nm.

In the above design, the beam diameter at the center of scan position on the photoconductor could be set to about 55 $\mu$m and no difference in beam diameter and light volume was caused at the COS, so that the demands for high resolution were sufficiently met. Further, the FN0 ratio between SOS/EOS and COS was $COS(3\times15°/2)/COS(15°/2)=0.93$. Thus, the uniformity of the beam diameter in the main scanning direction was included within a range not affecting the image quality.

The uniformity of the beam diameter in the main scanning direction is dependent on the design performance of the optical system containing the F$\Theta$ lens. For example, if the optical system disclosed in Japanese Patent Application No. 7-253730 is utilized in the optical system of the optical device according to the aforementioned respective embodiments, the uniformity of the beam diameter in the main scanning direction can be improved. In this case, its design values are described below. distance between the polygon mirror 104M and lens 105-1; d0=18.5 mm curvature radius of polygon mirror side of the lens 105-1 (only in the main scanning direction); S1−R=−170.43 mm curvature of the far side from the polygon mirror of the lens 105-1; S2−R=∞ thickness of the lens 105-1; T1=9 mm refractive index of the lens 105-1; n1=1.609110 (wave length=780 nm)

distance between the lens 105-1 and lens 105-2; d1=25.998 mm curvature of polygon mirror side of the lens 105-2; S1−R =∞ curvature radius of the far side from the polygon mirror of the lens 105-1 (in only the main scanning direction); S2−R =122.67 mm thickness of the lens 105-2; t2=10 mm curvature of the lens 105-2; n2=1.712268 (wave length =780 nm)

distance between the lens 105-2 and cylindrical mirror 107; d2=291.8 mm curvature radius of the cylindrical mirror 107 (only in the auxiliary scanning direction); R=−163.95 mm incident angle and emission angle relative to the cylindrical mirror 107; $\Theta$=71.24° distance between the cylindrical mirror 107 and photoconductor drum 109; L2=82.5 mm An optical system having the above specifications was used. The incident angle to the polygon mirror in the vertical direction was 1.2°, the inclination angle of the F$\Theta$ lens 105 was 1.50 and the beam width of incident beam to the polygon mirror was D0 =15 mm.

According to the above design example, the beam diameter at the COS was 54.5 $\mu$m and the beam diameter at the SOS/EOS was 63 $\mu$m. Thus, a level having no problem in terms of image quality was achieved.

If the above mentioned optical device is considered from the viewpoint of uniformity in light volume, if light volume at the COS is assumed to be 1, the light volume at the SOS/EOS is 0.89 so that there is no problem in terms of image quality.

Figure 22:
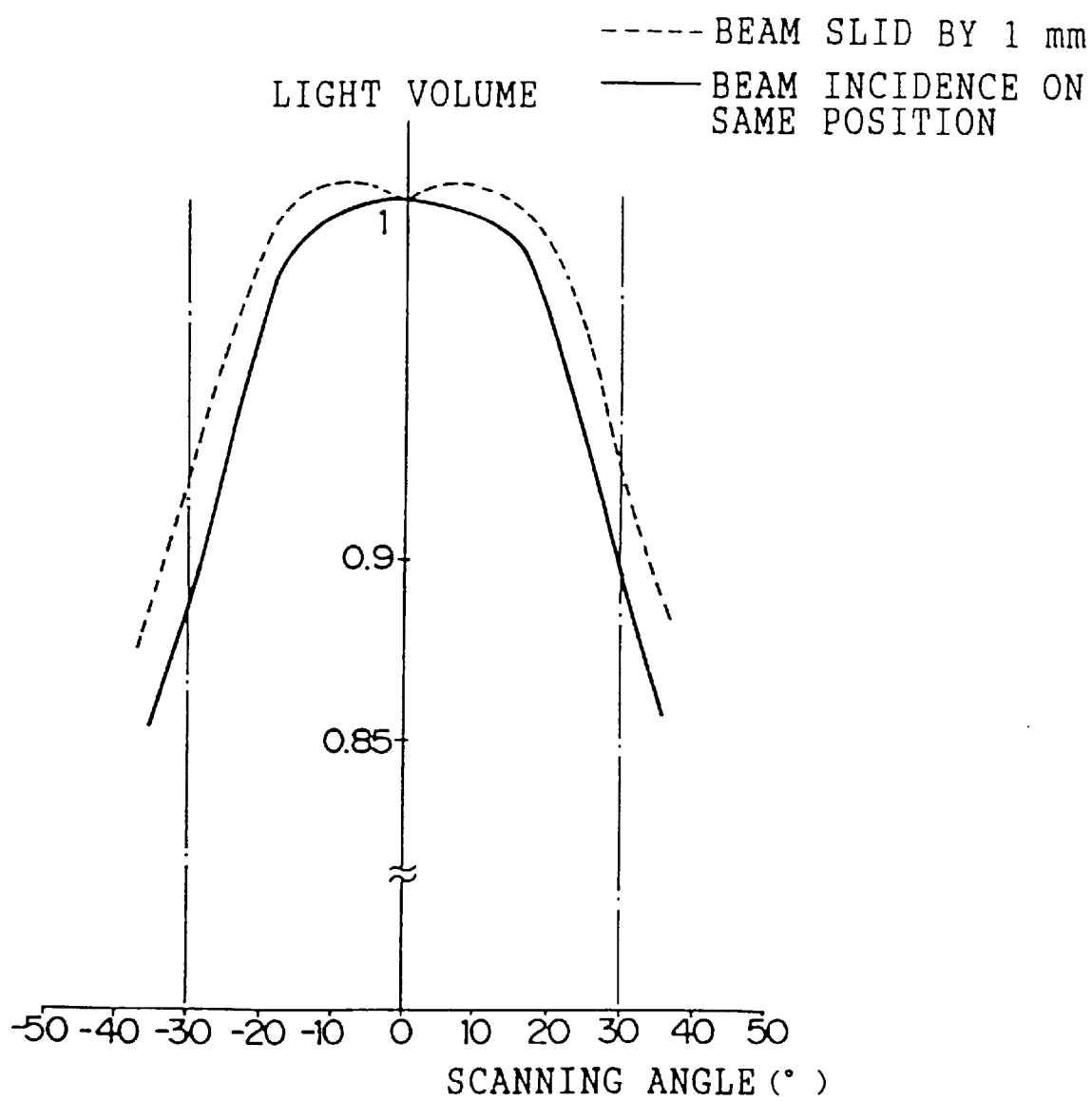
FIG. 22 is a diagram showing changes in light volume relative to the scanning angle when the incident positions of the beams A, B are changed by 1 mm in the optical device according to the third embodiment.

However, to ensure a further uniformity in light volume, beam A and beam B were projected at the deflecting face 104a of the polygon mirror so that their incident positions were slid by 1 mm in parallel towards the SOS direction and EOS direction, respectively. This corresponds to the case in which $d_a=d_b=1$ in the optical device according to the second embodiment. FIG. 22 shows the distribution of light volume at respective scanning angles at this time. In FIG. 22, light volume distributions when beams A and B are projected at the same position on the deflecting face 104a are indicated by the solid line and light volume distributions when their incident positions are slid by 1 mm are indicated by the dotted line.

When light volume at the COS was assumed to be 1 as shown in FIG. 22, the light volume at the SOS/EOS when the two beams were slid was 0.92, so that this value was higher than the light volume of 0.89 at the SOS/EOS when they were projected at the same position. When the beams were slid, the light volume was higher at a position in which the scanning angle was ±12° than at the COS in which the scanning angle was 0°. However, even when the light volume at a position in which the scanning angle was ±12° was assumed to be 1, the light volume at the SOS/EOS in which the scanning angle was ±30° was 0.91, so that the uniformity in light volume was proved.

Figure 32:
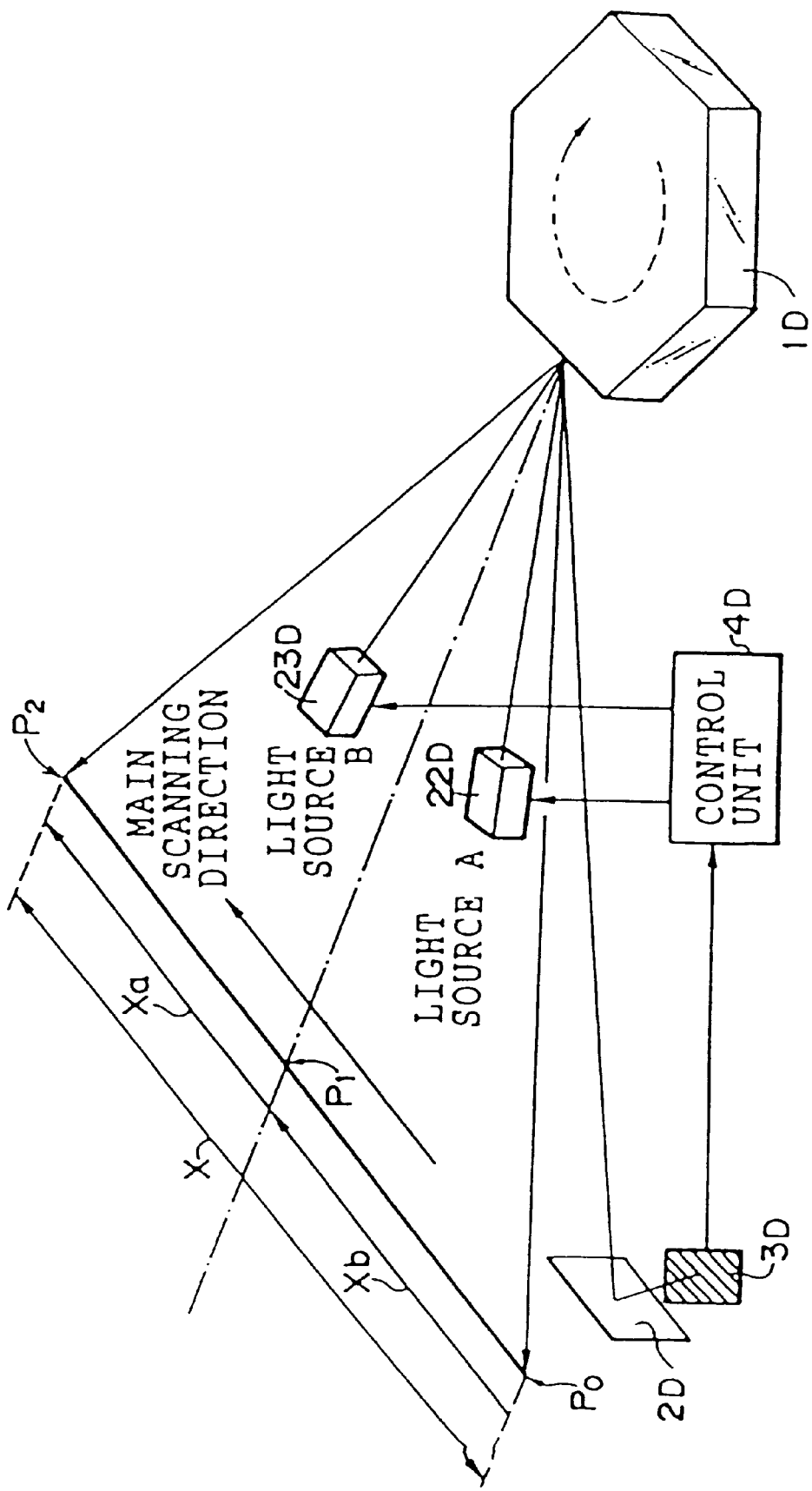
FIG. 32 is a schematic structure diagram of a light scanning device according to the fourth embodiment.

Next, a fourth embodiment of the present invention will be described with reference to drawings. FIG. 32 shows a schematic structure of a light scanning device according to the present invention. In this light scanning device, laser beams from a plurality of light sources A22D and B23D are projected at a polygon mirror 1D and the exposure range X is divided. FIG. 23 shows a simplified structure of the light scanning device, in which two light sources A22D and B23D are used and a single polygon mirror is used. Naturally, pluralities of each may be used. In the light scanning device shown in FIG. 32, scanning with laser beam emitted from the light source B23D is started from an end portion P0 of the exposure range X and in contrast, scanning with a laser beam emitted from the light source A22D is started from a central portion P1 of the exposure range X. Further, the start of a scan position is determined according to the detection output of a synchronizing sensor 3D which receives the laser beam emitted from the light source B23D through a polygon mirror 1D and a reflection mirror 2D. As shown in this Figure, the exposure range of the light source A is Xa, and the exposure range of the light source B is Xb. The light sources A22D and B23D contain laser diodes, and light volume control in the light sources A22D and B23D is carried out by the control unit 4D.

Figure 33:
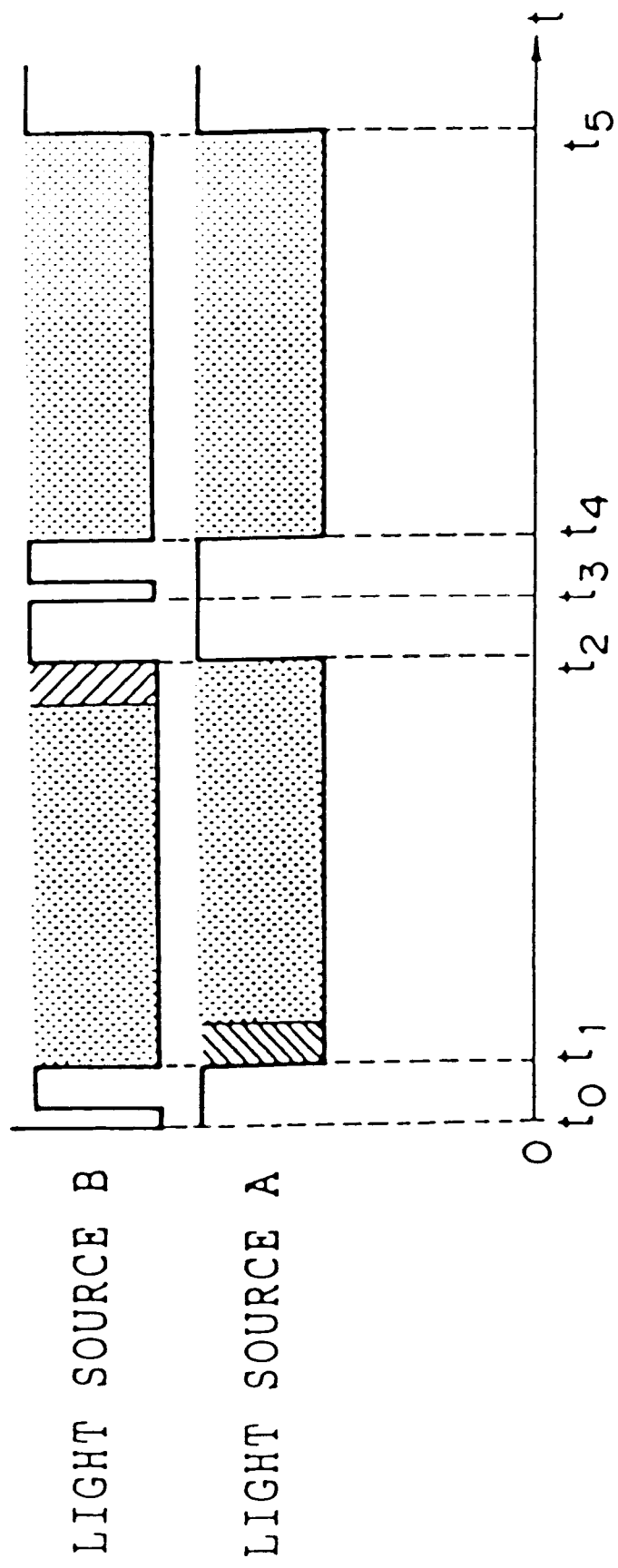
FIG. 33 is a timing chart showing scanning timings of the light sources A, B of FIG. 32.

FIG. 33 shows the scanning timing of the light sources A22D and B23D. If the synchronizing sensor 3D receives the laser beam from the light source B23D at time t0 in this diagram, scanning from the end portion P0 of the exposure range X by the light source B23D is started at a time t1 after a predetermined time has elapsed, and scanning from the central portion P1 of the exposure range X by the light source A22D is started at the same time. At time t2, scanning by the light source B23D is ended at the central portion P1 and scanning by the light source A22D is ended at the end portion P2, so that scanning of a single line in each exposure range is terminated. The diagonal lines in the timing chart between time t1 and t2 indicate the scanning timing for a portion near the central portion P1 of the exposure range X, which is the joint portion between the exposure range Xa of the light source A22D, and the exposure range Xb of the light source B. That is, the joint portion of the laser beam from the light source B23D is the portion near the scanning termination position of the exposure range Xb, and the joint portion of the laser beam from the light source A22D is the portion near the scanning start position of the exposure range Xa. Stripes which may occur at the joint portion between exposure ranges by different laser beams are caused when there is a difference in light volumes between the termination of scanning by a laser beam from the light source B23D on the photoconductor and at the start of scanning by a laser beam from the light source A22D on the photoconductor.

At the time t3–t5 also, scanning in the exposure ranges Xa and Xb is carried out by the light sources A22D and B23D in the same way as for the time t0–t2.

Figure 34:
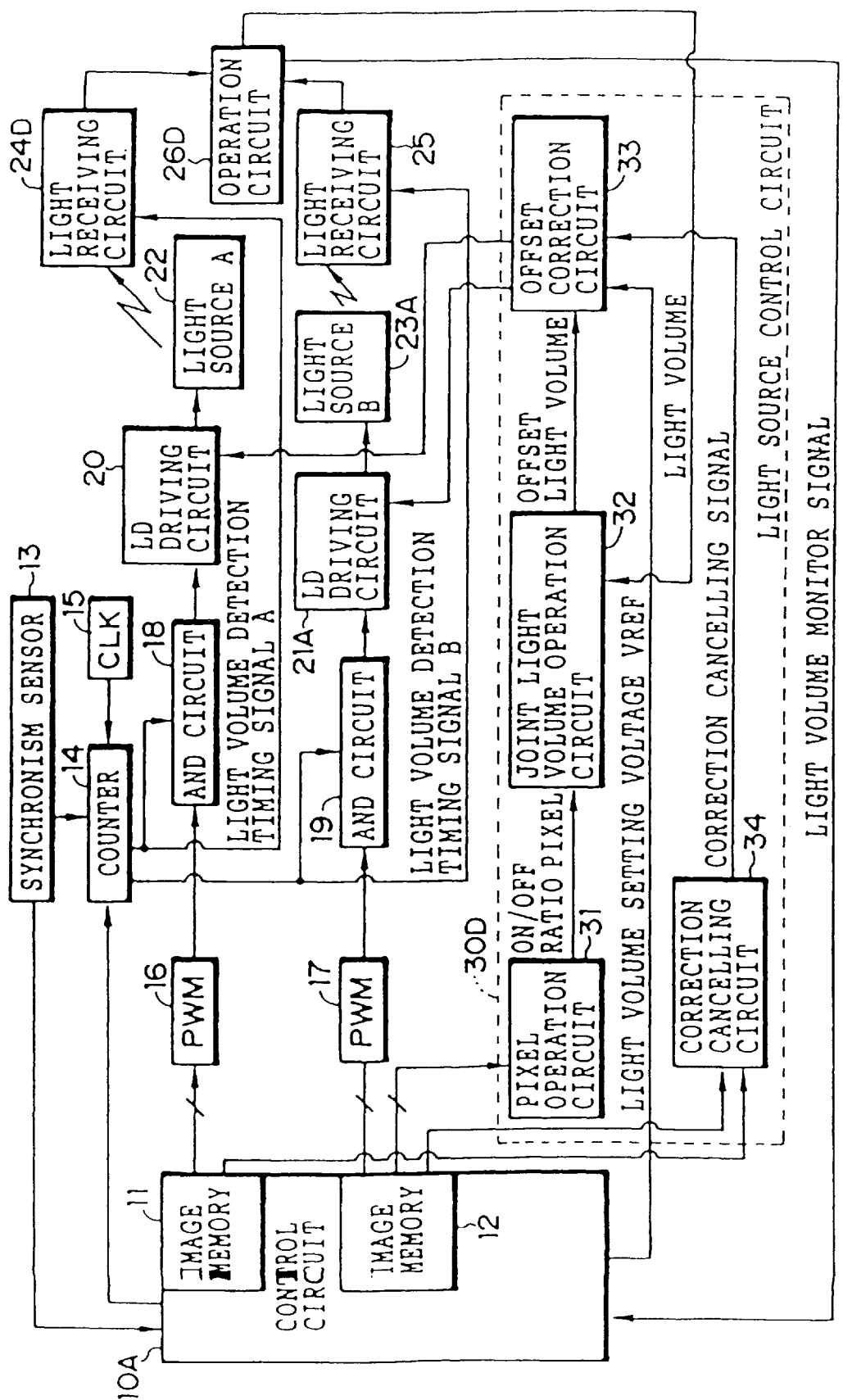
FIG. 34 is a block diagram showing the structure of a control unit of the light scanning device.

FIG. 34 shows the structure of the control unit of the light scanning device according to an embodiment of the present invention. Referring to this Figure, the control unit 4D contains a control circuit 10A. This control circuit 10A controls the entire operation of the light scanning device. Various data necessary for controlling the light scanning device is input and output from the control circuit 10A. A control signal necessary for controlling each circuit is output from the control circuit 10A. The control circuit 10A contains image memories 11 and 12. Image memory 11 contains image data for forming an image on the photoconductor by scanning with a laser beam from the light source A22D, and image memory 12 contains image data for forming an image on the photoconductor by scanning with a laser beam from the light source A23D.

The synchronizing sensor 13 as a scanning position detecting means is the same as shown in FIG. 32. A detection signal from the synchronizing sensor 13 is used to determine the start of scan position. The detection signal of the synchronizing sensor 13 is input into the control circuit 10A and counter 14. The control circuit 10A determines the start of scan timing according to the output timing of the detection signal of the synchronizing sensor 13.

The counter 14 uses the detection signal of the synchronizing sensor 13 as a reset signal and is enabled to count when an enable signal output from the control circuit 10A is input thereto. Reference numeral 15 denotes a clock. The counter 14 counts clocks at the input timing of the enable signal. Its counting output is used as a gate signal in AND circuits 18 and 19, and as a light volume detection timing signal for light receiving circuits 24D and 25.

Digital image data read from the image memories 11 and 12 are pulse-width modulated by PWM modulators 16 and 17 so as to be converted to analog image data and output to the AND circuits 18 and 19. The AND circuits 18 and 19 output analog image data output from the PWM modulators 16 and 17 in pixel units to LD driving circuits 20 and 21A. Here, the PWM modulation refers to a control in which one pixel is divided into a plurality of sections and a light source is turned on/off in pulse according to that division unit so as to control the ON pulse and OFF pulse in the pixel.

The laser diode (LD) driving circuits 20 and 21A as a light source driving means turn ON/OFF the light sources A22D and B23D according to the analog image data. The light sources A22D and B23D contain laser diodes. The light receiving circuits 24D and 25 contain photodiodes and detect the light volume of laser beams emitted from the light sources A22D and B23D according to the light volume detection timing signal output from the counter 14.

An arithmetic circuit 26D converts the light volume detected by the light receiving circuits 24D and 25 to voltage and its conversion output is output to the control circuit 10A and control circuit 30D which is a light source control means.

The light source control circuit 30D contains a pixel arithmetic circuit 31, a joint light volume arithmetic circuit 32, an offset correction circuit 33 and a correction cancel circuit 34.

The pixel arithmetic circuit 31 reads image data for forming an image to be obtained by scanning the exposure range Xb with a laser beam from the light source B23D from the image memory 12. Further it counts ON pulses and OFF pulses per single scanning line on the exposure range Xb at the time of PWM modulation of the aforementioned image data. That is, based on the counting value, it calculates the image condition within a single scanning line, or the ON/OFF pixel ratio (which will be defined later) Pr indicating the ratio between light source ON areas and OFF areas in a single scanning line.

According to the light volume of laser beams from the light sources A22D and B23D in the vicinity of the joint between the exposure ranges Xa and Xb obtained from the arithmetic circuit 26D, and the ON/OFF pixel ratio Pr output from the pixel arithmetic circuit 31, the joint light volume arithmetic circuit 32 calculates the offset light volume for correcting transient change of light volume of laser beams from the light sources A22D and B23D in the vicinity of the joint between the exposure ranges Xa and Xb.

The offset correction circuit 33 calculates offset voltage corresponding to the light volume corrected according to the light volume setting voltage Vref set by a light volume setting signal output from the control circuit 10A, and a voltage $\Delta V$ corresponding to the offset light volume calculated by the joint light volume arithmetic circuit 32, and supplies driving voltages Vref$-\Delta V/2$ and Vref$+\Delta V/2$ to the LD driving circuits 20 and 21A. Consequently, the light volumes of the laser beams from the light sources A22D and B23D in the vicinity of the exposure ranges Xa and Xb are corrected.

The correction cancel circuit 34 reads the image data from the image memories 11 and 12 and determines whether or not there is a continuity in image data in the vicinity of the joint between the exposure ranges Xa and Xb which are to be scanned with laser beams from the light sources A22D and B23D. If it is determined that there is no continuity, it outputs a correction cancel signal instructing the offset correction circuit 33 to cancel correction of the offset light volume, because it is not necessary to correct the light volume of the laser beams from the light sources A22D and B23D. In this case, the offset correction circuit 33 supplies the driving voltage Vref to the LD driving circuits 20 and 21A.

Figure 35:
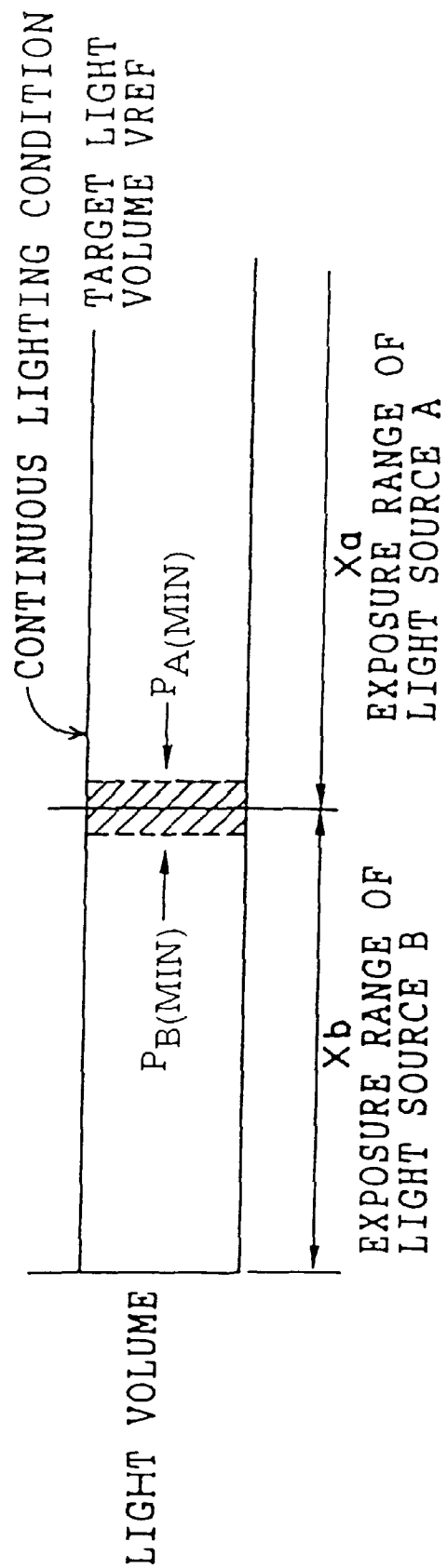
FIG. 35 is a diagram for explaining changes in the light volume on a photoconductor in a working state in which light sources are continuously lit for scanning.

Here, light volume adjustment in the light scanning device will be explained. For adjusting the light volume of the light scanning device during the initial settings, usually a steady light volume, such as that produced when a laser light source such as a laser diode or the like is continuously lit at a position corresponding to the position of the photoconductor, is measured with a measuring device such as a power meter. The driving currents of the LD driving circuits 20 and 21A for driving the laser light source, amplification factor, conversion rate and the like of a photodiode composing the light receiving circuits 24D and 25 for measuring the light volume with a receiving laser beam are then adjusted so as to determine the relation between the steady light volume on the photoconductor and the light volume setting voltage signal for use in the LD driving circuits 20 and 21A. The most general method is to monitor the light volume by means of the photodiode composing the light receiving circuits 24D and 25. According to this method, the photodiode and variable resistor are combined and then by adjusting the resistance of this variable resistor, the relation between the steady light volume on the photoconductor and the light volume setting voltage signal for use in the LD driving circuits 20 and 21A is determined. After this adjustment, the setting voltage to be input to the LD driving circuit corresponding to the setting light volume on the photoconductor or the light volume setting voltage is automatically determined as the setting light volume on the photoconductor. Thus, setting the light volume necessary for the photoconductor can be carried out by changing the value of the light volume setting voltage signal to be input to the LD driving circuit. According to the embodiment of the present invention shown in FIG. 34, by supplying a light volume setting voltage corresponding to the target light volume set on the photoconductor to the LD driving circuits 20 and 21A through the offset correcting circuits 33 from the control circuit 10A in the form of Vref, the light volume on the photoconductor is determined. FIG. 35 shows the changing state of the light volume on the photoconductor in the steady state in which the polygon mirror is being rotated with the light sources continuously ON. To obtain light volume information for the initial settings necessary for future light volume control, according to the light volume detection timing signal output from the counter 14, the light receiving circuits 24D and 25 detect steady state light volumes PA(min), PB(min) on the photoconductor, and then supply a voltage signal corresponding to the aforementioned light volume to the joint light volume arithmetic circuit 32 in the light source control circuit 30D through the arithmetic circuit 26D. As evident from the light volume adjustment described above, the steady state light volumes PA(min), PB(min) can be also obtained from the pulse widths of the light volume setting voltage signal Vref and the light volume detection timing signal, and therefore they are permitted to be stored in memory in the control circuit 10A as initial information. Of course, the pulse width of the light volume detection timing signal output from the counter 14 differs depending on the scanning speed. In the light scanning device according to the embodiment of the present invention, if the photodiode is used in the light receiving circuits 24D and 25 as an embodiment, the pulse width of the light volume detection timing signal is set to 10 $\mu$sec. Further, in a light scanning device requiring high scanning speeds, the peak hold circuit is provided in the light receiving circuits 24D and 25, and the light volume detection timing signal pulse width is set to 0.1 $\mu$sec. This pulse width can be further reduced. In FIG. 35, light volume detection timing is placed in the vicinity of the joint between the adjacent exposure ranges of laser beams from different light sources A22D and B23D, however, as this is the steady state light volume, the detection position may be any place as long as it lies within the adjacent exposure ranges. The light volumes PA(min), PB(min) held at this time are expressed as follows according to the relation between the respective light sources.

$$PB(\min)=PA(\min)=Vref$$

Figure 36:
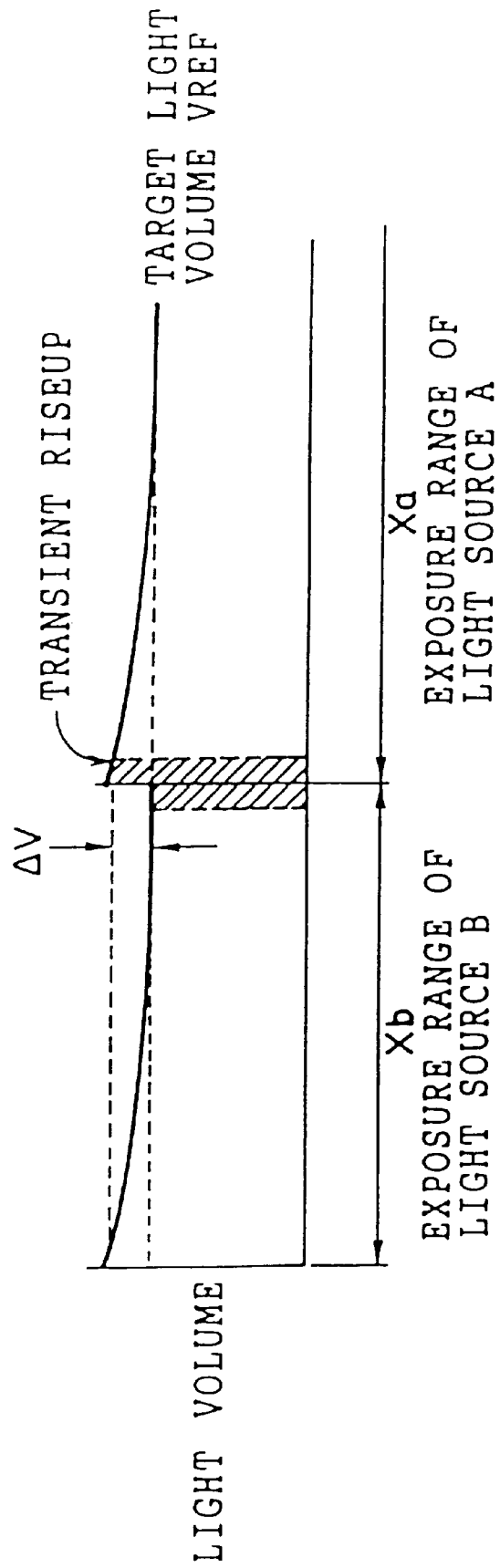
FIG. 36 is a diagram for explaining changes in light volume on the photoconductor when the light sources are continuously lit so as to actually print lines.

FIG. 36 shows the light volume state in the case when a single scanning line such as black print is drawn. As shown in the Figure, the joint of the exposure range Xb to be scanned with laser beam from the light source B23D is near the end point of the scanning with a laser beam from the light source B23D, and the joint of the exposure range Xa to be scanned with a laser beam from the light source A22D is near the start point of the scanning with a laser beam from the light source A22D. Thus, when the laser diode is used as light source even if the light volume is set according to the light volume setting voltage, because of the droop characteristic of the laser diode, the light volume of the laser beam from the light source B23D becomes steady near the joint area of the exposure range Xa side of the joint between the exposure ranges Xa and Xb. Near the joint area of the exposure range Xa, the light volume of the laser beam from the light source A22D becomes transient, so that a difference occurs in the light volume at the joint between the exposure ranges Xa and Xb. To detect this transient light volume which is higher than the steady state volume, the laser diode of the light source A22D is driven through the LD driving circuit 20 by the light volume detection timing so as to monitor using the light receiving circuit 24D.

Figure 37:
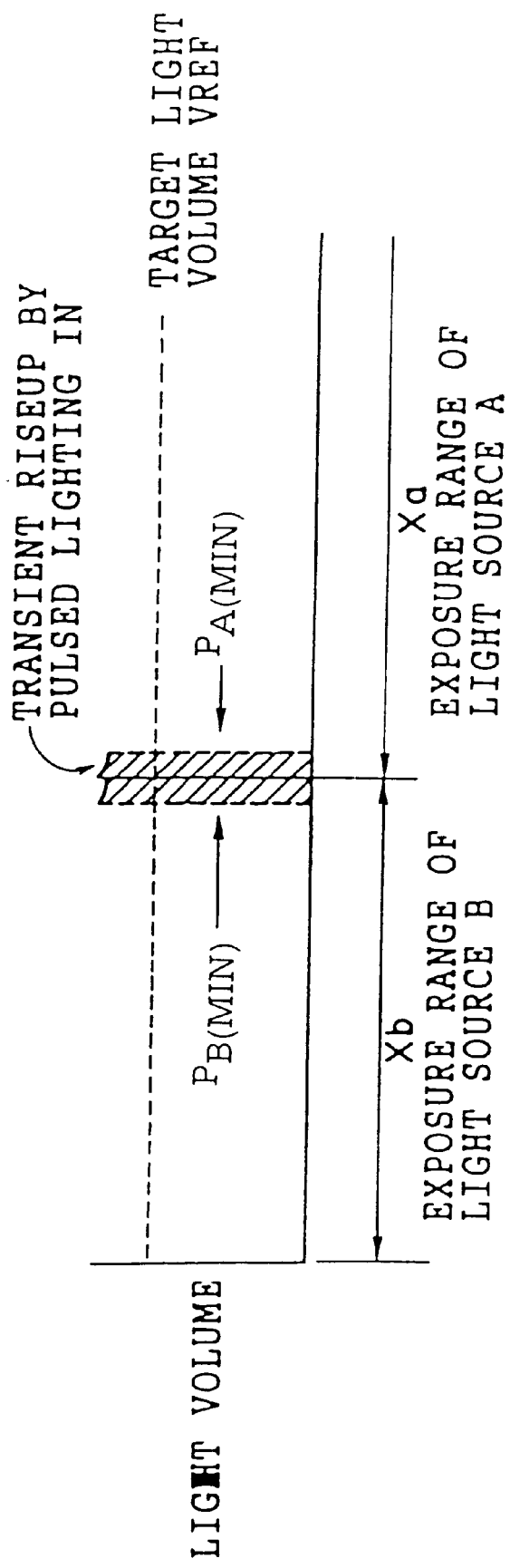
FIG. 37 is a diagram for explaining changes in light volume at the joint region between adjacent exposure ranges on the photoconductor when the light sources are lit in pulsation.

FIG. 37 shows the light volume condition at the joint between the exposure ranges Xa and Xb when the laser diodes of the light sources A22D and B23D are lit in pulsation. In this case, detection of light volume does not always have to be done at the joint between the exposure ranges Xa and Xb, but if a transient starting portion when the laser diodes are lit in pulsation can be detected, the detection may be carried out at any place in the exposure ranges Xa and Xb. However, the pulse width of the light volume detection timing signal must be the same as the light volume detection timing used upon detection of the steady state light volume. To simplify the circuit structure, it is permissible to use the light volume detection timing signal used upon detection of the steady state light volume.

The light volumes PA(max) and PB(max) at the transient starting portion when the light sources A22D and B23D are lit in pulsation, detected by the light receiving circuits 24D and 25 are photoelectrically converted by the operation circuit 26D and held as the initial light volume value in the joint light volume arithmetic circuit 32. The joint light volume arithmetic circuit 32 corrects the light volume at the joint between the exposure ranges Xa and Xb using the initial light volumes PA(max), PB (max), A(min) and PB (min). As shown in FIG. 36, the light volume at the joint between the exposure ranges Xa and Xb becomes the worst when a single line is simply scanned. In this case, a difference ΔV in the light volume between the laser beam from the light source A22D and one from the light source B23D in the vicinity of the joint is as follows.

$$\Delta V = PA(\max) - PB(\min) \tag{15}$$

This difference ΔV can be calculated easily from the initial light volume value. In this case, the correction is carried out by supplying the driving voltage (Vref−ΔV/2) from the offset correction circuit 33 to the LD driving circuit 20, and further driving voltage (Vref+ΔV/2) to the LD driving circuit 21A, so that a light volume corresponding to ΔV/2 which is half of the light volume difference ΔV is used as an offset amount, and then the voltage ΔV/2 corresponding to this offset amount is corrected with respect to the light volume setting voltage Vref. In this case, it is permissible to supply a driving voltage to the LD driving circuit 20 or LD driving circuit 21A which drive either the light source A22D or B23D, so that a voltage corresponding to the light volume difference ΔV is corrected with respect to the light volume setting voltage Vref. That is, when correcting only the light volume of a laser beam from the light source B, it is permissible to supply a driving voltage (Vref+ΔV) for increasing the light volume by an amount corresponding to ΔV to the LD driving circuit 21 which drives the light source B23D. When correcting only the light volume of a laser beam from the light source A, it is permissible to supply a driving voltage (Vref−ΔV) for decreasing the light volume by an amount corresponding to ΔV to the LD driving circuit 21A which drives the light source B. However, to minimize the light volume difference between scanning lines in the auxiliary scanning direction, it is desirable to diffuse the light volume to be corrected by allocating it equally to the light sources A22D and B23D. Although according to the present invention, there are two light sources, if three or more light sources are provided, the same light volume correction as described above is carried out at the first joint of the exposure range adjacent to the scanning start side in the main scanning direction. Then at the second and following joints, the light volume difference corrected in the adjacent exposure range at the previous joint is added so as to correct the light volume.

Figure 39:
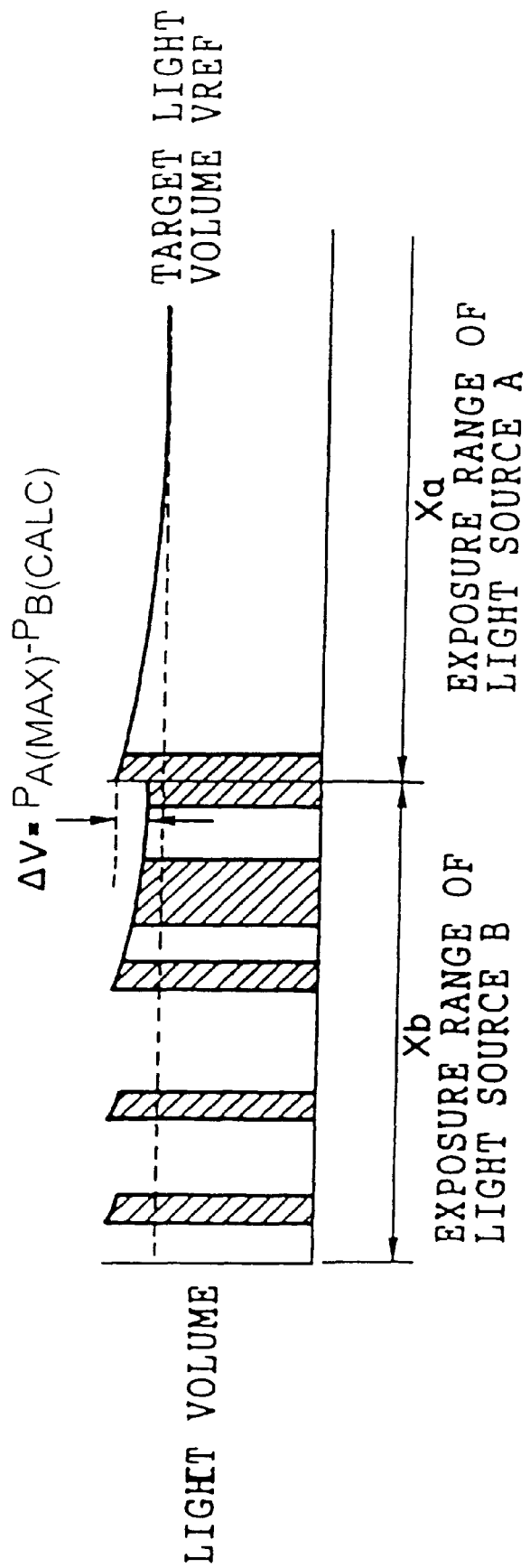
FIG. 39 is a diagram for explaining changes in light volume on the photoconductor when the light sources are lit in pulsation so as to actually print lines.

In normal operations in which an image is actually formed, the image condition in a single scanning line, or the ratio between an area in which the light source B23D in a scanning line is turned ON and an area in which it is turned OFF is calculated by the pixel arithmetic circuit 31. According to the result of the calculation, the joint light volume arithmetic circuit 32 estimates the light volume of light source which changes near the joint portion of the adjacent exposure range because of the droop characteristic of the laser diodes of the light sources A22D and B23D. FIG. 39 shows changes in light volume when the image data to be output to the light source B23D is PWM-modulated. As shown in the Figure, if the OFF condition of the light source B continues for a long time, the droop characteristic which is a thermal characteristic of the laser diode returns to its initial state because sufficient time has passed for the laser diode to cool down. As a result, the light volume obtained when the laser diode is next turned ON in pulsation becomes equal to the light volume in the initial state. The condition of the to various image data, namely from the configuration of ON/OFF states during PWM modulation of each pixel in one scanning line on the exposure range Xb, as far as the light volume from the laser diode of the light source B23D near the joint between the exposure ranges Xa and Xb, is calculated by the pixel arithmetic circuit 31 and joint light volume arithmetic circuit 32. The light volume difference ΔV between the light sources A22D and B23D at the joint portion between the exposure ranges Xa and Xb is obtained according to the light volume PB (calc) obtained by arithmetic and the initial light volume PA (max) from the laser diode of the light source A22D.

$$\Delta V = PA(\max) - PB(\text{calc}) \tag{16}$$

Figure 38:
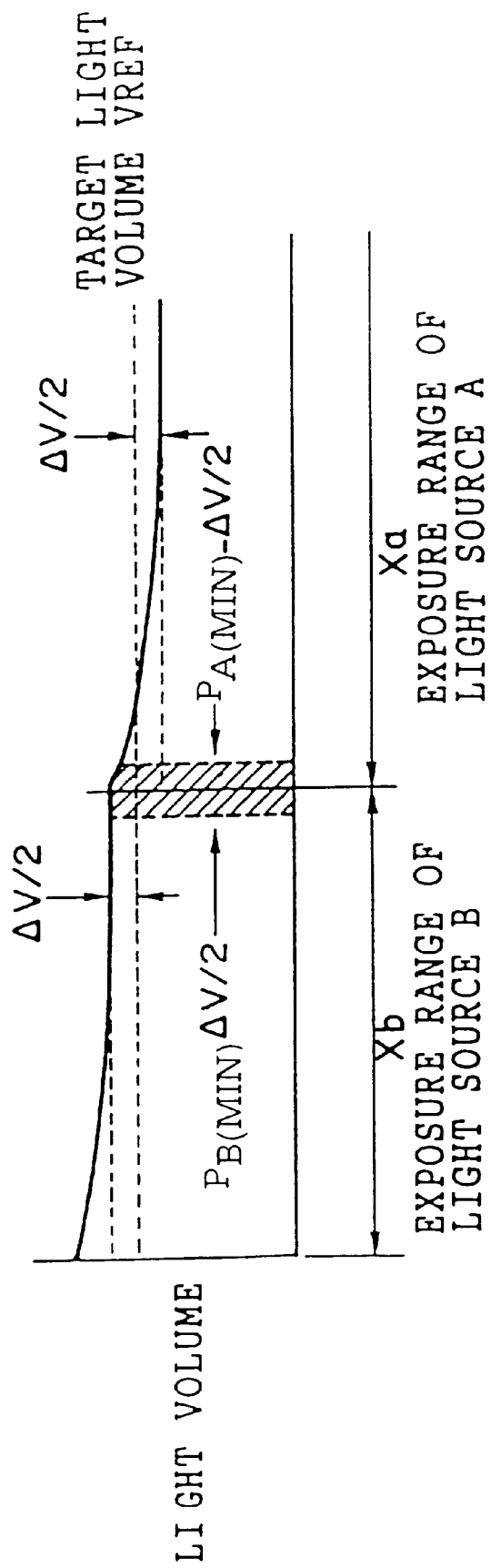
FIG. 38 is a diagram for explaining changes in light volume on the photoconductor after the light volume is corrected when the light sources are continuously lit so as to actually print lines.
Figure 40:
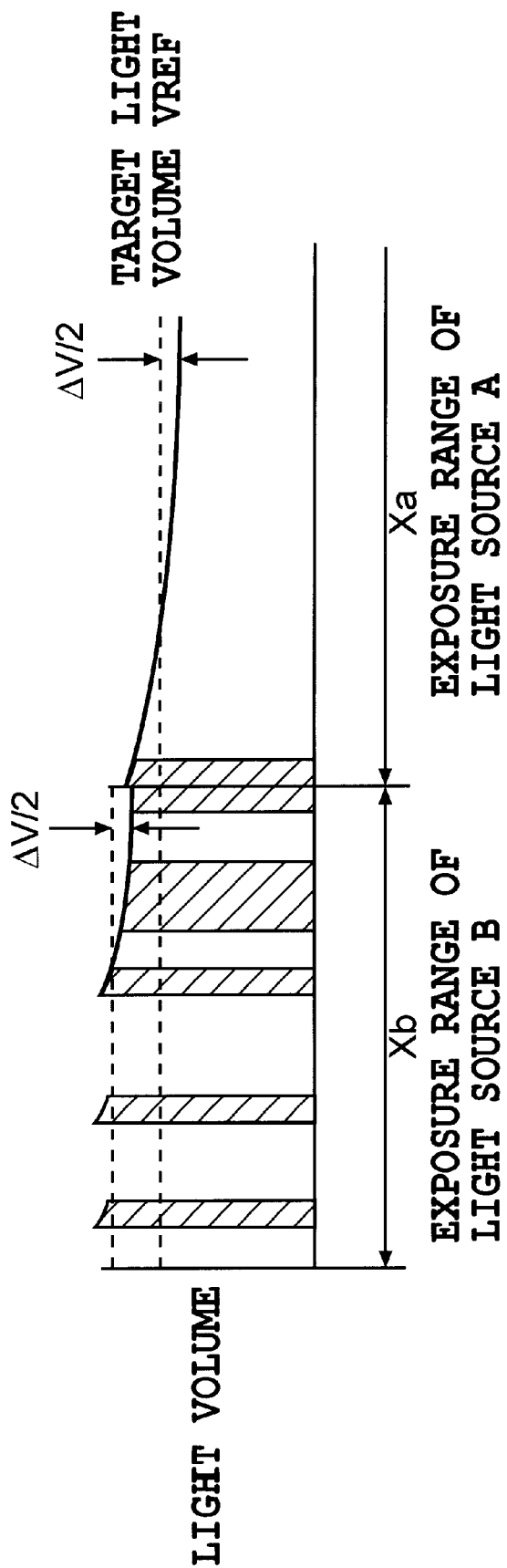
FIG. 40 is a diagram for explaining changes in light volume on the photoconductor after the light volume is corrected when the light sources are continuously lit so as to actually print lines.

Like the example shown in FIG. 38, driving voltages (Vref−ΔV/2), (Vref+ΔV/2) are output from the offset circuit 33 to the LD driving circuits 20 and 21A so as to correct the light volume by ΔV/2 as shown in FIG. 40. As evident from the formulas (15), (16), the reason why a difference in light volume occurs at the joint between the exposure ranges Xa and Xb is because of the initial light volume PA (max). That is, when a laser beam from the laser diode of the light source A starts scanning from the joint between the exposure ranges Xa and Xb according to image data read from the image memory 11, a difference in light volume occurs between the light sources A22D and B23D. However, even in this case, when image data to be written by a laser beam from the laser diode of the light source B23D does not exist in the vicinity of the joint between the exposure ranges Xa and Xb on the photoconductor, the image quality at the joint portion between the exposure ranges Xa and Xb is not affected by the condition of the image to be written by laser beam from the laser diode of the light source A22D. Therefore, if there is no continuity in the vicinity of the joint between the exposure ranges Xa and Xb, between an image formed in the exposure range Xb by a laser beam from a laser diode of the light source B23D and an image formed in the exposure range Xa by a laser beam from a laser diode of the light source A22D or more specifically, if the light source A22D or light source B23D is OFF in the vicinity of the joint between the exposure ranges Xa and Xb, it is not necessary to carry out light volume correction control for the light sources A22D and B23D at the joint between the exposure ranges Xa and Xb. Whether or not there is a continuity at the joint between the exposure ranges Xa and Xb can be determined easily by correction cancel circuit 34's reading image data from the image memories 11 and 12 so as to check image data corresponding to the vicinity of the joint portion between the exposure ranges Xa and Xb. If there is no continuity in an image near the joint between the exposure ranges Xa and Xb, the correction cancel circuit 34 outputs a correction cancel OFF signal to the offset correction circuit 33 so as to stop the light volume correction operation of the offset correction circuit 33.

Figure 41:
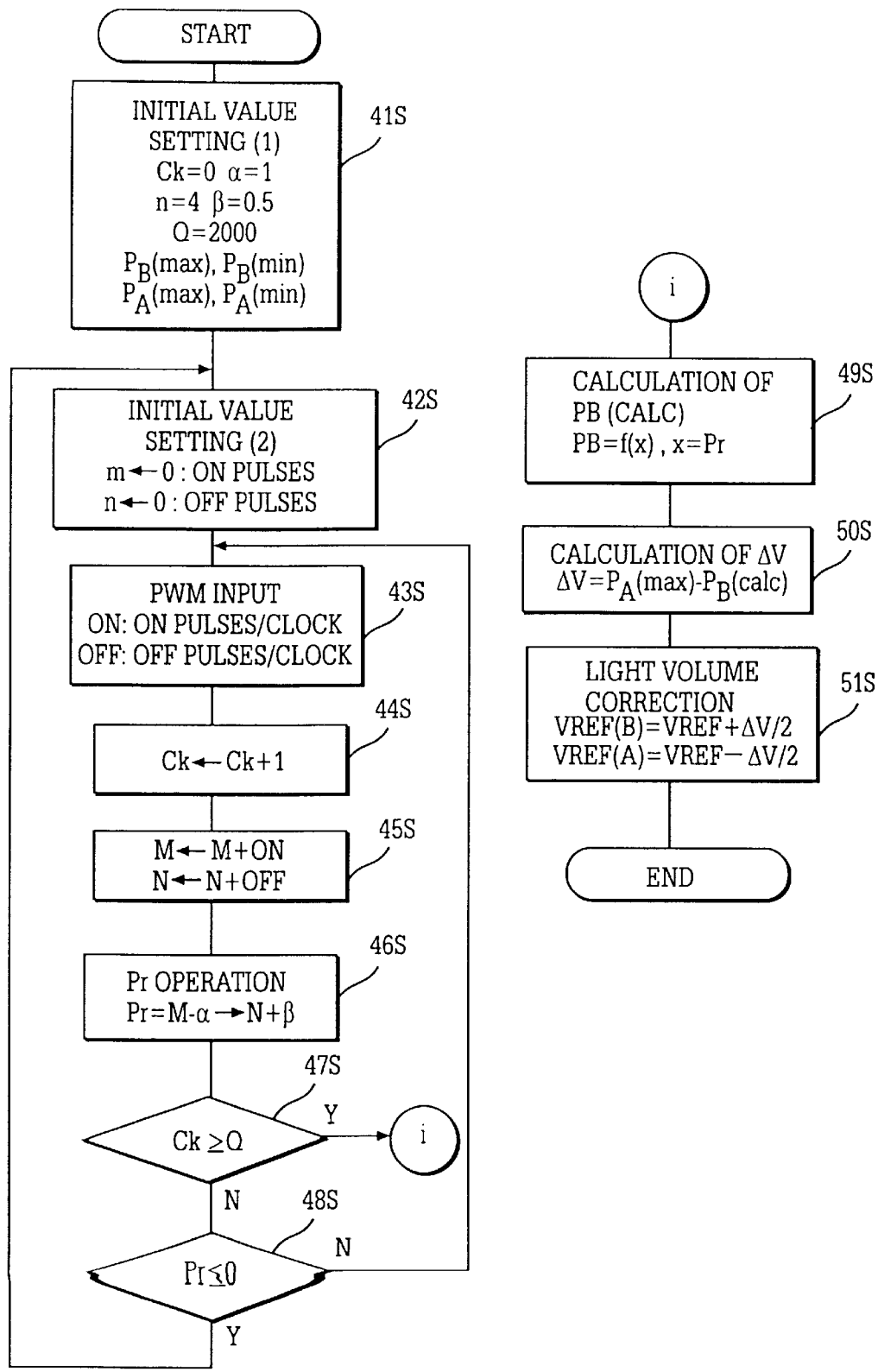
FIG. 41 is a flow chart showing control operations of the light source control circuit shown in FIG. 34.

Next, control operations of the light source control circuit will be described with reference to FIG. 41. The process flow in FIG. 41 shows mainly the arithmetic computations of the estimated light volume PB(calc) by laser beam from a laser diode of the light source B23D in the vicinity of the joint between the exposure ranges Xa and Xb. First in step 41S, an initial value (1) is set in the pixel arithmetic circuit 31. Here, the pixel clock counter for counting pixel clocks which is a parameter indicating a unit of pixel in software viewpoints is reset, and the initial values of the various data necessary for calculation of the estimated light volume PB(calc) are set. As the initial value, here, bit number n for PWM modulation indicating the number of divisions upon dividing a pixel into plural areas, heat coefficient α of a laser diode, cool coefficient β of a laser diode, the total number Q of pixels per divided exposure area, the initial light volumes PA (max), PB(max), PA(min) and PB(min) are set. Specific setting examples include n=4, α=1, β=0.5, and Q=2000. Considering that the droop characteristic of the laser diode is a thermal phenomenon, the laser diode heat coefficient α and cool coefficient β are defined respectively as the coefficient for heating the laser diode when the laser diode is turned ON/OFF, and the coefficient for cooling the laser diode. Because these coefficients are determined by the structure of the laser diode, composition of the components and the like, they are automatically determined depending on the type and form of the laser diode. Further, it is permissible to define both the heat coefficient α and cool coefficient β as a ratio.

Next, instep 42S, the initial value setting (2) is carried out in the pixel arithmetic circuit 31. Here, the count content M of the on-counter which counts the number of ON pulses in a pixel during PWM modulation of image data to be read from the image memory 12 and the count content N of the off-counter which counts the number of OFF pulses in a pixel are reset. Here, the on-counter and off-counter are soft counters.

In step 43S, image data is read from the image memory 12 by means of the pixel arithmetic circuit 31 and counting by on-counter and off-counter for each pixel is started for every division of a pixel. Then, the total number of ON pulses and OFF pulses of a single pixel are counted.

In step 44S, the pixel clock counter CK is counted up.

In step 45S, the content M of the on-counter for counting the number of ON pulses in a single pixel during PWM modulation of image data, or the content N of the off-counter for counting the number of OFF pulses in a pixel is incremented by the value counted in step 43S.

In step 46S, the on/off pixel ratio Pr is calculated by means of the pixel arithmetic circuit 31. Here, the on/off pixel ratio can be expressed by the following formula.

$$Pr = M \cdot \alpha - N \cdot \beta \qquad (17)$$

That is, the pixel arithmetic circuit 31 calculates the on/off pixel ratio Pr which is obtained by summing up the ON states and OFF states per pixel according to image data read from the image memory 12 and then multiplying them by the heat coefficient and cool coefficient of the laser diode.

In step 47S, whether or not the count CK of the pixel clock counter CK is smaller than Q or whether or not pixel clock has arrived at the total number Q of a divided exposure area is determined. If CK<Q, in step 48S, whether or the not on/off pixel ratio Pr<0 is determined.

If Pr<0, it is determined that the condition of the laser diode of the light source B driven by the LD driving circuit 21A has returned to its initial state, and therefore the process returns to step 42S. If it is determined that Pr>0, the process returns to step 43S.

If it is determined that the count CK of the pixel clock counter is CK>Q in step 47S, then in Step 49S, according to the result of calculating the on/off pixel ratio Pr in step 46S, the estimated light volume PB(calc) is calculated by laser beam from the laser diode of the light source B23D, in the vicinity of the joint between the exposure ranges Xa and Xb by means of the joint light volume arithmetic circuit 32. This estimated light volume PB (calc) is calculated using the droop characteristic function defined for calculation of the offset light volume, based on the droop characteristic of the laser diode, from the result of the calculation of the on/off pixel ratio Pr which is a final thermal condition of the laser diode of the light source B in the vicinity of the joint between the exposure ranges Xa and Xb. This droop characteristic function may be defined according to the droop characteristic data of the laser diode actually used in the light source B of the light scanning device or may be defined approximately as follows, as a function in which the gradient is inversely proportional.

$$dy/dx = -\alpha/(x+1) \qquad (18)$$

Here as the boundary condition, with x=0, y=1 as the standard condition and droop being 10 percent (x=xmax, y=10/11), a solution is obtained.

$$PB(\text{calc}) = f(x) = y = -1/[11 \cdot 1n\{((n \text{ power of } 2) - \} \cdot Q \cdot \alpha\}] \cdot 1n(x+1) + 1 (19)$$

Figure 42:
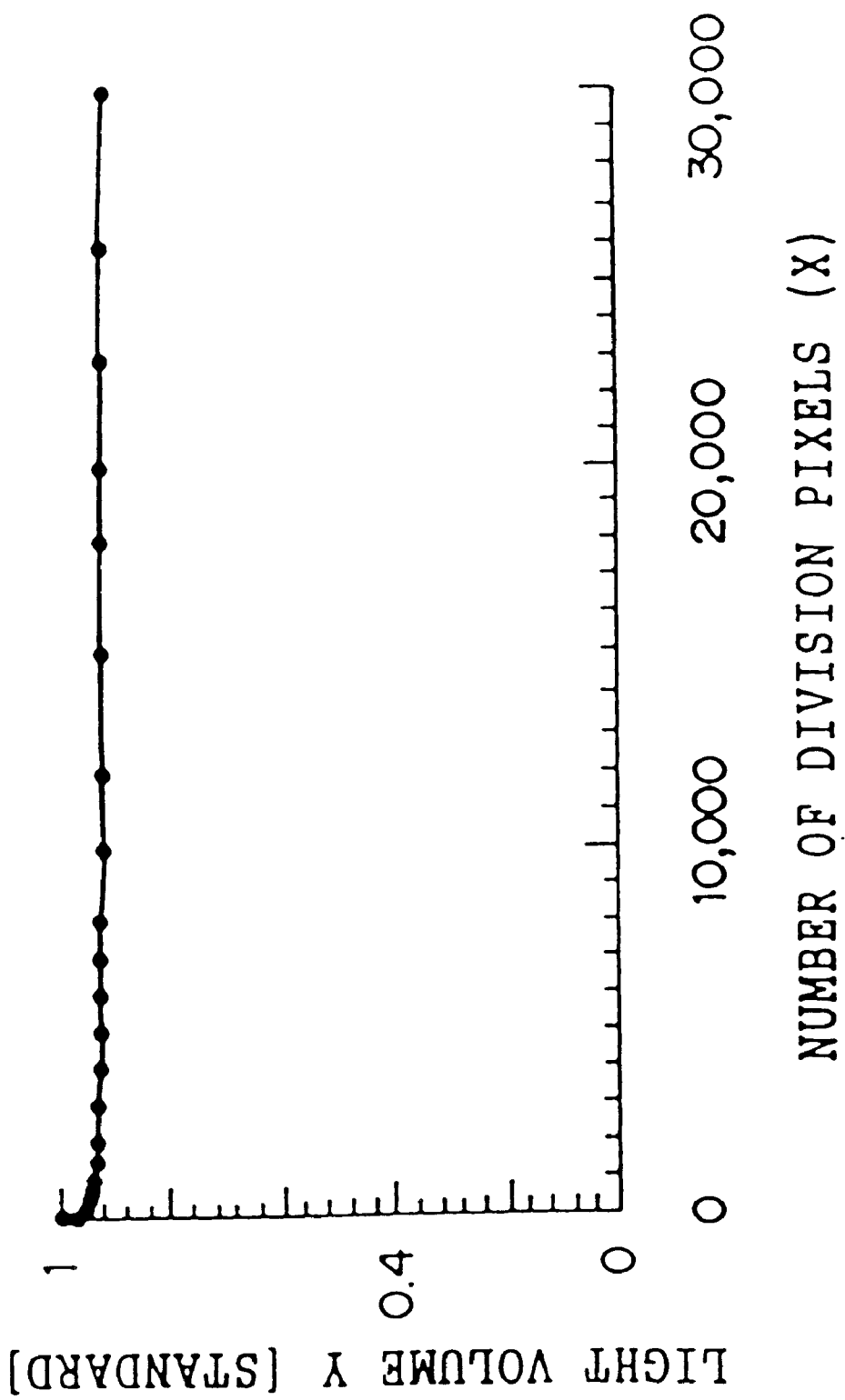
FIG. 42 is a diagram showing an example of droop characteristic function.

Here, x refers to the on/off ratio pixel Pr calculated finally by calculating the formula (17) up to the total number of pixels per divided exposure area and y refers to the light volume of a laser diode of the light source B at that time. Further, xmax corresponds to the worst value when the laser diode is continuously ON and is expressed as follows.

$$x\max = Q \cdot \{(n \text{ power of } 2) - 1\} \alpha \qquad (20)$$

where Q is total number of pixels in a divided exposure area and n is bit number for PWM modulation. FIG. 42 shows an example of plotting of the droop characteristic function shown in FIG. 19.

In step 50S, the light volume difference ΔV between the light sources A22D and B23D at the joint between the exposure ranges Xa and Xb is calculated according to the formula (16).

$$\Delta V = PA(\text{max}) - PB(\text{calc}) \quad (16)$$

Because the light volume is proportional to the light volume setting voltage, the voltage ΔV corresponding to the light volume difference ΔV can be obtained easily as Vref (1−y).

Instep 51S, according to the light volume setting voltage Vref set by a light volume setting signal output from the control circuit 10A, and the voltage ΔV corresponding to an offset light volume value calculated by the joint light volume arithmetic circuit 32, the offset voltage corresponding to a corrected light volume value is calculated by the offset correction circuit 33, and the driving voltages Vref−ΔV/2, Vref+ΔV/2 are supplied to the LD driving circuits 20 and 21A.

As described above, by correcting the transient change of light volume caused by the droop characteristic of the laser diode, it is possible to equalize light volumes from different light sources in the vicinity of the joint between the adjacent exposure ranges, thereby making it possible to prevent an occurrence of faults in image quality such as stripe formation.

What is claimed is:

1. A light scanning device comprising:

a plurality of light sources for generating light beams;

a plurality of light source driving means for driving said plurality of light sources;

a scanning means for scanning each of the divided exposure ranges which are provided by dividing an exposure range to into a plurality of sections in the main scanning direction with each of the light beams;

at least one scanning position detection means for detecting a scanning position;

a plurality of light volume detecting means for detecting light volume by receiving light beams from said light sources at predetermined timings synchronous with the detection outputs of said scanning position detection means; and a light source control means for controlling a plurality of said light source driving means so that the light volumes of two light beams from said light sources for scanning two exposure ranges adjacent to each other, according to the results of the detection of said plurality of light volume detecting means, are equal in the vicinity of a joint between said two adjacent exposure ranges.

2. A light scanning device according to claim 1 wherein said light source control means controls the light volume of light beams from said light sources in the vicinity of the joint between said adjacent exposure ranges, according to data indicating in which areas the light source is on and in which areas the light source is off at the time of modulation, based on image data of an exposure range located in front of the joint of the two adjacent exposure ranges in the main scanning direction.

3. A light scanning device according to claim 2 wherein said light source control means does not control the light volume of light beams from said light sources in the vicinity of the joint between said adjacent exposure ranges if there is no continuity in image data in the vicinity of the joint between said two adjacent exposure ranges.

4. A light scanning device according to claim 1 wherein said light source control means does not control the light volume of light beams from said sources in the vicinity of the joint between said adjacent exposure ranges if there is no continuity in image data in the vicinity of the joint between said two adjacent exposure ranges.

* * * * *

UNITED STATES PATENT AND TRADEMARK OFFICE
CERTIFICATE OF CORRECTION

PATENT NO. : 6,038,051
DATED : March 14, 2000
INVENTOR(S) : Takayoshi SUZUKI et al.

It is certified that error appears in the above-identified patent and that said Letters Patent is hereby corrected as shown below:

Title page, item 30 Foreign Application Priority Data, "8-3386636" should be --8-338636--.

Claim 1, col. 45, line 35, delete "to".

Signed and Sealed this

Thirty-first Day of October, 2000

Attest:

Attesting Officer

Q. TODD DICKINSON
Director of Patents and Trademarks